US012288181B2

(12) United States Patent
Dasari et al.

(10) Patent No.: US 12,288,181 B2
(45) Date of Patent: Apr. 29, 2025

(54) SYSTEM AND METHOD FOR FORECASTING DELIVERIES VIA BLOCKCHAIN SMART CONTRACTS

(71) Applicant: Walmart Apollo, LLC, Bentonville, AR (US)

(72) Inventors: Tarun Dasari, Bentonville, AR (US); Aditya Reddy Cheruku, Bentonville, AR (US); Anand Banik, Rogers, AR (US); Sumanth B. Talasila, Bentonville, AR (US); Kishore P. Sasthiri, Bentonville, AR (US); Murthy N. Kolluru, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/376,321

(22) Filed: Oct. 3, 2023

(65) Prior Publication Data
US 2024/0029007 A1 Jan. 25, 2024

Related U.S. Application Data

(60) Continuation of application No. 17/673,508, filed on Feb. 16, 2022, now Pat. No. 11,816,625, which is a
(Continued)

(51) Int. Cl.
*G06Q 20/00* (2012.01)
*G06Q 10/0832* (2023.01)
(Continued)

(52) U.S. Cl.
CPC ..... *G06Q 10/0832* (2013.01); *G06Q 10/0833* (2013.01); *H04L 9/0637* (2013.01); *G06Q 2220/00* (2013.01); *H04L 9/50* (2022.05)

(58) Field of Classification Search
CPC ........... G06Q 10/0832; G06Q 10/0833; G06Q 2220/00; H04L 9/0637; H04L 9/50; H04L 9/3239; H04L 63/12
(Continued)

(56) References Cited

U.S. PATENT DOCUMENTS 5,324,945 A  6/1994  Iwamoto
5,708,271 A  1/1998  Ito
(Continued)

FOREIGN PATENT DOCUMENTS

CN  100483109  8/2007
CN  102507457  6/2012
(Continued)

OTHER PUBLICATIONS

U.S. Appl. No. 16/112,974, filed Aug. 27, 2018, Joshua Bohling.
(Continued)

*Primary Examiner* — Dante Ravetti
(74) *Attorney, Agent, or Firm* — Fitch, Even, Tabin & Flannery LLP

(57) ABSTRACT

A supply chain forecasting system with blockchain controls is discussed. The supply chain forecasting system can include a central computing system communicating with a third party computing system. The central computing system and third party computing system can initiate, adjust, and fulfill smart contracts associated with the delivery of physical objects using blockchain controls.

18 Claims, 26 Drawing Sheets

Related U.S. Application Data division of application No. 16/534,538, filed on Aug. 7, 2019, now Pat. No. 11,270,245.

(60) Provisional application No. 62/715,654, filed on Aug. 7, 2018.

(51) Int. Cl.
*G06Q 10/0833* (2023.01)
*H04L 9/06* (2006.01)
*H04L 9/00* (2022.01)

(58) Field of Classification Search
USPC .............. 705/16, 21, 59; 380/44, 262, 278
See application file for complete search history.

(56) References Cited

U.S. PATENT DOCUMENTS

| | | | |
|---|---|---|---|
| 5,726,750 | A | 3/1998 | Ito |
| 6,847,447 | B2 | 1/2005 | Ozanich |
| 7,103,207 | B2 | 9/2006 | Brown |
| 7,173,246 | B2 | 2/2007 | Benedetti |
| 7,316,322 | B2 | 1/2008 | Kawabata |
| 7,693,739 | B2 | 4/2010 | Schmidtberg |
| 7,835,885 | B2 | 11/2010 | Ben-Tzur |
| 7,937,244 | B2 | 5/2011 | Kadaba |
| 8,014,569 | B2 | 9/2011 | Durkin |
| 8,072,605 | B2 | 12/2011 | Costa |
| 9,218,585 | B2 | 12/2015 | Gupta |
| 9,892,501 | B2 | 2/2018 | Dehais |
| 10,423,918 | B2 | 9/2019 | Mehring |
| 10,445,684 | B2 | 10/2019 | Mehring |
| 11,270,245 | B2 | 3/2022 | Dasari |
| 11,816,625 | B2 | 11/2023 | Dasari |
| 2004/0117358 | A1* | 6/2004 | von Kaenel ........... G06Q 40/08 |
| 2009/0305423 | A1 | 12/2009 | Subramanian |
| 2011/0029413 | A1 | 2/2011 | Ben-Tzur |
| 2012/0304014 | A1 | 11/2012 | Prophete |
| 2013/0295532 | A1 | 11/2013 | Minvielle |
| 2014/0180953 | A1 | 6/2014 | Westcott |
| 2014/0293277 | A1 | 10/2014 | Subbiah et al. |
| 2015/0289557 | A1 | 10/2015 | Deevi et al. |
| 2015/0347945 | A1 | 12/2015 | Reese |
| 2016/0253622 | A1 | 9/2016 | Sriram |
| 2016/0292634 | A1 | 10/2016 | Mehring |
| 2016/0350715 | A1 | 12/2016 | Minvielle |
| 2017/0199952 | A1 | 7/2017 | Kim |
| 2018/0025365 | A1 | 1/2018 | Wilkinson |
| 2018/0096175 | A1 | 4/2018 | Schmeling |
| 2018/0149519 | A1 | 5/2018 | Connor |
| 2018/0343126 | A1 | 11/2018 | Fallah |
| 2019/0013932 | A1 | 1/2019 | Maino |
| 2019/0102850 | A1 | 4/2019 | Wheeler |
| 2019/0147396 | A1 | 5/2019 | Bohling |
| 2020/0019923 | A1 | 1/2020 | Santhar |
| 2020/0051011 | A1 | 2/2020 | Dasari |
| 2022/0137019 | A1 | 5/2022 | Dasari |
| 2022/0172162 | A1 | 6/2022 | Dasari |

FOREIGN PATENT DOCUMENTS

| | | |
|---|---|---|
| CN | 102928355 | 2/2013 |
| CN | 204705583 | 10/2015 |
| EP | 0939316 | 9/1999 |
| EP | 1042654 | 10/2000 |
| EP | 1150115 | 10/2001 |
| EP | 1285244 | 2/2003 |
| EP | 2637039 | 9/2013 |
| IN | 201641015689 | 10/2017 |
| JP | 2006226775 | 8/2006 |
| WO | 2018081175 | 5/2018 |
| WO | 2018087546 A1 | 5/2018 |
| WO | 2021011520 | 1/2021 |

OTHER PUBLICATIONS

Arah, Isaac Kojo et al.; "Preharvest and Postharvest Factors Affecting the Quality and Shelf Life of Harvested Tomatoes: A Mini Review"; http://downloads.hindawi.com/journals/ija/2015/478041.pdf; Available as early as Oct. 14, 2015; pp. 1-7.

Badia, Ricardo; "Cold Chain Logistics: Assessing the Challenge"; https://www.zestlabs.com/assessing-cold-chain-logistics/; Mar. 19, 2019; pp. 1-4.

Barthe, J.F.; "D.2.3.2. Database of consumer awareness, expectations and concerns on cold chain"; http://www.frisbee-project.eu/images/result/FRISBEE_DEL_2-3-2.pdf; Dec. 2, 2011; pp. 1-26.

Barthe, J.F.; "D.2.3.2.1 Survey questionnaires and materials for studies of consumer perspectives and attitudes towards refrigerated foods, the cold chain and relevant refrigeration technologies (Informed consent forms, privacy, personal data handling)"; http://www.frisbee-project.eu/images/result/FRISBEE_DEL_2-3-2-1.pdf;Feb. 8, 2012; pp. 1-21.

Bayona et al. Proceedings, APSIPA Annual Summit and Conference 2018. Cocoa bean quality assessment using closed range hyperspectral images. Nov. 15, 2018 (Nov. 15, 2018). (retrieved on Sep. 23, 2020]. Retrieved from the Internet: <URL: https://ieeexplore.ieee.org/document/8659490> pp. 622-626.

Bogataj, M., et al.; "Stability of perishable goods in cold logistic chains"; International Journal of Production Economics, vol. 93-94; 2005; pp. 345-356.

Capgemini; "Schuitema Revolutionizes Food Quality Control Through RFID"; https://www.capgemini.com/se-en/wp-content/uploads/sites/29/2017/07/Schuitema_Revolutionizes_Food_Quality_Control_Through_RFID.pdf; Jul. 29, 2017; pp. 1-2.

Chainlink Research; "Achieving Consistent Product Quality"; https://www.zestlabs.com/wp-content/uploads/2016/12/Quality-Management-For-Produce.pdf; Available as early as Dec. 2016; pp. 1-8.

Chainlink Research; "Measuring Produce Freshness: The Key to Preventing Waste"; https://www.zestlabs.com/wp-content/uploads/2016/03/Measuring-Produce-Freshness.pdf; Available as early as Mar. 2016; pp. 1-12.

Chainlink Research; "Preemptive Freshness Management"; https://www.zestlabs.com/wp-content/uploads/2017/03/Preemptive-Freshness-Management.pdf; Available as early as Mar. 2017; pp. 1-8.

Chainlink Research; "Blockchain's Role in the Produce Supply Chain"; https://www.zestlabs.com/wp-content/uploads/2018/01/Blockchains-Role-in-the-Produce-Supply-Chain.pdf; Available as early as Jan. 2018; pp. 1-20.

Chainlink Research; "Pallet-level Monitoring"; https://www.zestlabs.com/wp-content/uploads/2016/03/Pallet-Monitoring-for-the-Fresh-Food-Supply-Chain.pdf; Available as early as Mar. 2016; pp. 1-9.

Chainlink Research; "Why Quality Consistency Matters"; https://www.zestlabs.com/wp-content/uploads/2016/03/Why-Food-Supply-Chain-Quality-Matters-1.pdf; Available as early as Mar. 2016; pp. 1-10.

Cheng, Xuemei; "Hyperspectral Imaging and Pattern Recognition Technologies for Real Time Fruit Safety and Quality Inspection"; 2004; pp. 1-155.

Claussen, Ingrid C.; "Deliverable D.3.2.4.3 Literature review and experimental data of chilled, superchilled/supercooled fish quality and safety models"; http://www.frisbee-project.eu/images/result/FRISBEE_DEL_3-2-4-3.pdf; May 6, 2011; pp. 1-29.

Colmer, Christian; "Chill—ON! Transparent food quality all the way"; https://www.innovations-report.com/html/reports/medicine-health/chill-transparent-food-quality-168201.html; Oct. 1, 2011; pp. 1-5.

Cotillon, C.; "Deliverable 8.2.1.1 Publication in Scientific Journals"; http://www.frisbee-project.eu/images/result/FRISBEE_DEL_8.2.1.1.pdf; Oct. 27, 2011; pp. 1-5.

Cotillon, C.; "Deliverable 8.3.3.1 Mini conferences"; http://www.frisbee-project.eu/images/result/FRISBEE_DEL_8.3.3.1.pdf; Dec. 7, 2011; pp. 1-8.

Cotillon, C.; "Deliverable 8.6.1 Report on collaboration with other EU projects"; http://www.frisbee-project.eu/images/result/FRISBEE_DEL_8.6.1.pdf; Dec. 5, 2011; pp. 1-12.

(56) References Cited

OTHER PUBLICATIONS

Dada, Ali, et al.; "Sensor Applications in the Supply Chain: The Example of Quality-Based Issuing of Perishables"; The Internet of Things. Lecture Notes in Computer Science, edited by Christian Floerkemeier, et al.; vol. 4952; 2008; pp. 140-154.

Desmedt, Frederique; "Deliverable 8.1.1 Project logo, Leaflet and PowerPoint presentation"; http://www.frisbee-project.eu/images/result/FRISBEE_DEL_8.1.1.pdf; Nov. 19, 2010; pp. 1-30.

Desmedt, Frederique; "Deliverable 8.1.2 Project internet and intranet website"; http://www.frisbee-project.eu/images/result/FRISBEE_DEL_8.1.2.pdf; Mar. 3, 2011; pp. 1-9.

Dialog Search Results (Year: 2021).

Do Nascimento Nunes, M. C., et al.; "Improvement in fresh fruit and vegetable logistics quality: berry logistics field studies"; Philosophical Transactions of the Royal Society; http://dx.doi.org/10.1098/rsta.2013.0307; 2014; pp. 1-19.

Doyle, John P.; "Seafood Shelf Life as a Function of Temperature"; Alaska Sea Grant Marine Advisory Program; No. 30; 1989; pp. 1-6.

Evans, J.; "Deliverable D2.2.2 : Assessment of current refrigeration technologies of selected food industries and their potential improvement in current refrigeration"; http://www.frisbee-project.eu/images/result/FRISBEE_DEL_2-2-2.pdf; Jan. 30, 2012; pp. 1-181.

Evans, Judith et al.; "Deliverable D.2.2.3 : Analysis of potential of novel refrigeration technologies suitable for selected industries for application and improvement of food quality, energy consumption and environmental impact"; http://www.frisbee-project.eu/images/result/FRISBEE_DEL_2-2-3.pdf; Dec. 2, 2011; pp. 1-54.

Friedlos, Dave; "New Zealand Kiwifruit Processor Finds ROI"; https://www.rfidjournal.com/articles/view?4090; May 20, 2008; pp. 1-4.

Frisbee; "Frisbee european project—Archive"; https://web.archive.org/web/20180815100417/http://www.frisbee-project.eu/archive-results.html; Available as early as Aug. 15, 2018; pp. 1-5.

Frisbee; "Frisbee european project—Developing novel breakthrough technologies"; https://web.archive.org/web/20180316101206/http://www.frisbee-project.eu/research/92-developing-novel-breakthrough-technologies.html; Available as early Mar. 16, 2018; pp. 1-3.

Frisbee; "Frisbee european project—Frisbee at the Sixteenth Conference on Food Microbiology, Belgium"; http://www.frisbee-project.eu/news/40-frisbee-at-the-sixteenth-conference-on-food-microbiology.html; Nov. 15, 2011; pp. 1-1.

Frisbee; "Frisbee european project—Frisbee develops a Virtual Platform application"; http://www.frisbee-project.eu/news/90-frisbee-develops-a-virtual-platform-application.html; Mar. 18, 2013; pp. 1-1.

Frisbee; "Frisbee european project—Frisbee dissemination activities"; http://www.frisbee-project.eu/news/91-frisbee-dissemination-activities.html; Mar. 18, 2013; pp. 1-1.

Frisbee; "Frisbee european project—Frisbee on the starting-blocks"; http://www.frisbee-project.eu/news/49-frisbee-on-the-starting-blocks.html; Mar. 9, 2012; pp. 1-2.

Frisbee; "Frisbee european project—Frisbee welcomes New Members Advisory Board"; http://www.frisbee-project.eu/news/48-new-memers-advisory-board.html; Mar. 9, 2012; pp. 1-1.

Frisbee; "Frisbee european project—Frisbee: Latest Developments"; http://www.frisbee-project.eu/news/42-frisbee-project-latest-developments.html; Dec. 21, 2011; pp. 1-2.

Frisbee; "Frisbee european project—JOIN the first European Food Cold Chain Database!!!";http://www.frisbee-project.eu/news/55-database2.html; Jul. 9, 2012; pp. 1-2.

Frisbee; "Frisbee european project—Magnetic refrigeration technology. FRISBEE's experts team work on this disruptive technology"; https://web.archive.org/web/20180316101206/http://www.frisbee-project.eu/research/51-magnetic-refrigeration-technology.html; Available as early as Mar. 16, 2018; pp. 1-3.

Frisbee; "Frisbee european project—MEP-scientist pairing scheme"; http://www.frisbee-project.eu/news/41-mep-scientist-pairing-scheme.html; Dec. 20, 2011; pp. 1-2.

Frisbee; "Frisbee european project—Nanoparticles, a concentrate of energy: PCM nanoparticles where low temperatures are needed"; https://web.archive.org/web/20180316101206/http://www.frisbee-project.eu/research/27-nanoparticles-a-concentrate-of-energy.html; Available as early as Mar. 16, 2018; pp. 1-2.

Frisbee; "Frisbee european project—Project Overview"; https://web.archive.org/web/20120211082956/http://www.frisbee-project.eu/project-overview.html; Available as early as Feb. 11, 2012; pp. 1-1.

Frisbee; "Frisbee european project—Saving energy by refrigeration predictive control"; https://web.archive.org/web/20180316101206/http://www.frisbee-project.eu/research/52-saving-energy-by-refrigeration-predictive-control.html; Available as early as Mar. 16, 2018; pp. 1-3.

Frisbee; "Frisbee european project—Superchilling! A new technology to have your food products fresher than fresh"; https://web.archive.org/web/20180316101206/http://www.frisbee-project.eu/research/50-superchilling.html; Available as early as Mar. 16, 2018; pp. 1-3.

Frisbee; "Frisbee european project—Taking Europe's temperature: Cold chain database"; http://www.frisbee-project.eu/news/89-taking-europe%E2%80%99s-temperature-cold-chain-database.html; Mar. 18, 2013; pp. 1-2.

Frisbee; "Frisbee european project—Workpackages"; https://web.archive.org/web/20120210124516/http://www.frisbee-project.eu/workpackages.html; Available as early as Feb. 10, 2012; pp. 1-2.

Frisbee; "Simulate a cold chain"; https://frisbee-etool.irstea.fr; Available as early as 2020; pp. 1-3.

Gapud, Veny; "Food Safety Trends Exploring Implications of Mandatory Safety Standards in Retail and Foodservice"; https://www.foodsafetymagazine.com/magazine-archive1/december-2009january-2010/food-safety-trends-exploring-implications-of-mandatory-safety-standards-in-retail-and-foodservice/; Dec. 12, 2019; pp. 1-20.

Gaukler, Gary et al.; "Establishing Dynamic Expiration Dates for Perishables: An Application of RFID and Sensor Technology"; International Journal of Production Economics; vol. 193; Jul. 25, 2017; pp. 617-632.

GEIE/CEMA/ITP; "Deliverable D 8.3.1.3 Newsletter edited by GEIE for industrial use N°3"; http://www.frisbee-project.eu/images/result/FRISBEE_DEL_8.3.1.3.pdf; Mar. 13, 2012; pp. 1-10.

GEIE/CEMA/ITP; "Deliverable D8.3.1.2 Newsletter edited by GEIE for industrial use N°2"; http://www.frisbee-project.eu/images/result/FRISBEE_DEL_8.3.1.2.pdf; Oct. 27, 2011; pp. 1-10.

Giannakourou, M. C., et al.; "Application of a TTI-Based Distribution Management System for Quality Optimization of Frozen Vegetables at the Consumer End"; Journal of Food Science, vol. 68, Issue 1; Jan. 2003; pp. 201-209.

Haard, Norman F., et al.; "Characteristics of Edible Plant Tissues"; Food Chemistry, edited by Owen R. Fennema; 3rd Ed.; Marcel Dekker, Inc.; 1996; pp. 943-1011.

Hertog, M. L. A. T. M., et al.; "Shelf-life modelling for first-expired-first-out warehouse management"; Philosophical Transactions of the Royal Society; http://dx.doi.org/10.1098/rsta.2013.0306; 2014; pp. 1-15.

IBM; "DHL Breaks New Ground with RFID-Based Real-Time Tracking of Sensitive Shipments"; ftp://ftp.software.IBM.com/software/solutions/pdfs/ODC00298-USEN-00.pdf; Available as early as Mar. 2007; pp. 1-4.

Infratab; "Infratab Freshtime RF Sensor Blockchain Solutions for the Fresh Seafood Cold Chain"; https://web.aimglobal.org/external/wcpages/wcecommerce/eComItemDetailsPage.aspx?ItemID=656; 2019; pp. 1-5.

Jedermann, Reiner, et al.; "Communication techniques and challenges for wireless food quality monitoring"; Philosophical Transactions of the Royal Society; http://dx.doi.org/10.1098/ rsta.2013.0304; 2014; pp. 1-18.

Jedermann, Reiner, et al.; "Reducing food losses by intelligent food logistics"; Philosophical Transactions of the Royal Society; http://dx.doi.org/10.1098/rsta.2013.0302; 2014; pp. 1-20.

Kader, A. A.; "Pre- and Postharvest Factors Affecting Fresh Produce Quality, Nutritional Value, and Implications for Human Health";

(56) References Cited

OTHER PUBLICATIONS

Proceedings of the International Congress of Food Production and the Quality of Life, Sassari (Italy) Sep. 4-8, 2000, vol. 1, pp. 109-119.
Kader, Adel A., et al.; "Technologies to Extend the Refrigerated Shelf Life of Fresh Fruit"; Food Storage Stability, edited by Irwin A. Taub, et al.; Boca Raton; CRC Press; 1998; pp. 1-27.
Kader, Adel A.; "Postharvest Technology of Horticultural Crops"; 2002; 3rd Ed.; University of California Agriculture and Natural Resources; Oakland; 56 pages.
Kader, Adel A.; "Postharvest Technology of Horticultural Crops"; 2002; 3rd Ed.; University of California Agriculture and Natural Resources; Oakland; 74 pages.
Kader, Adel A.; "Postharvest Technology of Horticultural Crops"; 2002; 3rd Ed.; University of California Agriculture and Natural Resources; Oakland; pp. 113-196.
Kader, Adel A.; "Postharvest Technology of Horticultural Crops"; 2002; 3rd Ed.; University of California Agriculture and Natural Resources; Oakland; pp. 197-250.
Kader, Adel A.; "Postharvest Technology of Horticultural Crops"; 2002; 3rd Ed.; University of California Agriculture and Natural Resources; Oakland; pp. 251-314.
Kader, Adel A.; "Postharvest Technology of Horticultural Crops"; 2002; 3rd Ed.; University of California Agriculture and Natural Resources; Oakland; pp. 315-384.
Kader, Adel A.; "Postharvest Technology of Horticultural Crops"; 2002; 3rd Ed.; University of California Agriculture and Natural Resources; Oakland; pp. 385-434.
Kader, Adel A.; "Postharvest Technology of Horticultural Crops"; 2002; 3rd Ed.; University of California Agriculture and Natural Resources; Oakland; pp. 435-480.
Kader, Adel A.; "Postharvest Technology of Horticultural Crops"; 2002; 3rd Ed.; University of California Agriculture and Natural Resources; Oakland; pp. 67-112.
Ketzenberg, M., et al.; "Expiration Dates and Order Quantities for Perishables"; European Journal of Operational Research; vol. 266, Issue 2; Apr. 2018; pp. 569-584.
Ketzenberg, M., et al.; "Managing Perishables with Time and Temperature History"; Production and Operations Management; vol. 24, Issue 1; Jan. 2015; pp. 54-70.
Ketzenberg, M., et al.; "The Value of RFID Technology Enabled Information to Manage Perishables"; https://pdfs.semanticscholar.org/bded/16af2e689b4fdcea7f8421f6e012a6041324.pdf; Apr. 2009; pp. 1-37.
Kok Tas, Tugba; "Effects of different fermentation parameters on quality characteristics of kefir"; Journal of Dairy Science; vol. 96 No. 2; 2013; pp. 1-11.
Kong, F. et al.; "Chemical Deterioration and Physical Instability of Foods and Beverages"; The Stability and Shelf Life of Food, edited by Persis Subramaniam; 2nd Ed.; Woodhead Publishing; 2016; pp. 1-21.
Korpela, Kari; "Digital Supply Chain Transformation toward Blockchain Integration", https://scholarspace.manoa.hawaii.edu/bitstream/10125/41666/paper0517.pdf, dated Jan. 4, 2017, 20 pages.
Koutsoumanis, K., et al.; "Development of a safety monitoring and assurance system for chilled food product"; International Journal of Food Microbiology, vol. 100; 2005; pp. 253-260.
Labuza, T. P., et al.; "The Relationship Between Processing and Shelf Life"; Foods for the '90s, edited by Gordon G. Birch, et al.; Elsevier Applied Science; Aug. 1, 1990; pp. 1-21.
Leake, Linda L.; "The Search for Shelf Life Solutions"; https://www.ift.org/news-and-publications/food-technology-magazine/issues/2007/november/columns/laboratory?page=viewall; Nov. 1, 2007; pp. 1-8.
Malegori, Cristina; "Spectroscopy, Image Analysis and Hyperspectral Imaging for Food Safety and Quality: A Chemometric Approach"; Universita Degli Studi Di Milano; Anno Accademico 2014-2015; Available at least as early as Aug. 29, 2018; pp. 1-111.
McBeath, Bill; "Winning the Freshness Wars: Creating Shopper Loyalty and Improving Profitability in Retail Grocery"; https://www.zestlabs.com/wp-content/uploads/2016/11/ZL_WP_FreshnessWars_060415.pdf; Available as early as Feb. 2013; pp. 1-16.
Mehring, Peter; "Blockchain for Food Safety—Addressing the Challenges"; https://www.zestlabs.com/will-blockchain-solve-food-safety-challenges/; Sep. 26, 2018; pp. 1-4.
Mehring, Peter; "Zest Labs CEO Peter Mehring on the Walmart Lawsuit"; https://www.zestlabs.com/zest-labs-ceo-peter-mehring-walmart-lawsuit/; Aug. 1, 2018; pp. 1-4.
Nakasumi, Nakasumi; "Information Sharing for Supply Chain Management based on Block Chain Technology", https://ieeexplore.ieee.org/document/8010716, dated Jul. 27, 2017, 10 pages.
NBC Bay Area; "Tech Company Helps Inspect Food During Shutdown"; https://www.nbcbayarea.com/news/tech/tech-company-helps-inspect-food-during-shutdown_bay-area/4851; Jan. 11, 2019; pp. 1-6.
NRDC; "Wasted: How America is Losing up to 40 Percent of Its Food From Farm to Fork Landfill"; https://www.nrdc.org/sites/default/files/wasted-2017-report.pdf; Available as early as Aug. 2017; pp. 1-58.
Opatova, H.; "Deliverable 8.2.2.1 Organisation of a Workshop in Prague 2011 at International Congress of Refrigeration"; http://www.frisbee-project.eu/images/result/FRISBEE_DEL_8.2.2.1.pdf; Oct. 27, 2011; pp. 1-8.
Payne, Kevin; "Agriculture Technology and "The Messy Middle""; https://www.zestlabs.com/agriculture-technology-messy-middle/; Jun. 25, 2019; pp. 1-4.
Payne, Kevin; "Are You Ready to Make 2018 Your Best Year Ever?" https://www.zestlabs.com/are-you-ready-to-make-2018-your-best-year-ever/; Feb. 13, 2018; pp. 1-4.
Payne, Kevin; "Blockchain for Fresh Food Supply Chains—Reality Sets In?"; https://www.zestlabs.com/blockchain-fresh-supply-chains-reality/; May 7, 2019; pp. 1-4.
Payne, Kevin; "Cold Chain Visibility: Who's Winning the Freshness Wars?"; https://www.zestlabs.com/cold-chain-visibility-freshness-wars/; Apr. 9, 2019; pp. 1-4.
Payne, Kevin; "Cold Supply Chain Variability—The Impact of Delays"; https://www.zestlabs.com/cold-supply-chain-variability/; Apr. 23, 2019; pp. 1-4.
Payne, Kevin; "Earth Day 2019 and Looking Ahead to 2020"; https://www.zestlabs.com/earth-day-2019/; Apr. 30, 2019; pp. 1-4.
Payne, Kevin; "Finding the Right Tools: Can Blockchain and IOT Fix the Fresh Food Supply Chain?—Register for the Webinar"; https://www.zestlabs.com/finding-the-right-tools-can-blockchain-and-iot-fix-the-fresh-food-supply-chain-register-for-the-webinar/; Feb. 27, 2018; pp. 1-4.
Payne, Kevin; "Food Grower And Supplier Challenges: The Top 10"; https://www.zestlabs.com/food-growers-suppliers-challenges/; Feb. 19, 2019; pp. 1-4.
Payne, Kevin; "Food Labels and Food Waste—A Solution"; https://www.zestlabs.com/food-labels-food-waste/; Mar. 12, 2019; pp. 1-4.
Payne, Kevin; "Food Safety Tips: Three Things to Consider"; https://www.zestlabs.com/food-safety-tips-three-things-to-consider/; Jul. 2, 2019; pp. 1-4.
Payne, Kevin; "Fresh Produce and Health: What's the Connection?"; https://www.zestlabs.com/fresh-produce-health-interrelationship/; Apr. 2, 2019; pp. 1-4.
Payne, Kevin; "Grocery Shopper Trends 2019: Key Insights"; https://www.zestlabs.com/grocery-shopper-trends-2019-key-insights/; Jul. 23, 2019; pp. 1-4.
Payne, Kevin; "How to Feed a Hungry Planet: Food for Thought"; https://www.zestlabs.com/feed-a-hungry-planet/; Aug. 6, 2019; pp. 1-4.
Payne, Kevin; "Hyped Up? Blockchain and Why a Hybrid Model is Best"; https://www.zestlabs.com/hyped-up-blockchain-the-fresh-food-supply-chain-and-why-a-hybrid-model-is-best/; Jan. 30, 2018; pp. 1-4.
Payne, Kevin; "I'll Never Look at Strawberries the Same Way"; https://www.zestlabs.com/ill-never-look-at-strawberries-the-same-way/; Dec. 15, 2017; pp. 1-4.
Payne, Kevin; "Improving Operational Efficiency: TQM for the Fresh Food Supply Chain"; https://www.zestlabs.com/improving-operational-efficiency-deming-drucker/; Aug. 27, 2019; pp. 1-4.

(56) References Cited

OTHER PUBLICATIONS

Payne, Kevin; "Increasing Trucking Costs Further Squeezes Grocery Margins—Don't Waste Your Money!" https://www.zestlabs.com/increasing-trucking-costs-further-squeezes-grocery-margins-dont-waste-your-money/; Feb. 6, 2018; pp. 1-4.
Payne, Kevin; "IoT Sensors and Reducing Food Waste"; https://www.zestlabs.com/iot-sensors-reduce-food-waste/; Feb. 12, 2019; pp. 1-4.
Payne, Kevin; "Millennials Want True Transperency"; https://www.zestlabs.com/millennials-want-true-transparency/; Jan. 9, 2018; pp. 1-4.
Payne, Kevin; "Myth Busting: Produce Shrink is Caused at the Store"; https://www.zestlabs.com/myth-busting-produce-shrink-occurs-at-the-store/; Feb. 20, 2018; pp. 1-4.
Payne, Kevin; "New Verizon Ad Sheds Light on Important Food Safety Issues"; https://www.zestlabs.com/new-verizon-ad-sheds-light-on-important-food-safety-issues/; Dec. 15, 2017; pp. 1-4.
Payne, Kevin; "New Zest Fresh for Produce Modules: Rapid Implementations and Faster ROI"; https://www.zestlabs.com/zest-fresh-produce-modules/; Jul. 10, 2019; pp. 1-4.
Payne, Kevin; "Online Grocery Shopping Options Abound But . . . "; https://www.zestlabs.com/online-grocery-shopping/; Feb. 5, 2019; pp. 1-4.
Payne, Kevin; "Preventing Food Waste: Multiple Approaches"; https://www.zestlabs.com/preventing-food-waste-multiple-approaches/; Jul. 16, 2019; pp. 1-4.
Payne, Kevin; "Proactive Food Safety: Moving the Industry Forward"; https://www.zestlabs.com/proactive-food-safety/; Aug. 13, 2019; pp. 1-4.
Payne, Kevin; "Produce Marketing: Brandstorm Offers A Wealth Of Insights"; https://www.zestlabs.com/produce-marketing-ideas; Feb. 26, 2019; pp. 1-4.
Payne, Kevin; "Reducing Fresh Food Waste: Addressing the Problem"; https://www.zestlabs.com/reducing-fresh-food-waste-problem/; Mar. 5, 2019; pp. 1-4.
Payne, Kevin; "Rethinking Food Safety and the Supply Chain"; https://www.zestlabs.com/rethinking-food-safety-supply-chain/; May 14, 2019; pp. 1-5.
Payne, Kevin; "Salad Kits: How to Ensure Freshness"; https://www.zestlabs.com/salad-kits-fresh/; Apr. 16, 2019; pp. 1-4.
Payne, Kevin; "Shelf-life Variability at Grocery Stores: Half-bad is Not Good"; https://www.zestlabs.com/shelf-life-variability-among-leading-grocery-stores/; Jun. 10, 2019; pp. 1-4.
Payne, Kevin; "Start the Year Fresh!" https://www.zestlabs.com/start-the-year-fresh/; Jan. 16, 2018; pp. 1-4.
Payne, Kevin; "Supply Chain Waste: Can We Fix the Problem? (Yes)"; https://www.zestlabs.com/supply-chain-waste/; Jul. 30, 2019; pp. 1-5.
Payne, Kevin; "Sustainability and the Supply Chain"; https://www.zestlabs.com/sustainability-supply-chain/; Jun. 18, 2019; pp. 1-4.
Payne, Kevin; "Sustainability or Greenwashing" https://www.zestlabs.com/sustainability-or-greenwashing/; Jan. 23, 2018; pp. 1-4.
Payne, Kevin; "The "Best If Used By" Date Label: Will It Reduce Food Waste?"; https://www.zestlabs.com/best-if-used-by-date-label/; Jun. 4, 2019; pp. 1-4.
Payne, Kevin; "The Emergence of Brand Marketing in Produce"; https://www.zestlabs.com/brand-marketing-produce/; Aug. 20, 2019; pp. 1-4.
Payne, Kevin; "The Grocery Shopping Experience: Fresh Foods, Fresh Ideas"; https://www.zestlabs.com/grocery-shopping-experience-fresh-foods/; May 21, 2019; pp. 1-4.
Payne, Kevin; "To Use or Not to Use—What's Up With Date Labels" https://www.zestlabs.com/date-label/; Jan. 2, 2018; pp. 1-4.
Payne, Kevin; "Want to Improve Your Grocery Margins? Take a Look at Your Supply Chain"; https://www.zestlabs.com/want-to-improve-your-grocery-margins-take-a-look-at-your-supply-chain/; Dec. 19, 2017; pp. 1-4.
Payne, Kevin; "World Hunger Day 2019: Sustainability"; https://www.zestlabs.com/world-hunger-day-2019-sustainability/; May 28, 2019; pp. 1-4.
Payne, Kevin; "Your Technology Roadmap for Digital Transformation"; https://www.zestlabs.com/technology-roadmap/; Mar. 26, 2019; pp. 1-4.
Payne, Kevin; "A Picture Is Worth . . . "; https://www.zestlabs.com/a-picture-is-worth/; Apr. 3, 2018; pp. 1-4.
Payne, Kevin; "Before and After—The Benefits of Digital Transformation"; https://www.zestlabs.com/benefits-digital-transformation/; Jan. 29, 2019; pp. 1-5.
Payne, Kevin; "Being Proactive: What We Can Learn from Football"; https://www.zestlabs.com/being-proactive-learn-from-football/; Jul. 17, 2018; pp. 1-4.
Payne, Kevin; "Digital Transformation Technology: Is It Finally Time?"; https://www.zestlabs.com/digital-transformation-technology/; Aug. 7, 2018; pp. 1-4.
Payne, Kevin; "Experience the Many Benefits of Family Meals"; https://www.zestlabs.com/benefits-family-meals/; Sep. 3, 2019; pp. 1-4.
Payne, Kevin; "First Principles Thinking and the Fresh Food Supply Chain"; https://www.zestlabs.com/first-principles-thinking/; Oct. 2, 2018; pp. 1-4.
Payne, Kevin; "Five Days? The Causes of Shelf-life Variability"; https://www.zestlabs.com/five-days-shelf-life-variability/; Nov. 20, 2018; pp. 1-4.
Payne, Kevin; "Food Service Delivery: This Isn't What I Ordered!"; https://www.zestlabs.com/isnt-what-ordered/; Aug. 28, 2018; pp. 1-4.
Payne, Kevin; "Food Spoilage: The Impact On Your Business"; https://www.zestlabs.com/food-spoilage-impact-business/; Jan. 15, 2019; pp. 1-4.
Payne, Kevin; "Food Sustainability Goals: Noble But Are They Viable?"; https://www.zestlabs.com/food-sustainability-goals/; Aug. 14, 2018; pp. 1-4.
Payne, Kevin; "Fresh Food Industry Trends 2019—Our Predictions"; https://www.zestlabs.com/fresh-food-industry-trends-2019/; Jan. 2, 2019; pp. 1-4.
Payne, Kevin; "Fresh Food Industry Trends from 2018"; https://www.zestlabs.com/fresh-food-industry-trends-2018/; Dec. 11, 2018; pp. 1-4.
Payne, Kevin; "Fresh Food Sustainability—It's More Than Field to Fork"; https://www.zestlabs.com/fresh-food-sustainability/; Jan. 22, 2019; pp. 1-4.
Payne, Kevin; "Freshness Capacity: Strawberries Are Like Your Cell Phone . . . "; https://www.zestlabs.com/your-fresh-strawberries-are-like-your-cellphone/; Jul. 10, 2018; pp. 1-4.
Payne, Kevin; "Grocers Are Applying Artificial Intelligence"; https://www.zestlabs.com/grocers-turning-artificial-intelligence/; Oct. 9, 2018; pp. 1-4.
Payne, Kevin; "Growers And Suppliers—What Really Happens In The Food Supply Chain"; https://www.zestlabs.com/what-happens-fresh-food-supply-chain/; Apr. 24, 2018; pp. 1-5.
Payne, Kevin; "Improving Post-Harvest Operational Efficiency"; https://www.zestlabs.com/improving-operational-efficiency/; Sep. 18, 2018; pp. 1-4.
Payne, Kevin; "Is Your Fresh Food Supply Chain Stuck In The '60s?"; https://www.zestlabs.com/is-your-fresh-food-supply-chain-stuck-in-the-60s/; Mar. 13, 2018; pp. 1-4.
Payne, Kevin; "It's (Past) Time for Freshness Management"; https://www.zestlabs.com/managing-fresh-food-shelf-life/; Nov. 27, 2018; pp. 1-4.
Payne, Kevin; "It's Like Waze For The Fresh Food Supply Chain"; https://www.zestlabs.com/waze-fresh-food-supply-chain/; Apr. 10, 2018; pp. 1-5.
Payne, Kevin; "Let's Celebrate National Salad Month!"; https://www.zestlabs.com/lets-celebrate-national-salad-month/; May 1, 2018; pp. 1-4.
Payne, Kevin; "Let's Start At The Beginning"; https://www.zestlabs.com/lets-start-at-the-beginning/; May 15, 2018; pp. 1-4.
Payne, Kevin; "Margins Matter—Don't Get Squeezed"; https://www.zestlabs.com/6931-2/; Apr. 17, 2018; pp. 1-4.
Payne, Kevin; "Perishable Food Waste Cuts Profits & Raises Greenhouse Gases"; https://www.zestlabs.com/food-waste-profits-greenhouse-gases/; Sep. 11, 2018; pp. 1-4.

(56) References Cited

OTHER PUBLICATIONS

Payne, Kevin; "PMA Fresh Summit 2018—Wow!"; https://www.zestlabs.com/pma-fresh-summit/; Oct. 23, 2018; pp. 1-4.
Payne, Kevin; "PMA's Fresh Summit: Eat Up!"; https://www.zestlabs.com/pma-fresh-summit-2018/; Oct. 16, 2018; pp. 1-4.
Payne, Kevin; "Poor Quality Produce: Never Going Back Again"; https://www.zestlabs.com/never-going-back-again/; Jul. 3, 2018; pp. 1-4.
Payne, Kevin; "Premature Food Spoilage: Uh Oh, It's the Fuzz!"; https://www.zestlabs.com/uh-oh-its-the-fuzz/; Jun. 19, 2018; pp. 1-4.
Payne, Kevin; "Produce Shelf Life Extenders and Fresh Food Waste"; https://www.zestlabs.com/shelf-life-extenders-food-waste/; Nov. 13, 2018; pp. 1-4.
Payne, Kevin; "Refed: Committed to Reducing U.S. Food Waste"; https://www.zestlabs.com/refed-committed-reducing-waste/; Oct. 30, 2018; pp. 1-4.
Payne, Kevin; "Romaine Lettuce Labeling—Zest Fresh Can Help"; https://www.zestlabs.com/romaine-lettuce-labeling/; Dec. 4, 2018; pp. 1-4.
Payne, Kevin; "Saving Money Day 1—Invest $1, Get $9 Back";https://www.zestlabs.com/saving-money-day-1/; Nov. 6, 2018; pp. 1-4.
Payne, Kevin; "September Is National Family Meals Month"; https://www.zestlabs.com/september-family-meals-month/; Sep. 4, 2018; pp. 1-4.
Payne, Kevin; "Shelf-life Variability in Produce: The Five Causes"; https://www.zestlabs.com/shelf-life-variability-produce-five-causes/; Jan. 8, 2019; pp. 1-4.
Payne, Kevin; "Solving the Problem of Fresh Produce Waste"; https://www.zestlabs.com/solving-problem-fresh-food-waste/; Dec. 18, 2018; pp. 1-4.
Payne, Kevin; "Stay Cool! (And Visit US at United Fresh!)"; https://www.zestlabs.com/stay-cool-and-visit-us-at-united-fresh/; Jun. 5, 2018; pp. 1-4.
Payne, Kevin; "Stop Doing That!"; https://www.zestlabs.com/stop-doing-that/; May 29, 2018; pp. 1-4.
Payne, Kevin; "Supply Chain Performance: The Fox and the Henhouse"; https://www.zestlabs.com/fox-hen-house/; Jun. 26, 2018; pp. 1-4.
Payne, Kevin; "The Fresh Food Industry and Charles Darwin"; https://www.zestlabs.com/charles-darwin-fresh-food-industry/; Aug. 21, 2018; pp. 1-4.
Payne, Kevin; "The Game of (Shelf) Life"; https://www.zestlabs.com/game-shelf-life/; Sep. 25, 2018; pp. 1-4.
Payne, Kevin; "Timing Is Everything—The Impact Of Cut-To-Cool Time On Freshness"; https://www.zestlabs.com/timing-is-everything-the-impact-of-cut-to-cool-time-on-freshness/; May 8, 2018; pp. 1-5.
Payne, Kevin; "What to do to Build Grocery Store Loyalty?"; https://www.zestlabs.com/grocery-store-loyalty/; Jul. 24, 2018; pp. 1-4.
Payne, Kevin; "What? No Bacon? (Cue Ominous Music)"; https://www.zestlabs.com/what-no-bacon-cue-ominous-music/; Mar. 6, 2018; pp. 1-5.
Payne, Kevin; "What's In The Bag?"; https://www.zestlabs.com/whats-in-the-bag/; May 22, 2018; pp. 1-4.
Payne, Kevin; "Where's The Beef (Been)?"; https://www.zestlabs.com/wheres-the-beef-been/; Mar. 27, 2018; pp. 1-5.
Payne, Kevin; "Zest Labs Offers Fresh Wishes for the New Year"; https://www.zestlabs.com/zest-labs-fresh-wishes-new-year/; Dec. 24, 2018; pp. 1-4.
PCT; App. No. PCT/US2019/045461; International Search Report and Written Opinion mailed Oct. 10, 2019; (90 pages).
PCT; App. No. PCT/US2020/041896; International Search Report and Written Opinion mailed Oct. 13, 2020; (18 pages).
Peng et al. Postharvest Biology and Technology. Analysis of spatially resolved hyperspectral scattering images for assessing apple fruit firmness and soluble solids content. Apr. 30, 2008 (Apr. 30, 2008). [retrieved on Sep. 23, 2020). Retrieved from the Internet: <URL: https://pubag.nal.usda.gov/download/18221/PDF> pp. 52-62.
ReFED; "A Roadmap to Reduce U.S. Food Waste by 20 Percent"; https://www.refed.com/downloads/ReFED_Report_2016.pdf; 2016; pp. 1-96.
ReFED; "Restaurant Food Waste Action Guide"; https://www.refed.com/downloads/Restaurant_Guide_Web.pdf; 2018; pp. 1-44.
Robertson, Gordon L.; "Food Packaging: Principles and Practice"; 3rd Ed.; Boca Raton; CRC Press; 2013; pp. 1-33.
Ruiz-Garcia, Luis et al.; "Monitoring Cold Chain Logistics by Means of RFID"; http://cdn.intechweb.org/pdfs/8493.pdf; Feb. 1, 2010; pp. 1-16.
Ryan, John; "Why Blockchain Will Be Used to Improve Distribution Food Safety, Quality, and Traceability"; https://www.foodsafetymagazine.com/enewsletter/why-blockchain-will-be-used-to-improve-distribution-food-safety-quality-and-traceability/; Feb. 5, 2019; pp. 1-3.
Sadouskaya, Krystsina; "Adoption of Blockchain Technology in Supply Chain and Logistics", https://www.theseus.fi/bitstrearn/handle/10024/126096/Adoption%20of%20Blockchain%20Technology%20in%20Supply%20Chain%20and%20Logistics.pdf?sequence=1?; dated Apr. 30, 2017, 45 pages.
Saputro et al. 2017 International Conference on Electrical Engineering and Informatics. Wavelength selection in hyperspectral imaging for prediction banana fruit quality. Oct. 20, 2017 (Oct. 20, 2017). [retrieved on Sep. 23, 2020]. Retrieved from the Internet: <URL: https://ieeexplore.ieee.org/document/8253259> pp. 226-230.
Scalco, Dan; "5 Ways to Ensure Meals Stay Fresh and Safe in Transit"; https://www.zestlabs.com/meals-stay-fresh-safe-transit/; Jun. 12, 2018; pp. 1-4.
Scotto Di Tella, F.; "Deliverable D8.3.1.1 Newsletter edited by GEIE for industrial use N°1"; http://www.frisbee-project.eu/images/result/FRISBEE_DEL_8.3.1.1.pdf; May 6, 2011; pp. 1-9.
Shacklett, Mary; "Customer Retention and Growth in Today's Competitive Retail Grocery Environment"; https://www.zestlabs.com/downloads/Food-Freshness-and-Customer-Satisfaction-Transworld-Research-April-2019.pdf; Apr. 2019; pp. 1-7.
Shacklett, Mary; "Improving Profits and Operational Efficiency on the Farm"; https://www.zestlabs.com/downloads/Improving-Operational-Efficiency-on-the-Farm-Transworld-Research-2018.pdf; Available as early as 2018; pp. 1-6.
Shacklett, Mary; "Optimizing Profit Margins in a Changing Retail Grocery Industry"; https://www.zestlabs.com/downloads/Optimizing-Profit-Margins-Transworld.pdf; 2018; pp. 1-10.
Siawsolit, Chokdee et al.; "The Value of Demand Information in Omni-Channel Grocery Retailing"; https://www.researchgate.net/publication/331048136_The_Value_of_Demand_Information_in_Omni-Channel_Grocery_Retailing; Available as early as Jan. 2019; pp. 1-11.
Singh, R. P.; "Scientific Principles of Shelf-Life Evaluation"; Shelf-Life Evaluation of Foods, edited by Dominic Man, et al.; 2nd Ed .; Aspen Publishers, Inc.; 2000; pp. 1-23.
Singh, R. Paul et al.; "Introduction to Food Engineering"; 5th Ed.; Academic Press; 2014; pp. 1-31.
Stahl, Valerie et al.; "Deliverable D.3.2.4.2 Literature review and experimental data of chilled and frozen meat quality and safety models"; http://www.frisbee-project.eu/images/result/FRISBEE_DEL_3.2.4.2.pdf; Jun. 6, 2011; pp. 1-28.
Sunny George, Gwanpua; "Deliverable D3.2.4.1 Literature review and experimental data of chilled apple quality models"; http://www.frisbee-project.eu/images/result/FRISBEE_DEL_3.2.4.1.pdf; Mar. 1, 2011; pp. 1-24.
Swedberg, Claire; "DOD Considers RFID-based Solutions for Tracking Food's Shelf Life"; https://www.rfidjournal.com/articles/pdf?11423; Feb. 11, 2014; pp. 1-3.
Swedberg, Claire; "Researchers Seek to Reduce Wastage for First-Strike Rations"; https://www.rfidjournal.com/articles/pdf?9162; Jan. 26, 2012; pp. 1-4.
Swedberg, Claire; "Schuitema Ponders Future of Fresh-Chain Pilot"; https://www.rfidjournal.com/articles/pdf?3793; Dec. 10, 2007; pp. 1-4.
Swedberg, Claire; "Starbucks Keeps Fresh with RFID"; https://www.rfidjournal.com/articles/view?2890; Dec. 13, 2006; pp. 1-1.

(56) References Cited

OTHER PUBLICATIONS

Taoukis, P. S., et al.; "Applicability of Time-Temperature Indicators as Shelf Life Monitors of Food Products"; Journal of Food Science; vol. 54, Issue 4; Jul. 1989; pp. 783-788.
Taoukis, P. S., et al.; "Use of time-temperature integrators and predictive modelling for shelf life control of chilled fish under dynamic storage conditions"; International Journal of Food Microbiology, vol. 53; 1999; pp. 21-31.
Taoukis, Petros et al.; "Deliverable D.2.1.2 Temperature monitoring techniques and traceability systems along the cold chain";http://www.frisbee-project.eu/images/result/FRISBEE_DEL_2%201%202.pdf; Jul. 26, 2011; pp. 1-28.
Taoukis, Petros; "Deliverable D 3.2.4.4 Literature review and experimental data of frozen milk products and vegetables quality models"; http://www.frisbee-project.eu/images/result/FRISBEE_DEL_3-2-4-4.pdf; Jun. 6, 2011; pp. 1-24.
This New World By Huffpost; "Eating Ugly: The Food Waste That Could Refeed America"; https://www.facebook.com/ThisNewWorldHuffPost/videos/428476821288487; Apr. 22, 2019; pp. 1-9.
trust in FOOD™; "Sustainability Research Report 2019"; https://www.zestlabs.com/downloads/Trust-In-Food-Sustainability-Survey-2019.pdf; Available as early as Jul. 18, 2019; pp. 1-19.
U.S. Appl. No. 16/534,538; Notice of Allowance and Fees Due (PTOL-85) mailed Oct. 28, 2021; (10 pages).
U.S. Appl. No. 16/534,538; Office Action mailed Jan. 29, 2021; (56 pages).
U.S. Appl. No. 16/534,538; Office Action mailed Oct. 9, 2020; (57 pages).
U.S. Appl. No. 17/673,508; Notice of Allowance and Fees Due (PTOL-85) mailed May 23, 2023; (9 pages).
U.S. Appl. No. 17/673,508; Notice of Allowance and Fees Due (PTOL-85) mailed Sep. 20, 2023; (8 pages).
Wells, John H. et al.; "Quality Management During Storage and Distribution"; Food Storage Stability, edited by Irwin A. Taub, et al.; Boca Raton; CRC Press; 1998; pp. 1-29.
Wells, John H., et al.; "A Kinetic Approach to Food Quality Prediction using Full-History Time-Temperature Indicators"; Journal of Food Science; vol. 53, Issue 6; Nov. 1988; pp. 1866-1871.
Wells, John H., et al.; "A Quality-Based Inventory Issue Policy For Perishable Foods"; Journal of Food Processing & Preservation; vol. 12, Issue 4; Jan. 1989; pp. 271-292.
Wells, John H., et al.; "Temperature Tolerance of Foods during Distribution"; Handbook of Food Engineering Practice, edited by Kenneth J. Valentas, et al.; Boca Raton; CRC Press; 1997; pp. 1-29.
Wells, John H., et al.; "The Application of Time-Temperature Indicator Technology to Food Quality Monitoring and Perishable Inventory Management"; Mathematical Modelling of Food Processing Operations, edited by Stuart Thorne; Elsevier Applied Science; 1992; pp. 1-41.
Wells, John Henry, et al.; "Application of Time-Temperature Indicators in Monitoring Changes in Quality Attributes of Perishable and Semiperishable Foods"; Journal of Food Science; vol. 53, Issue 1; Jan. 1988; pp. 148-152, 156.
Weston, L.A. et al.; "Preharvest Factors Affecting Postharvest Quality of Vegetables"; HortScience; vol. 32(5), Aug. 1997, pp. 812-816.
Williamson, Katie et al.; "Climate Change Needs Behavior Change"; https://www.zestlabs.com/downloads/2018-CCNBC-Report.pdf; 2018; pp. 1-22.
Zelem, MC.; "Deliverable D.2.3.1 National legal and ethical requirements for the surveys"; http://www.frisbee-project.eu/images/result/FRISBEE_DEL_2.3.1.pdf; Jun. 23, 2011; pp. 1-68.
*Zest Labs, Inc.* v *Walmart*; Bohling, Joshua; "Transcript of the Testimony of Bohling, Joshua"; Bushman Court Reporting; Case No. 4:18-CV-00500-JM; Aug. 15-16, 2019; pp. 5-6, 47-48, 52-69, 78, 80-82, 85, 87, 98-102, 107-134, 137-145, 158-163, 182-184, 209-210, 233-234, 239-242, 246, and 357.

*Zest Labs, Inc.* v *Walmart*; Dickinson, Q. Todd; "Expert Report of Q. Todd Dickinson"; United States District Court for the Eastern District of Arkansas; Case No. 4:18-CV-00500-JM; Oct. 29, 2019; pp. 1-33.
*Zest Labs, Inc.* v *Walmart*; ECF No. 002; Zest Labs, Inc. et al.; "Motion for Leave to File Complaint Under Seal and to Establish Briefing Schedule Relating to Potentially Confidential Information in Complaint"; United States District Court for the Eastern District of Arkansas; Case No. 4:18-CV-00500-JM; Aug. 1, 2018; pp. 1-4.
*Zest Labs, Inc.* v *Walmart*; ECF No. 003; Zest Labs, Inc. et al.; "Brief in Support of Motion for Leave to File Complaint Under Seal and to Establish Briefing Schedule Relating to Potentially Confidential Information Complaint"; United States District Court for the Eastern District of Arkansas; Case No. 4:18-CV-00500-JM; Aug. 1, 2018; pp. 1-4.
*Zest Labs, Inc.* v *Walmart*; ECF No. 035; Walmart; "Defendant's Response to Plaintiffs' Motion for Leave to File Complaint Under Seal"; United States District Court for the Eastern District of Arkansas; Case No. 4:18-CV-00500-JM; Aug. 27, 2018; pp. 1-3.
*Zest Labs, Inc.* v *Walmart*; ECF No. 038; Zest Labs, Inc. et al.; "Plaintiffs' Reply in Support of Plaintiffs' Motion for Leave to File Complaint Under Seal"; United States District Court for the Eastern District of Arkansas; Case No. 4:18-CV-00500-JM; Aug. 31, 2018; pp. 1-3.
*Zest Labs, Inc.* v *Walmart*; ECF No. 041; Walmart; "Defendant's Motion for Leave to File Under Seal"; United States District Court for the Eastern District of Arkansas; Case No. 4:18-CV-00500-JM; Sep. 4, 2018; pp. 1-3.
*Zest Labs, Inc.* v *Walmart*; Ecf No. 098; Walmart; "Defendant's Brief in Support of Its Motion for Protective Order and to Compel Identification of Alleged Trade Secrets"; United States District Court for the Eastern District of Arkansas; Case No. 4:18-CV-00500-JM; Feb. 11, 2019; pp. 1-29.
*Zest Labs, Inc.* v *Walmart*; ECF No. 101-01; Sammi, P. Anthony; "Exhibit A"; United States District Court for the Eastern District of Arkansas; Case No. 4:18-CV-00500-JM; Feb. 15, 2019; pp. 1-3.
*Zest Labs, Inc.* v *Walmart*; ECF No. 101-02; Tulin, Edward L.; "Exhibit B"; United States District Court for the Eastern District of Arkansas; Case No. 4:18-CV-00500-JM; Feb. 15, 2019; pp. 1-4.
*Zest Labs, Inc.* v *Walmart*; ECF No. 101-03; Tulin, Edward L.; " Exhibit C"; United States District Court for the Eastern District of Arkansas; Case No. 4:18-CV-00500-JM; Feb. 15, 2019; pp. 1-5.
*Zest Labs, Inc.* v *Walmart*; ECF No. 101-04; Zest Labs, Inc. et al.; "Exhibit D Filed Under Seal Pursuant to Order Dated Sep. 7, 2018"; United States District Court for the Eastern District of Arkansas; Case No. 4:18-CV-00500-JM; Feb. 15, 2019; 1 page.
*Zest Labs, Inc.* v *Walmart*; ECF No. 101-05; Zest Labs, Inc. et al.; "Exhibit E Filed Under Seal Pursuant to Order Dated Sep. 7, 2018"; United States District Court for the Eastern District of Arkansas; Case No. 4:18-CV-00500-JM; Feb. 15, 2019; 1 page.
*Zest Labs, Inc.* v *Walmart*; ECF No. 101; Zest Labs, Inc. et al.; "Plaintiffs' Brief in Opposition To Defendant's Motion for Protective Order and to Compel Identification of Trade Secrets"; United States District Court for the Eastern District of Arkansas; Case No. 4:18-CV-00500-JM; Feb. 15, 2019; pp. 1-28.
*Zest Labs, Inc.* v *Walmart*; ECF No. 102-01; Zest Labs, Inc. et al.; "Exhibit A"; United States District Court for the Eastern District of Arkansas; Case No. 4:18-CV-00500-JM; Feb. 20, 2019; pp. 1-28.
*Zest Labs, Inc.* v *Walmart*; ECF No. 102-02; Walmart; "Exhibit B"; United States District Court for the Eastern District of Arkansas; Case No. 4:18-CV-00500-JM; Feb. 20, 2019; pp. 1-59.
*Zest Labs, Inc.* v *Walmart*; ECF No. 102-03; Zest Labs, Inc. et al.; "Exhibit C Filed Under Seal"; United States District Court for the Eastern District of Arkansas; Case No. 4:18-CV-00500-JM; Feb. 20, 2019; 1 page.
*Zest Labs, Inc.* v *Walmart*; ECF No. 102-04; Walmart; "Exhibit D"; United States District Court for the Eastern District of Arkansas; Case No. 4:18-CV-00500-JM; Feb. 20, 2019; pp. 1-10.
*Zest Labs, Inc.* v *Walmart*; ECF No. 102-06; Zest Labs, Inc. et al.; "Exhibit F Filed Under Seal"; United States District Court for the Eastern District of Arkansas; Case No. 4:18-CV-00500-JM; Feb. 20, 2019; 1 page.

(56) References Cited

OTHER PUBLICATIONS

*Zest Labs, Inc.* v *Walmart*; ECF No. 102-07; Zest Labs, Inc. et al.; "Exhibit G Filed Under Seal"; United States District Court for the Eastern District of Arkansas; Case No. 4:18-CV-00500-JM; Feb. 20, 2019; 1 page.

*Zest Labs, Inc.* v *Walmart*; ECF No. 102-08; Williams, Fred I .; "Exhibit H"; United States District Court for the Eastern District of Arkansas; Case No. 4:18-CV-00500-JM; Feb. 20, 2019; pp. 1-5.

*Zest Labs, Inc.* v *Walmart*; ECF No. 102-09; Simons, Michael; "Exhibit I"; United States District Court for the Eastern District of Arkansas; Case No. 4:18-CV-00500-JM; Feb. 20, 2019; pp. 1-8.

*Zest Labs, Inc.* v *Walmart*; ECF No. 102-10; Williams, Fred I.; "Exhibit J"; United States District Court for the Eastern District of Arkansas; Case No. 4:18-CV-00500-JM; Feb. 20, 2019; pp. 1-4.

*Zest Labs, Inc.* v *Walmart*; ECF No. 102-11; Simons, Michael; "Exhibit K"; United States District Court for the Eastern District of Arkansas; Case No. 4:18-CV-00500-JM; Feb. 20, 2019; pp. 1-2.

*Zest Labs, Inc.* v *Walmart*; ECF No. 102-12; Tulin, Edward L .; "Exhibit L"; United States District Court for the Eastern District of Arkansas; Case No. 4:18-CV-00500-JM; Feb. 20, 2019; pp. 1-4.

*Zest Labs, Inc.* v *Walmart*; ECF No. 102-13; Sammi, P. Anthony; "Exhibit M"; United States District Court for the Eastern District of Arkansas; Case No. 4:18-CV-00500-JM; Feb. 20, 2019; pp. 1-3.

*Zest Labs, Inc.* v *Walmart*; ECF No. 102-14; Sammi, P. Anthony; "Exhibit N"; United States District Court for the Eastern District of Arkansas; Case No. 4:18-CV-00500-JM; Feb. 20, 2019; pp. 1-3.

*Zest Labs, Inc.* v *Walmart*; ECF No. 102; Zest Labs, Inc. et al.; "Plaintiffs' Motion to Compel Supplemental Responses to Interrogatories and Requests for Production From Defendant"; United States District Court for the Eastern District of Arkansas; Case No. 4:18-CV-00500-JM; Feb. 20, 2019; pp. 1-6.

*Zest Labs, Inc.* v *Walmart*; ECF No. 103; Zest Labs, Inc. et al.; "Plaintiffs' Brief in Support of Motion to Compel Supplemental Responses to Interrogatories and Requests for Production From Defendant"; United States District Court for the Eastern District of Arkansas; Case No. 4:18-CV-00500-JM; Feb. 20, 2019; pp. 1-24.

*Zest Labs, Inc.* v *Walmart*; ECF No. 105-1; Walmart; "Exhibit A—Filed Under Seal Pursuant to Order Dated Sep. 7, 2018"; United States District Court for the Eastern District of Arkansas; Case No. 4:18-CV-00500-JM; Feb. 25, 2019; 1 page.

*Zest Labs, Inc.* v *Walmart*; ECF No. 105; Walmart; "Defendant's Response to Plaintiffs' Motion to Compel"; United States District Court for the Eastern District of Arkansas; Case No. 4:18-CV-00500-JM; Feb. 25, 2019; pp. 1-21.

*Zest Labs, Inc.* v *Walmart*; ECF No. 125; Zest Labs, Inc. et al.; "Plaintiffs' Motion to Compel Defendant Walmart to Comply With the Court's Mar. 6, 2019 Order and Otherwise Produce Technical Discovery"; United States District Court for the Eastern District of Arkansas; Case No. 4:18-CV-00500-JM; Apr. 22, 2019; pp. 1-9.

*Zest Labs, Inc.* v *Walmart*; ECF No. 126; Zest Labs, Inc. et al.; "Plaintiffs' Brief in Support of Motion to Compel Defendant Walmart to Comply With the Court's Mar. 6, 2019 Order and Otherwise Produce Technical Discovery"; United States District Court for the Eastern District of Arkansas; Case No. 4:18-CV-00500-JM; Apr. 22, 2019; pp. 1-21.

*Zest Labs, Inc.* v *Walmart*; ECF No. 130-1; Sammi, P. Anthony; "*Zest* v. *Walmart*: Mar. 29, 2019 M. Simons Letter to P. Sammi Re Deficient Production of Technical Documents"; United States District Court for the Eastern District of Arkansas; Case No. 4:18-CV-00500-JM; May 8, 2019; pp. 1-2.

*Zest Labs, Inc.* v *Walmart*; ECF No. 130-2; Tulin, Edward L.; "*Zest* v. *Walmart*: Deposition Notices"; United States District Court for the Eastern District of Arkansas; Case No. 4:18-CV-00500-JM; May 8, 2019; pp. 1-2.

*Zest Labs, Inc.* v *Walmart*; ECF No. 130-3; Simons, Michael; "*Zest* v. *Walmart*: Deposition Notices"; United States District Court for the Eastern District of Arkansas; Case No. 4:18-CV-00500-JM; May 8, 2019; pp. 1-3.

*Zest Labs, Inc.* v *Walmart*; ECF No. 130-4; Walmart; "Exhibit D—Filed Under Seal Pursuant to Order Dated Sep. 7, 2018"; United States District Court for the Eastern District of Arkansas; Case No. 4:18-CV-00500-JM; May 8, 2019; 1 page.

*Zest Labs, Inc.* v *Walmart*; ECF No. 130-5; Simons, Michael; "*Zest Labs* v. *Walmart*—Walmart's Apr. 5, 2019 Production"; United States District Court for the Eastern District of Arkansas; Case No. 4:18-CV-00500-JM; May 8, 2019; pp. 1-2.

*Zest Labs, Inc.* v *Walmart*; ECF No. No. 130; Walmart; "Defendant's Response to Plaintiffs' Motion to Compel Compliance With the Mar. 6, 2019 Order and Technical Discovery"; United States District Court for the Eastern District of Arkansas; Case No. 4:18-CV-00500-JM; May 8, 2019; pp. 1-26.

*Zest Labs, Inc.* v *Walmart*; ECF No. 131-1; Walmart; "Exhibit A—Filed Under Seal Pursuant to Order Dated Sep. 7, 2018"; United States District Court for the Eastern District of Arkansas; Case No. 4:18-CV-00500-JM; May 8, 2019; 1 page.

*Zest Labs, Inc.* v *Walmart*; ECF No. 131-2; Walmart; "Exhibit B—Filed Under Seal Pursuant to Order Dated Sep. 7, 2018"; United States District Court for the Eastern District of Arkansas; Case No. 4:18-CV-00500-JM; May 8, 2019; 1 page.

*Zest Labs, Inc.* v *Walmart*; ECF No. 131-3; Sammi, P. Anthony; "Re: 4:18-CV-00500-JM *Zest Labs Inc. et al.* v. *Wal-Mart Inc*"; United States District Court for the Eastern District of Arkansas; Case No. 4:18-CV-00500-JM; May 8, 2019; 1 page.

*Zest Labs, Inc.* v *Walmart*; ECF No. 131-4; Simons, Michael; "RE: 4:18-CV-00500-JM *Zest Labs Inc et alv. Wal-Mart Inc*"; United States District Court for the Eastern District of Arkansas; Case No. 4:18-CV-00500-JM; May 8, 2019; 1 page.

*Zest Labs, Inc.* v *Walmart*; ECF No. 131; Walmart; "Defendant's Sur-Reply Brief in Further Opposition to Plaintiffs' Motion to Compel"; United States District Court for the Eastern District of Arkansas; Case No. 4:18-CV-00500-JM; May 8, 2019; pp. 1-21.

*Zest Labs, Inc.* v *Walmart*; ECF No. No. 250; Walmart; "Defendant's Reply Brief in Support of Its Motion to Exclude Proposed Expert Testimony of Patent Attorney Q. Todd Dickinson"; United States District Court for the Eastern District of Arkansas; Case No. 4:18-CV-00500-JM; Mar. 27, 2020; pp. 1-13.

*Zest Labs, Inc.* v *Walmart*; ECF No. 257-1; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-168.

*Zest Labs, Inc.* v *Walmart*; ECF No. 257-1; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 169-336.

*Zest Labs, Inc.* v *Walmart*; ECF No. 257-1; Walmart; "Defendant's Surreply in Further Opposition to Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 337-342.

*Zest Labs, Inc.* v *Walmart*; ECF No. 257; Walmart; "Defendant's Motion for Leave to File Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-3.

*Zest Labs, Inc.* v *Walmart*; ECF No. 261-1; Blitzer, Rachel R.; "Declaration of Rachel R. Blitzer Regarding Walmart's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-169.

*Zest Labs, Inc.* v *Walmart*; ECF No. 261-1; Blitzer, Rachel R.; "Declaration of Rachel R. Blitzer Regarding Walmart's Surreply in Further Opposition to Zest Labs, Inc.'s Motion for Partial Summary Judgment That Walmart Used and Disclosed Zest's Information in

(56) References Cited

OTHER PUBLICATIONS the Walmart Application"; United States District Court for the Eastern District of Arkansas; Case No. 4:18-CV-00500-JM; Apr. 6, 2020; pp. 170-337.

*Zest Labs, Inc.* v *Walmart*; ECF No. 261; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-5.

*Zest Labs, Inc.* v *Walmart*; ECF No. 262; Walmart; "Brief in Support of Defendant's Motion for Summary Judgment"; United States District Court for the Eastern District of Arkansas; Case No. 4:18-CV-00500-JM; Apr. 21, 2020; pp. 1-54.

*Zest Labs, Inc.* v *Walmart*; ECF No. 263; Walmart; "Defendant's Motion to Exclude Certain Proposed Expert Testimony of Mark Lanning"; United States District Court for the Eastern District of Arkansas; Case No. 4:18-CV-00500-JM; Apr. 21, 2020; pp. 1-6.

*Zest Labs, Inc.* v *Walmart*; ECF No. 264; Walmart; "Brief in Support of Defendant's Motion to Exclude Proposed Expert Testimony of Mark Lanning"; United States District Court for the Eastern District of Arkansas; Case No. 4:18-CV-00500-JM; Apr. 21, 2020; pp. 1-26.

*Zest Labs, Inc.* v *Walmart*; ECF No. 265; Walmart; "Defendant's Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-7.

*Zest Labs, Inc.* v *Walmart*; ECF No. 266; Walmart; "Brief in Support of Defendant's Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-22.

*Zest Labs, Inc.* v *Walmart*; ECF No. 267; Walmart; "Defendant's Response to Zest Labs, Inc.'s Motion for Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-23.

*Zest Labs, Inc.* v *Walmart*; ECF No. 268; Walmart; "Defendant's Response to Zest Labs, Inc.'s Motion for Partial Summary Judgment That Walmart Used and Disclosed Zest Labs' Information in the Walmart Applications"; United States District Court for the Eastern District of Arkansas; Case No. 4:18-CV-00500-JM; Apr. 21, 2020; pp. 1-29.

*Zest Labs, Inc.* v *Walmart*; ECF No. 269; Walmart; "Defendant's Response to Plaintiffs' Motion to Exclude Testimony of Walmart's Damages Expert, Dr. William Choi"; United States District Court for the Eastern District of Arkansas; Case No. 4:18-CV-00500-JM; Apr. 21, 2020; pp. 1-17.

*Zest Labs, Inc.* v *Walmart*; ECF No. No. 270; Walmart; "Defendant's Response to Plaintiffs' Motion to Exclude Testimony of Walmart's Technical Expert, Dr. David Dobkin, Ph.D."; United States District Court for the Eastern District of Arkansas; Case No. 4:18-CV-00500-JM; Apr. 21, 2020; pp. 1-13.

*Zest Labs, Inc.* v *Walmart*; ECF No. No. 271; Walmart; "Defendant's Response to Plaintiffs' Motion to Exclude Testimony of Walmart's Technical Expert, Dr. Catherine Adams Hutt, Ph.D."; United States District Court for the Eastern District of Arkansas; Case No. 4:18-CV-00500-JM; Apr. 21, 2020; pp. 1-25.

*Zest Labs, Inc.* v *Walmart*; ECF No. No. 272; Walmart; "Defendant's Reply Brief in Support of Its Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-22.

*Zest Labs, Inc.* v *Walmart*; ECF No. No. 273; Walmart; "Defendant's Reply Brief in Support of Its Motion for Summary Judgment"; United States District Court for the Eastern District of Arkansas; Case No. 4:18-CV-00500-JM; Apr. 21, 2020; pp. 1-56.

*Zest Labs, Inc.* v *Walmart*; ECF No. No. 274; Walmart; "Defendant's Reply Brief in Support of Its Motion to Exclude Proposed Expert Testimony of Mark Lanning"; United States District Court for the Eastern District of Arkansas; Case No. 4:18-CV-00500-JM; Apr. 21, 2020; pp. 1-22.

*Zest Labs, Inc.* v *Walmart*; ECF No. No. 275; Zest Labs, Inc. et al.; "Zest Labs Inc.'s Motion for Partial Summary Judgment That Walmart Used and Disclosed Zest's Information in the Walmart Applications"; United States District Court for the Eastern District of Arkansas; Case No. 4:18-CV-00500-JM; Apr. 21, 2020; pp. 1-4.

*Zest Labs, Inc.* v *Walmart*; ECF No. No. 276; Zest Labs, Inc. et al.; "Plaintiffs' Motion To Exclude Testimony of Walmart's Expert, Dr. David P. Dobkin"; United States District Court for the Eastern District of Arkansas; Case No. 4:18-CV-00500-JM; Apr. 21, 2020; pp. 1-3.

*Zest Labs, Inc.* v *Walmart*; ECF No. No. 277; Zest Labs, Inc. et al.; "Brief in Support of Plaintiffs' Motion to Exclude the Testimony of Walmart's Expert Witness, Dr. David P. Dobkin"; United States District Court for the Eastern District of Arkansas; Case No. 4:18-CV-00500-JM; Apr. 21, 2020; pp. 1-59.

*Zest Labs, Inc.* v *Walmart*; ECF No. No. 278; Zest Labs, Inc. et al.; "Plaintiffs' Motion to Exclude Testimony of Walmart Expert, Dr. Catherine Adams Hutt"; United States District Court for the Eastern District of Arkansas; Case No. 4:18-CV-00500-JM; Apr. 21, 2020; pp. 1-4.

*Zest Labs, Inc.* v *Walmart*; ECF No. No. 279; Zest Labs, Inc. et al.; "Brief in Support of Plaintiffs' Motion to Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-64.

*Zest Labs, Inc.* v *Walmart*; ECF No. 280; Zest Labs, Inc. et al.; "Zest Labs Inc.'s Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-4.

*Zest Labs, Inc.* v *Walmart*; ECF No. 281; Zest Labs, Inc. et al.; "Plaintiffs' Motion to Exclude Testimony of Walmart's Damages Expert, Dr. William Choi"; United States District Court for the Eastern District of Arkansas; Case No. 4:18-CV-00500-JM; Apr. 21, 2020; pp. 1-4.

*Zest Labs, Inc.* v *Walmart*; ECF No. 282; Zest Labs, Inc. et al.; "Plaintiffs' Brief in Support of Motion to Exclude Testimony of Walmart's Damages Expert, Dr. William Choi"; United States District Court for the Eastern District of Arkansas; Case No. 4:18-CV-00500-JM; Apr. 21, 2020; pp. 1-30.

*Zest Labs, Inc.* v *Walmart*; ECF No. No. 283; Zest Labs, Inc. et al.; "Zest Labs Inc.'s Brief in Support of Its Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-159.

*Zest Labs, Inc.* v *Walmart*; ECF No. No. 284; Zest Labs, Inc. et al.; "Zest Labs Inc.'s Brief in Support of Its Motion for Partial Summary Judgment That Walmart Used and Disclosed Zest Labs' Information in the Walmart Applications"; United States District Court for the Eastern District of Arkansas; Case No. 4:18-CV-00500-JM; Apr. 21, 2020; pp. 1-165.

*Zest Labs, Inc.* v *Walmart*; ECF No. No. 285; Zest Labs, Inc. et al.; "Zest Labs Inc.'s Motion for Summary Judgment on Its Claim for Breach of Contract"; United States District Court for the Eastern District of Arkansas; Case No. 4:18-CV-00500-JM; Apr. 21, 2020; pp. 1-3.

*Zest Labs, Inc.* v *Walmart*; ECF No. 286; Zest Labs, Inc. et al.; "Zest Labs Inc.'s Brief in Support of Its Motion for Summary Judgment on Its Claim for Breach of Contract"; United States District Court for the Eastern District of Arkansas; Case No. 4:18-CV-00500-JM; Apr. 21, 2020; pp. 1-30.

*Zest Labs, Inc.* v *Walmart*; ECF No. 287; Zest Labs, Inc. et al.; "Plaintiffs' Response to Defendant's Motion for Summary Judgment"; United States District Court for the Eastern District of Arkansas; Case No. 4:18-CV-00500-JM; Apr. 21, 2020; pp. 1-138.

*Zest Labs, Inc.* v *Walmart*; ECF No. 288; Zest Labs, Inc. et al.; "Plaintiffs' Opposition to Defendant's Motion to Exclude Testimony of Damages Expert Stephen L. Becker, Ph.D."; United States

(56) References Cited

OTHER PUBLICATIONS

District Court for the Eastern District of Arkansas; Case No. 4:18-CV-00500-JM; Apr. 21, 2020; pp. 1-63.
*Zest Labs, Inc.* v *Walmart*; ECF No. 289; Zest Labs, Inc. et al.; "Plaintiffs' Brief in Opposition of Defendant's Motion to Exclude Proposed Expert Testimony of Patent Attorney Q. Todd Dickinson"; United States District Court for the Eastern District of Arkansas; Case No. 4:18-CV-00500-JM; Apr. 21, 2020; pp. 1-180.
*Zest Labs, Inc.* v *Walmart*; ECF No. 290; Zest Labs, Inc. et al.; "Plaintiffs' Brief in Opposition of Defendant's Motion to Exclude Proposed Expert Testimony of Mark Lanning"; United States District Court for the Eastern District of Arkansas; Case No. 4:18-CV-00500-JM; Apr. 21, 2020; pp. 1-62.
*Zest Labs, Inc.* v *Walmart*; ECF No. 291; Zest Labs, Inc. et al.; "Zest Labs Inc.'s Reply Brief in Support of Its Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-18.
*Zest Labs, Inc.* v *Walmart*; ECF No. 292; Zest Labs, Inc. et al.; "Plaintiffs' Reply in Support of Their Motion to Exclude Testimony of Walmart's Damages Expert Dr. William Choi"; United States District Court for the Eastern District of Arkansas; Case No. 4:18-CV-00500-JM; Apr. 21, 2020; pp. 1-20.
*Zest Labs, Inc.* v *Walmart*; ECF No. 293; Zest Labs, Inc. et al.; "Brief in Support of Plaintiffs' Motion to Exclude the Testimony of Walmart's Expert Witness, Dr. David P. Dobkin"; United States District Court for the Eastern District of Arkansas; Case No. 4:18-CV-00500-JM; Apr. 21, 2020; pp. 1-13.
*Zest Labs, Inc.* v *Walmart*; ECF No. 294; Zest Labs, Inc. et al.; "Zest Labs Inc.'s Reply in Support of Their Motion for Partial Summary Judgment That Walmart Used and Disclosed Zest's Information in the Walmart Application"; United States District Court for the Eastern District of Arkansas; Case No. 4:18-CV-00500-JM; Apr. 21, 2020; pp. 1-39.
*Zest Labs, Inc.* v *Walmart*; ECF No. 295; Zest Labs, Inc. et al.; "Plaintiffs' Reply in Support of Their Motion to Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-23.
*Zest Labs, Inc.* v *Walmart*; ECF No. 296; Zest Labs, Inc. et al.; "Plaintiffs' Objections to and Motion to Strike Evidence Cited in Walmart's Responses to Zest Labs, Inc.'s Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart*; ECF No. 297; Zest Labs, Inc. et al.; "Plaintiffs' Memorandum in Support of Objections to and Motion to Strike Evidence Cited in Walmart's Responses to Zest Labs, Inc.'s Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart*; ECF No. 298; Walmart; "Defendant's Consolidated Brief in Opposition to Plaintiffs' Objections to and Motions to Strike Evidence Cited By Walmart in Connection With Summary Judgment Motions (Dkts. 222 & 248)"; United States District Court for the Eastern District of Arkansas; Case No. 4:18-CV-00500-JM; May 4, 2020; pp. 1-18.
*Zest Labs, Inc.* v *Walmart*; Kunin, Stephen G .; "Rebuttal Expert Report of Stephen G. Kunin"; United States District Court for the Eastern District of Arkansas; Case No. 4:18-CV-00500-JM; Nov. 25, 2019; pp. 1-38.
*Zest Labs, Inc.* v *Walmart*; Zest Labs, Inc. et al.; "Complaint"; United States District Court for the Eastern District of Arkansas; Case No. 4:18-CV-00500-JM; Aug. 1, 2018; pp. 1-26.
Zest Labs; "Blockchain for Supply Chains"; https://www.zestlabs.com/challenges/blockchain-for-supply-chains/; Available as early as Jul. 18, 2019; pp. 1-4.
Zest Labs; "Food Safety and the Supply Chain"; https://www.zestlabs.com/challenges/food-safety/; Available as early as Jul. 18, 2019; pp. 1-5.
Zest Labs; "Food Supplier Operational Efficiency"; https://www.zestlabs.com/challenges/food-supplier-operational-efficiency/; Available as early as Jul. 18, 2019; pp. 1-5.
Zest Labs; "Food Waste is a Significant Problem"; https://www.zestlabs.com/challenges/food-waste-challenge/; Available as early as Jul. 18, 2019; pp. 1-6.
Zest Labs; "Fresh Food Supply Chain"; https://www.zestlabs.com/challenges/fresh-food-supply-chain/; Available as early as Jul. 18, 2019; pp. 1-5.
Zest Labs; "Fresh Food Sustainability"; https://www.zestlabs.com/challenges/fresh-food-sustainability/; Available as early as Jul. 18, 2019; pp. 1-4.
Zest Labs; "Fresh Produce"; http://www.zestlabs.com/fresh-produce; Available as early as Oct. 21, 2017; pp. 1-14.
Zest Labs; "On-Demand Delivery"; https://www.zestlabs.com/on-demand-delivery/; Available as early as Oct. 22, 2017; pp. 1-7.
Zest Labs; "Post-Harvest Technology"; https://www.zestlabs.com/challenges/post-harvest-technology/; Available as early as Jul. 18, 2019; pp. 1-8.
Zest Labs; "The Freshest Produce"; https://www.zestlabs.com/resources; Available as early as May 2, 2018; pp. 1-16.
Zest Labs; "Zest Fresh—Deep Dive"; https://www.zestlabs.com/resources; Available as early as May 2, 2018, pp. 1-15.
Zest Labs; "Zest Fresh Differentiation"; https://www.zestlabs.com/zest-fresh-differentiation/; Available as early as Jul. 18, 2019; pp. 1-6.
Zest Labs; "Zest Fresh for Beef, Poultry, Pork and Seafood"; https://www.zestlabs.com/zest-fresh-for-protein/; Available as early as Jul. 18, 2019; pp. 1-5.
Zest Labs; "Zest Fresh for Grocers"; https://www.zestlabs.com/zest-fresh-for-produce-for-grocers/; Available as early as Jul. 18, 2019; pp. 1-13.
Zest Labs; "Zest Fresh for Growers, Packers, and Shippers"; https://www.zestlabs.com/zest-fresh-for-growers-and-suppliers/; Available as early as Jul. 18, 2019; pp. 1-17.
Zest Labs; "Zest Fresh for Restaurants"; https://www.zestlabs.com/zest-fresh-for-produce-for-restaurants/; Available as early as Jul. 18, 2019; pp. 1-13.
Zest Labs; "Zest Fresh Grower Testimonial"; https://www.zestlabs.com/resources; Available as early as May 2, 2018; pp. 1-13.
Zest Labs; "Zest Fresh Overview"; https://www.zestlabs.com/resources; Available as early as May 2, 2018; pp. 1-19.
Zest Labs; "Zest Fresh Use Cases"; https://www.zestlabs.com/zest-fresh-use-cases/; Available as early as Jul. 18. 2019; pp. 1-6.
Zest Labs; "Zest Fresh: Pallet-level Quality Management from Harvest to Store"; http://www.zestlabs.com/zest-fresh; Available as early as Oct. 29, 2017; pp. 1-10.
Zest Labs; "Zest Labs Overview"; https://www.zestlabs.com/resources; Available as early as Aug. 1, 2018; pp. 1-13.
Zest Labs; ". . . Not Worth a Thousand Words—Why Traditional Temperature Loggers and Imaging Technologies are Inadequate to Determine Freshness and Reduce Waste"; https://www.zestlabs.com/wp-content/uploads/2018/03/WP-05-0318-Not-Worth-A-Thousand-Words.pdf; Mar. 5, 2018; pp. 1-6.
Zest Labs; "10 Limitations of Traditional Temperature Data Loggers And Why They're No Longer Adequate for the Cold Chain"; https://www.zestlabs.com/wp-content/uploads/2018/05/PB-04-0418-10-Limitations-of-Data-Loggers.pdf; May 4, 2018; pp. 1-3.
Zest Labs; "Before and After—The Benefits of Digital Transformation in the Fresh Food Supply Chain"; https://www.zestlabs.com/downloads/Before-and-After-Digital-Transformation.pdf; Jan. 13, 2019; pp. 1-6.
Zest Labs; "Blockchain and Achieving True Transparency—Proactively Managing Food Safety and Freshness with Blockchain and IoT Technologies"; https://www.zestlabs.com/wp-content/uploads/2018/01/WP-08-0118.Blockchain.and_.Achieving.True_.Transparency-1.pdf; Jan. 8, 2018; pp. 1-4.
Zest Labs; "Blockchain and Its Value to Suppliers"; https://www.zestlabs.com/downloads/Blockchain-and-Its-Value-to-Suppliers.pdf; Available as early as Jul. 18, 2019; pp. 1-5.

(56) References Cited

OTHER PUBLICATIONS

Zest Labs; "Comparing Pallet- and Trailer-level Temperature Monitoring—Implications on Quality, Freshness, Traceability and Profitability for Retail Grocers"; https://www.zestlabs.com/wp-content/uploads/2018/03/WP-04-0318-Pallet-vs-Trailer.pdf; Mar. 4, 2018; pp. 1-4.

Zest Labs; "Freshness Baseline Study—Sample Report"; http://www.zestlabs.com/wp-content/uploads/2018/03/Zest-Labs-Sample-Baseline-Report.pdf; Available as early as Mar. 2018; pp. 1-11.

Zest Labs; "Freshness Myths—False Beliefs That Lead to Food Waste"; https://www.zestlabs.com/downloads/Freshness-Myths.pdf; Aug. 7, 2018; pp. 1-5.

Zest Labs; "Half-bad Is Not Good"; https://www.zestlabs.com/downloads/Grocery-Store-Variability.pdf; Jun. 15, 2019; pp. 1-11.

Zest Labs; "Improve Operational Efficiency—Optimize Labor and Process Adherence to Reduce Costs"; https://www.zestlabs.com/downloads/Improving-Operational-Efficiency.pdf; Available as early as Jul. 18, 2019; pp. 1-3.

Zest Labs; "Improving Quality and Profitability for Retail Grocers—The Benefits of Pallet-level Monitoring for the Fresh and Perishable Food Cold Chain"; https://www.zestlabs.com/wp-content/uploads/2017/12/WP-01-1117.Improving.Quality.and_.Profitability.for_.Retail.Grocers.pdf; Nov. 1, 2017; pp. 1-8.

Zest Labs; "Let's Start at the Beginning—Reducing Shrink Begins at Harvest"; https://www.zestlabs.com/wp-content/uploads/2018/05/WP-12-0518-Lets-Start-at-the-Beginning.pdf; May 12, 2018; pp. 1-4.

Zest Labs; "Margins Matter—Reducing Fresh Food Waste to Improve Product Margins by 6% or More"; https://www.zestlabs.com/wp-content/uploads/2018/04/WP-11-0418-Margins-Matter-1.pdf; Apr. 11, 2018; pp. 1-6.

Zest Labs; "Measuring and Managing Operational Efficiency for Growers and Suppliers"; https://www.zestlabs.com/downloads/Zest-Fresh-Metrics-Datasheet.pdf; Aug. 25, 2019; pp. 1-5.

Zest Labs; "Monitoring the Safety and Quality of Fresh, Frozen and Processed Foods"; https://www.zestlabs.com/wp-content/uploads/2016/03/IN-SB-Fresh Produce_RestaurantFoodService_031016.pdf; Mar. 10, 2016; pp. 1-2.

Zest Labs; "Pallet-level Quality Management from Harvest to Store"; https://www.zestlabs.com/wp-content/uploads/2016/03/IN_SB_FoodIndustry_ProduceGrowers_031016.pdf; Mar. 10, 2016; pp. 1-2.

Zest Labs; "Poor Customer Experiences—Half-Bad is Not Good! A Shelf-Life Variability Study"; https://www.zestlabs.com/downloads/Variability-Infographic.pdf; Available as early as Jul. 2019; pp. 1-1.

Zest Labs; "Proactive Freshness Management: Modernizing the Fresh Food Supply Chain to Reduce Waste and Improve Profitability"; https://www.zestlabs.com/downloads/Proactive-Freshness-Management.pdf; Feb. 6, 2019; pp. 1-7.

Zest Labs; "Reduce Shrink, Improve Profitability and Quality for Fresh Food"; https://www.zestlabs.com/wp-content/uploads/2016/03/IN-SB-FreshProduce_RetailGrocers_031016.pdf; Mar. 10, 2016; pp. 1-3.

Zest Labs; "Shelf-life Variability Begins in the Field—Produce Pallets Harvested on the Same Day Vary by as Much as 86 Percent, Contributing to Shrink and Lost Profits"; https://www.zestlabs.com/wp-content/uploads/2018/02/WP-10-0218-Shelf-life-Variability.pdf; Feb. 10, 2018; pp. 1-4.

Zest Labs; "Strawberries—Shelf-Life Variability"; https://www.zestlabs.com/downloads/Zest-Fresh-Strawberries-Report.pdf; Available as early as Jul. 2019; pp. 1-2.

Zest Labs; "The Best of Zest 2018—A Collection of Our Most Popular Blogs"; https://www.zestlabs.com/downloads/The-Best-of-Zest-2018.pdf; Available as early as 2018; pp. 1-15.

Zest Labs; "The ZIPR Code Freshness Metric—Dynamically providing the current freshness of each pallet to help you intelligently manage product and reduce shrink throughout the fresh food supply chain"; https://www.zestlabs.com/downloads/The-ZIPR-Code.pdf; Jun. 1, 2018; pp. 1-3.

Zest Labs; "Today, You Saved $67,571—How Zest Fresh for Managing the Produce Cold Chain Reduces Waste and Saves Retailers Money . . . Beginning on Day One"; https://www.zestlabs.com/downloads/Today-You-Saved.pdf; Jun. 3, 2018; pp. 1-6.

Zest Labs; "True Transparency for Freshness Management, Food Safety, Authenticity and Traceability"; https://www.zestlabs.com/wp-content/uploads/2018/03/SO-04-0218-Zest-Fresh-for-Protein-Solution-Overview.pdf; Feb. 4, 2018; pp. 1-2.

Zest Labs; "Zest Labs FAQ and Reference Guide"; https://www.zestlabs.com/downloads/Zest-Labs-FAQ-and-Reference-Guide.pdf; Jul. 1, 2018; pp. 1-6.

Zest Labs; "Zest Labs Professional Services"; https://www.zestlabs.com/wp-content/uploads/2018/03/SO-05-0318-Zest-Labs-Professional-Services.pdf; Mar. 5, 2018; pp. 1-2.

Zhu, Hongyan; "Hyperspectral Imaging for Predicting the Internal Quality of Kiwifruits Based on Variable Selection Algorithms and Chemometric Models"; https://www.nature.com/articles/s41598-017-08509-6; Aug. 10, 2017; pp. 1-36.

* cited by examiner

Shipment Details

| | |
|---|---|
| Shipper ID: | sscc1533335820329 |
| Product: | grape |
| Quantity: | 12 |
| Status: | OK |
| Due Date: | 2018-09-07 |
| Ship Date: | 2018-08-04 |
| Trip Dep Date: | 0001-01-01 |
| Trip Arrv Date: | 0001-01-01 |
| Trip Carrier: | |
| Trip Mode: | |

FIG. 1I

Shipment Details

| | |
|---|---|
| Shipper ID: | sscc1533335820329 |
| Product: | grape |
| Quantity: | 12 |
| Status: | Delayed |
| Due Date: | 2018-09-07 |
| Ship Date: | 2018-08-06 |
| Trip Dep Date: | 2018-08-04 |
| Trip Arrv Date: | 2018-08-22 |
| Trip Carrier: | carrier |
| Trip Mode: | vessel |

Shipment Details

| Shipper ID: | sscc1533335820329 |
|---|---|
| Product: | grape |
| Quantity: | 12 |
| Status: | Exception |
| Due Date: | 2018-09-07 |
| Ship Date: | 2018-08-06 |
| Trip Dep Date: | 2018-08-06 |
| Trip Arrv Date: | 2018-08-08 |
| Trip Carrier: | carrier |
| Trip Mode: | Air Freight |

FIG. 1K

SYSTEM AND METHOD FOR FORECASTING DELIVERIES VIA BLOCKCHAIN SMART CONTRACTS

CROSS-REFERENCE TO RELATED APPLICATION

This application is a continuation application of U.S. application Ser. No. 17/673,508, filed Feb. 16, 2022, which is a divisional application of U.S. application Ser. No. 16/534,538, filed Aug. 7, 2019, which claims the benefit of U.S. Provisional Application No. 62/715,564, filed on Aug. 7, 2018, and the disclosures of which are incorporated by reference herein in their entirety.

TECHNICAL FIELD

A blockchain may generally refer to a distributed database that maintains a growing and ordered list or chain of records in which each block contains a hash of some or all previous records in the chain to secure the record from tampering and unauthorized revision. The blockchain may be managed in a peer-to-peer network or by a private entity.

BRIEF DESCRIPTION OF THE DRAWINGS

Illustrative embodiments are shown by way of example in the accompanying figures and should not be considered as a limitation of the present invention. The accompanying figures, which are incorporated in and constitute a part of this specification, illustrate one or more embodiments of the invention and, together with the description, help to explain the invention. In the figures:

FIGS. 1A-K are exemplary screens of an application to initiate delivery of physical objects in accordance with an exemplary embodiment;

DETAILED DESCRIPTION

Figure 1A:
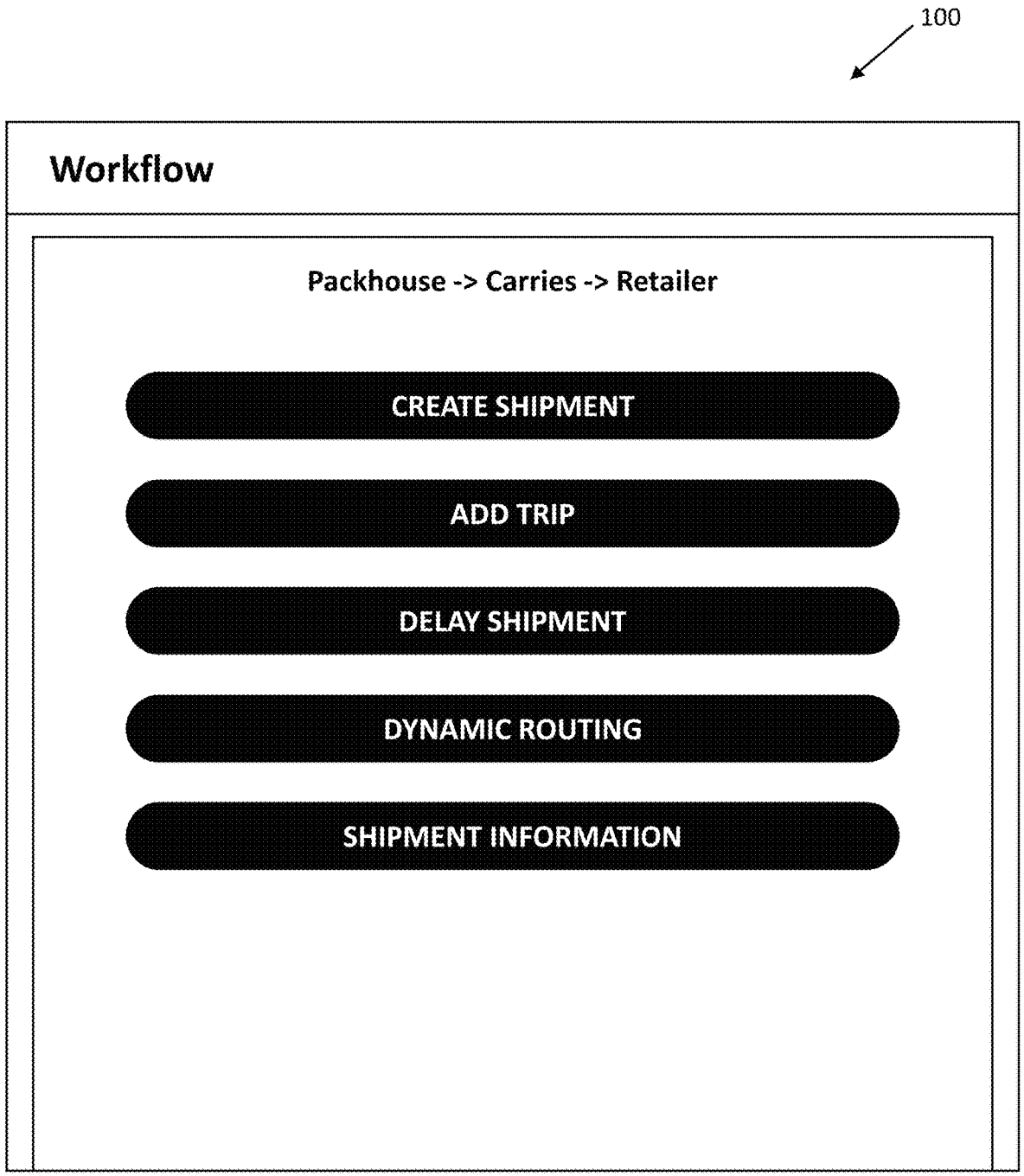

Described in detail herein is a supply chain forecasting system with blockchain controls. In one embodiment, the supply chain forecasting system can include a central computing system executing a first application. The first application of the central computing system generates a cryptographically verifiable ledger represented by a sequence of data blocks with each data block containing one or more transaction records and each subsequent data block contains a hash value associated with a previous data block. The first application also generates a first block in the cryptographically verifiable ledger including information associated with a request for one or more physical objects. The first block includes identification information associated with the physical objects, a destination location, and one or more constraints associated with the request for delivery of the one or more physical objects. The central computing system also communicates with one or more third party computing systems that execute an instance of the first application and include a hyperspectral image sensor. At least one of the third party computing systems is configured to store a copy of a full or partial version of the cryptographically verifiable ledger, detect, via the first application, the generation of the first block including the request for the one or more physical objects, and generate, via the first application, a second block in the cryptographically verifiable ledger. The second block includes an acceptance of the request for delivery of the physical objects. The at least one third party computing system is further configured to instruct the hyperspectral image sensor to capture an image of the one or more physical objects prior to initiating delivery of the one or more physical objects, and generate, via the first application, a third block including the image of the one or more physical object captured by the hyperspectral image sensor. The central computing system is configured to detect, via the first application, the generation of the second and third block in the cryptographically verifiable ledger, execute a hyperspectral image analysis on the image of the one or more physical objects, extract one or more characteristics associated with the one or more physical objects based on the hyperspectral image analysis, derive a quality value associated with the one or more physical objects based on the one or more characteristics and generate, via the first application, a fourth block in the cryptographically verifiable ledger, the fourth block including the quality value associated with the one or more physical objects.

In one embodiment, a forecasting system can include a central computing system including a database and executing a first application. The first application of the central computing system can generate a cryptographically verifiable ledger represented by a sequence of data blocks, each data block containing one or more transaction records and each subsequent data block containing a hash value associated with a previous data block and generate a first block in the cryptographically verifiable ledger including information associated with a request for one or more physical objects. The first block includes identification information associated with the physical objects, a destination location, and one or more constraints associated with a request for delivery of the one or more physical objects. The central computing system can further communicate with one or more third party computing systems executing a copy an instance of the first application. The at least one of the third party computing systems is configured to store a copy of a full or partial version of the cryptographically verifiable ledger, detect, via the first application, the generation of the first block including the request for the one or more physical objects, and generate, via the first application, a second block in the cryptographically verifiable ledger, the second block including an acceptance of the request for delivery of the physical objects. The central computing system is further configured to queries the database to retrieve information associated with the physical objects, determine a status of the delivery of the one or more physical objects, forecast a failure of fulfillment of at least one of the constraints, and generates, via the first application, a third block in the cryptographically verifiable ledger, the third block including information associated with an action, the third block generated in response to the forecast of the failure of fulfillment of the at least one of the constraints.

In one embodiment, a forecasting method can include generating, via a central computing system executing a first application including a database, a cryptographically verifiable ledger represented by a sequence of data blocks, each data block containing one or more transaction records and each subsequent data block containing a hash value associated with a previous data block and generating, via the first application of the central computing system, a first block in the cryptographically verifiable ledger including information associated with a request for one or more physical objects. The first block includes identification information associated with the physical objects, a destination location, and one or more constraints associated with a request for delivery of the one or more physical objects. The method further includes communicating, via the first application of the central computing system, with at least one of one or more third party computing systems executing a copy an instance of the first application. The at least one of the third party computing systems is configured to store a copy of a full or partial version of the cryptographically verifiable ledger, detect, via the first application, the generation of the first block including the request for the one or more physical objects, and generate, via the first application, a second block in the cryptographically verifiable ledger, the second block including an acceptance of the request for delivery of the physical objects. The method further includes querying, via the central computing system, the database to retrieve information associated with the physical objects, determining, via the central computing system, a status of the delivery of the one or more physical objects, forecasting, via the central computing system, a failure of fulfillment of at least one of the constraints, and generating, via the first application of the central computing system, a third block in the cryptographically verifiable ledger, the third block including information associated with an action, the third block generated in response to the forecast of the failure of fulfillment of the at least one of the constraints.

Embodiments of the present invention provide a supply chain forecasting system with blockchain controls. A central computing system and third party computing systems can initiate, adjust, and fulfill smart contracts associated with the delivery of physical objects using blockchain controls. The smart contracts may use hyperspectral imaging and IOT devices to allow inventory to be tracked with respect to time, inventory and quality. The ability to share forecasts and inventory with suppliers, expedite payments and reconciliations, determine whether product is delivered on-time in full (OTIF) at designated locations, to dynamically reroute product to new locations based on tracked quality and to dynamically add replacement supply as needed are among the benefits provided by embodiments. The system can also be embodied as a system of record for various documents like commercial invoices, bill of loading, fumigation and other country specific certifications, sailing messages etc. The system can apply image analytics to ensure that the documents are genuine and can scrape the content from the documents to populate other systems, ensuring real time automation. The system can constantly monitor inventory at multiple points and ensure contingency alternatives are met. The contingency alternatives are not only within markets but also across markets. To accommodate the continency alternatives based on Smart Contract new PO's can be generated based on demand forecasting and availability of product within supply chain and inventory levels with the supplier. The smart contracts can include a time dimension, inventory dimension, and quality dimension.

FIGS. 1A-K are exemplary screens of a contract application to initiate delivery of physical objects in accordance with an exemplary embodiment. A central computing system and a third party computing system can execute a contract application. The contract application can be used to initiate smart contracts for deliveries of physical objects using a blockchain record. As a non-limiting example, the central computing system can be associated with a retail store and the third party computing system can be associated with a vendor. The central computing system, third party computing system, contract application, and blockchain record will be described in greater detail with respect to FIG. 3.

Figure 1B:
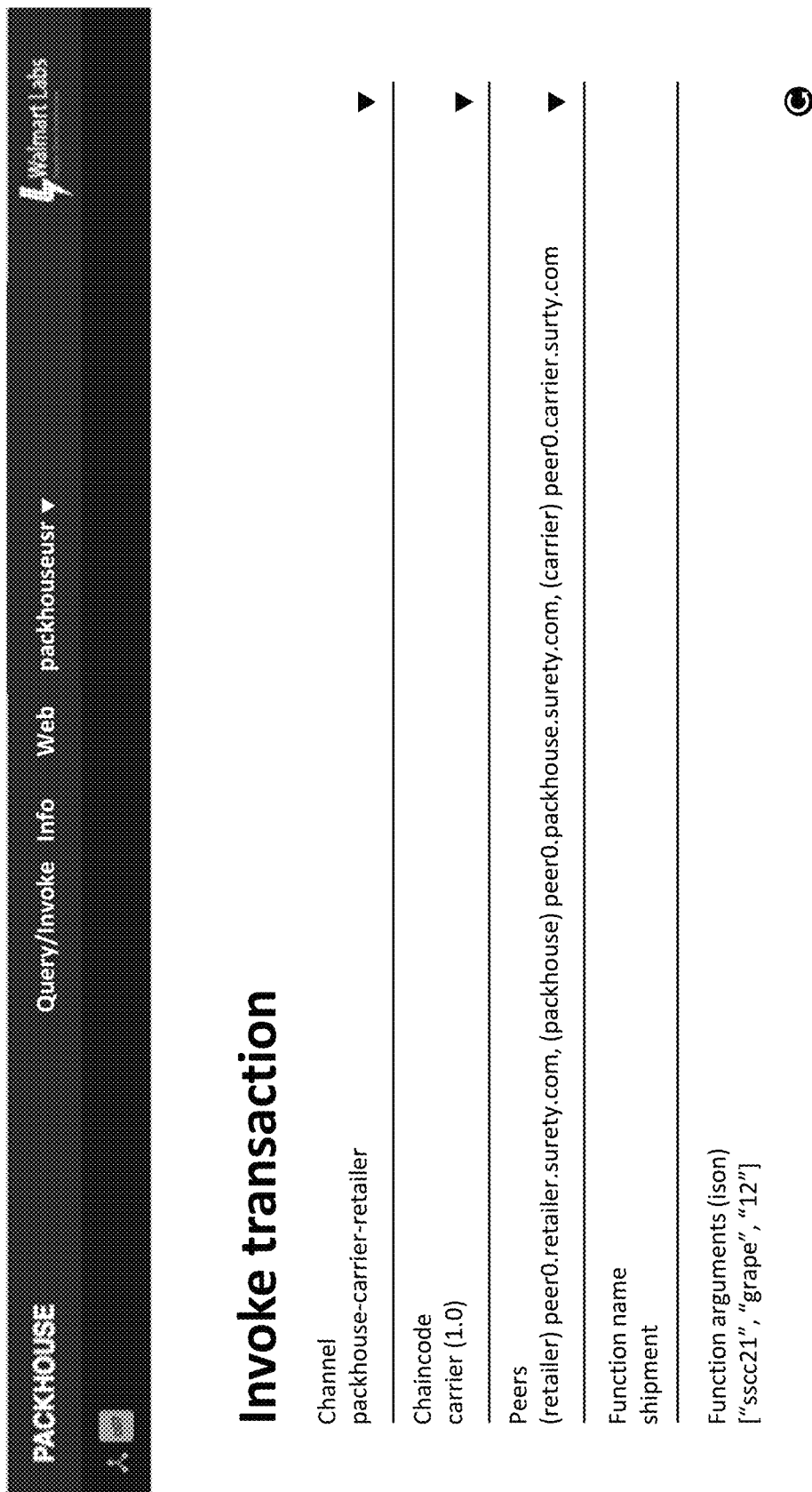

With respect to FIG. 1A, a central computing system can initiate the contract application. The first screen 100 can be rendered on the GUI of the contract application. The first screen 100 can include buttons to create a shipment, add trip, delay shipment, dynamic routing, and shipment information. With reference to FIG. 1B, a shipment screen 102 can be rendered on the GUI, in response to selecting the create shipment button on the first screen (i.e., first screen 200 as shown in FIG. 1A). The shipment screen 102 can include fields to generate a smart contract for a delivery of physical objects. The fields can include a channel to distribute the smart contract, chain code, peers, function name, and function arguments. The channel field can indicate a channel in which the third party computing systems can find the smart contract. The peers field can be conditions/constraints or consensus to which each party in the smart contract has to agree in order for the smart contract to execute. For example, the conditions may include an objective quality of items determined with the aid of hyperspectral imaging and IOT devices as discussed further below. The function name can be the name of the requested function such as "a shipment". The function arguments can be the details associated with the delivery of the physical objects. The details can include destination location, date and time of expected delivery, an amount of the physical objects to be delivered, the identifier of the physical object. In response to completing the field, the central computing system can invoke the transaction to generate a new block in a blockchain record.

Figure 1C:
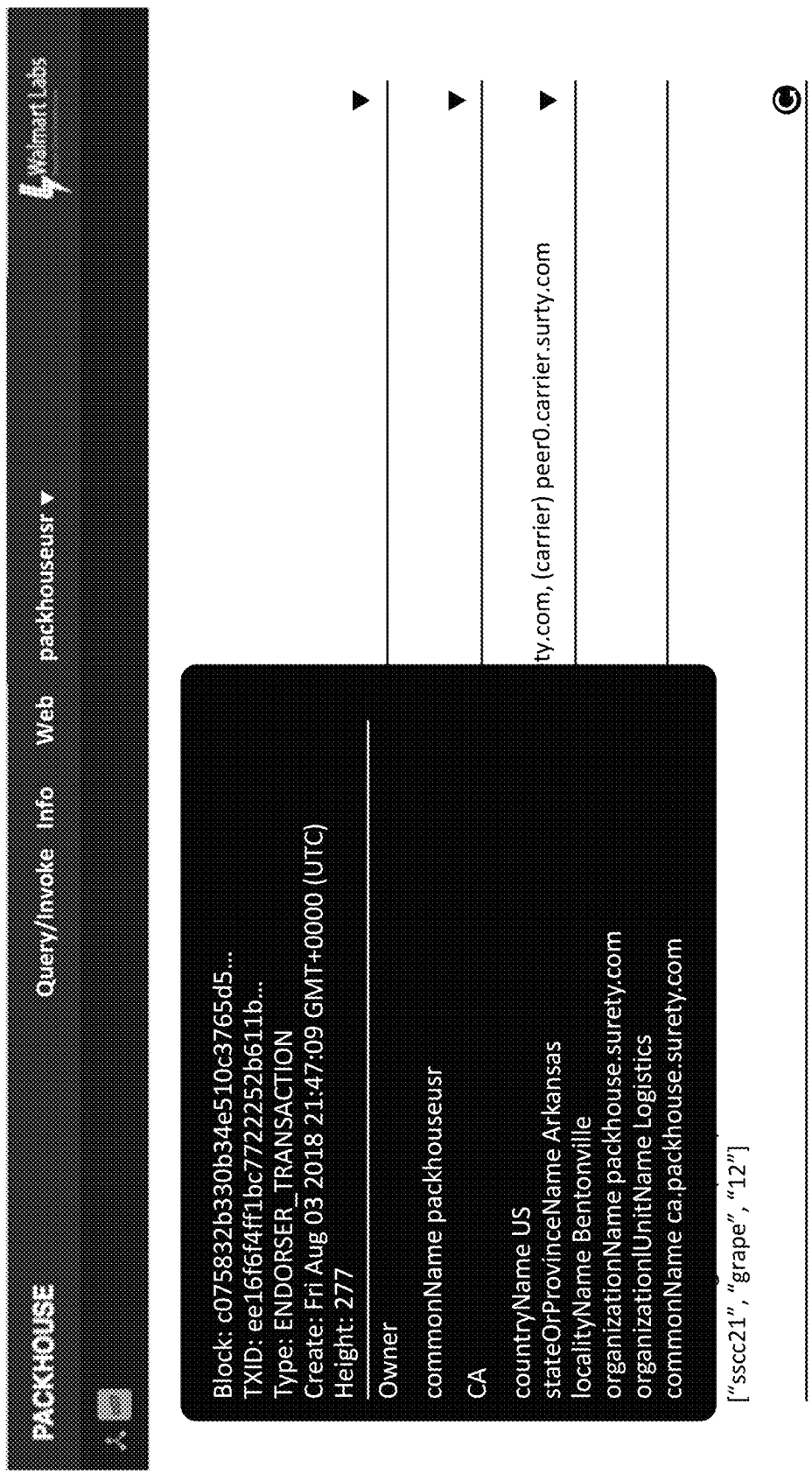

With reference to FIG. 1C, the first block screen 104 can be rendered on the GUI. The first block screen 104 can include information associated with the first block in the blockchain record. The information can include information associated with the smart contract for the delivery of the physical objects.

Figure 1D:
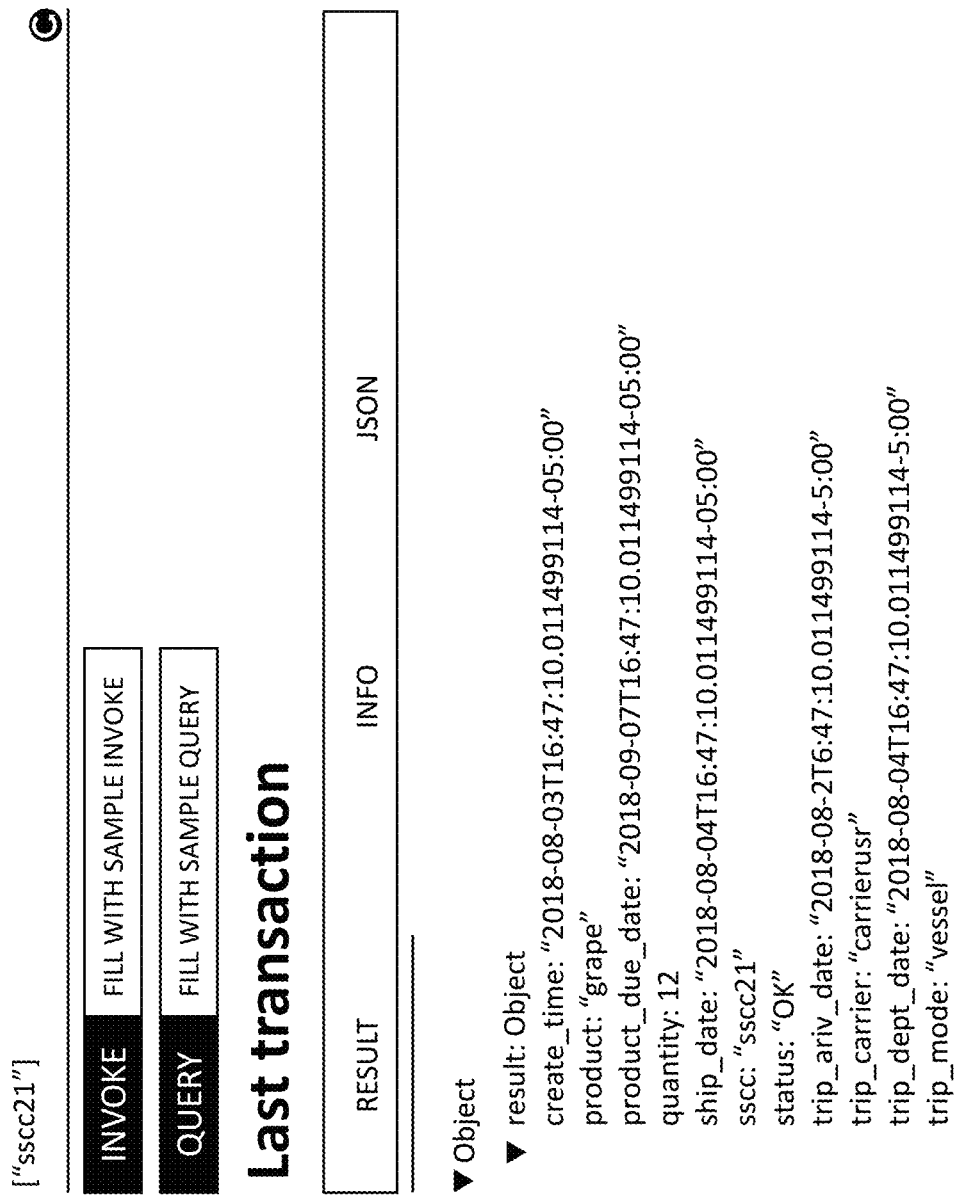

With reference to FIG. 1D, a shipment search screen 106 can be rendered on the GUI. One or more third party computing systems can query the latest blocks added to the blockchain record using the shipment search screen 106. The query can return the block in the blockchain detailing the smart contract.

Figure 1E:
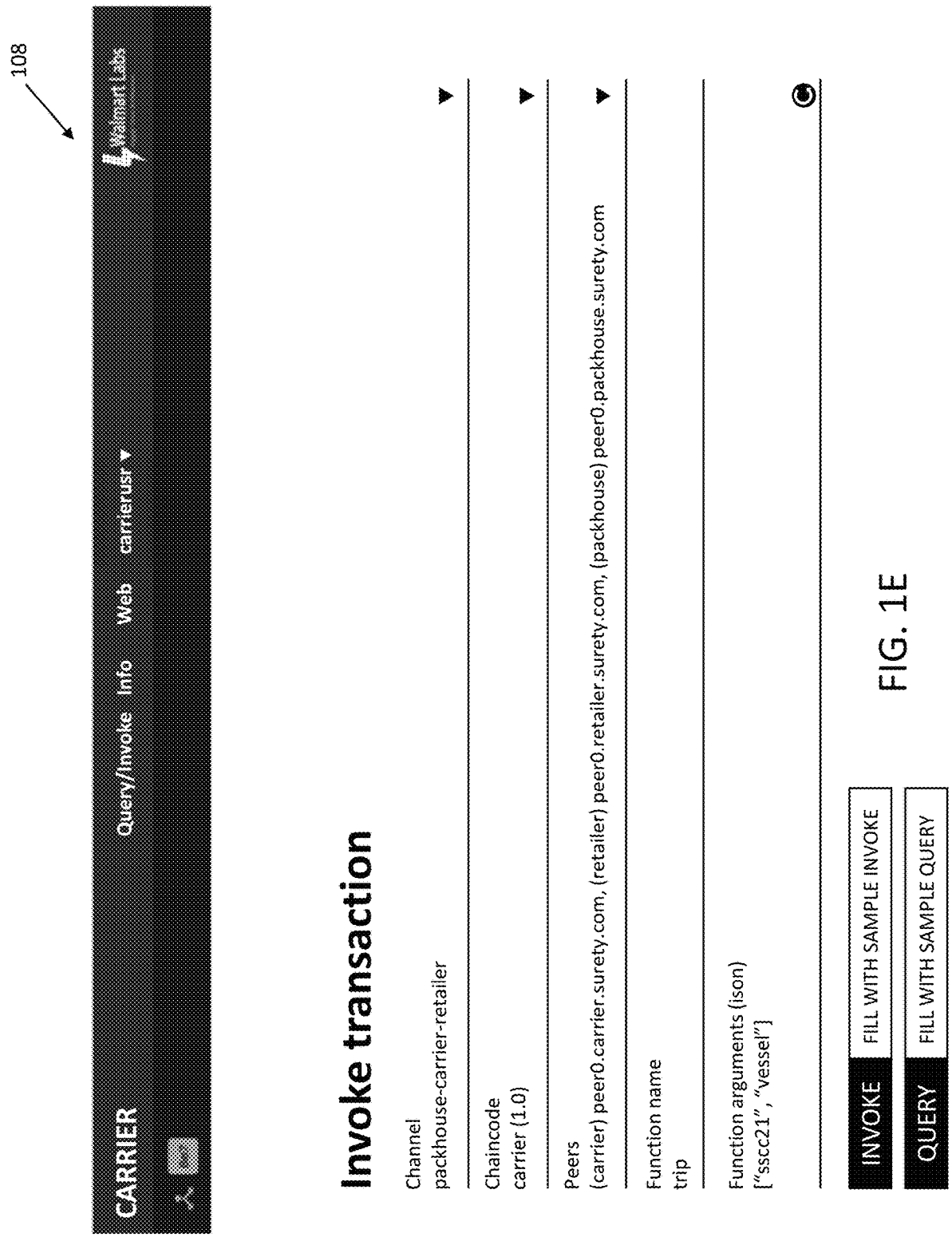

With reference to FIG. 1E, an acknowledgement screen 108 can be rendered on the GUI. The acknowledgement screen allows a third party system to add a trip which carries one or multiple shipments e.g.: vessel details, so that a retailer can track the shipment status through the carrier and can be informed of any delays and take reactive actions based on this delay. In response to the one or more third party computing systems adding a trip, a second block can be generated in the blockchain record.

Figure 1F:
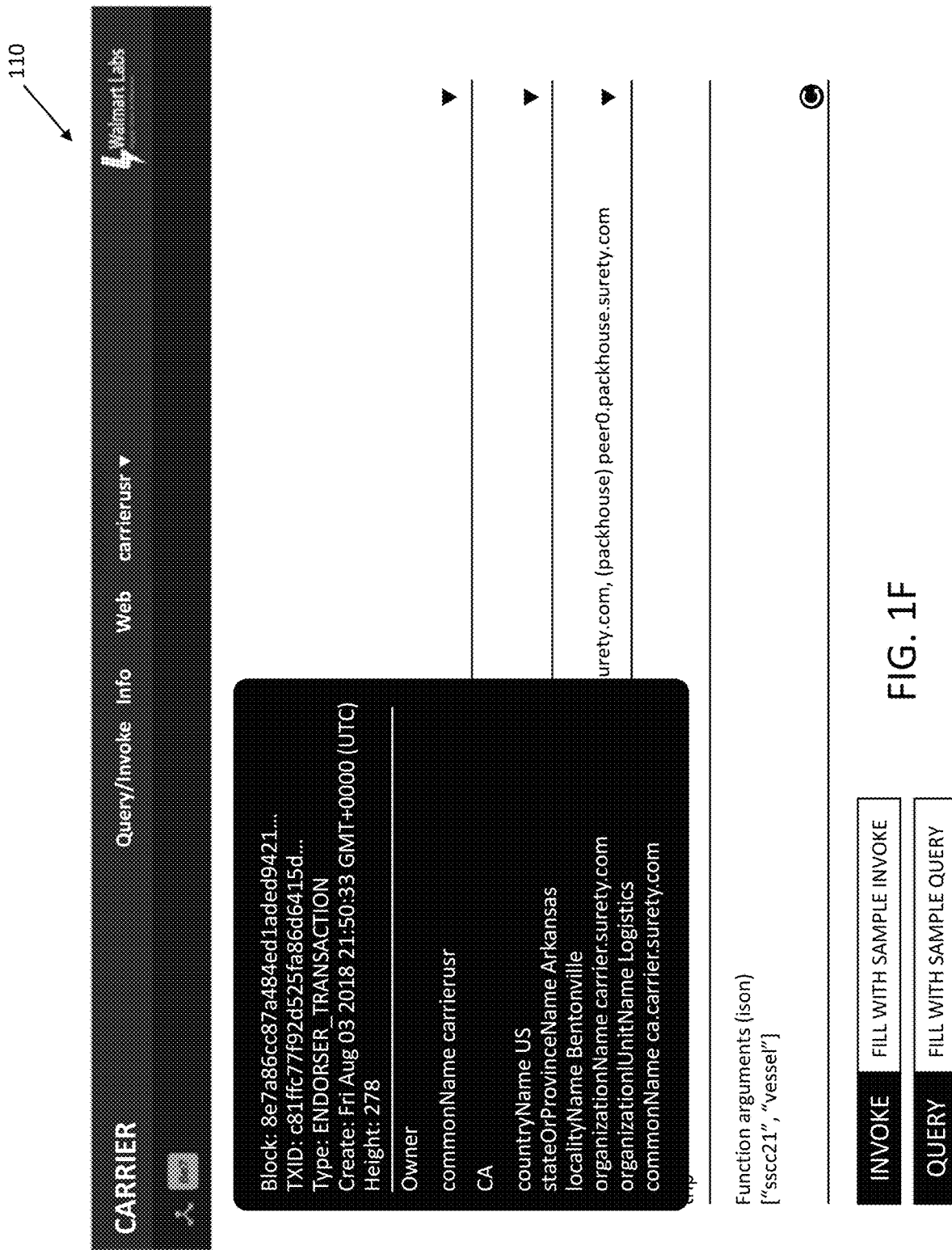

With reference to FIG. 1F, a second block screen 110 can be rendered on the GUI. The second block screen 110 can include information associated with the trip added by the third party system (as shown in FIG. 1E).

Figure 1G:
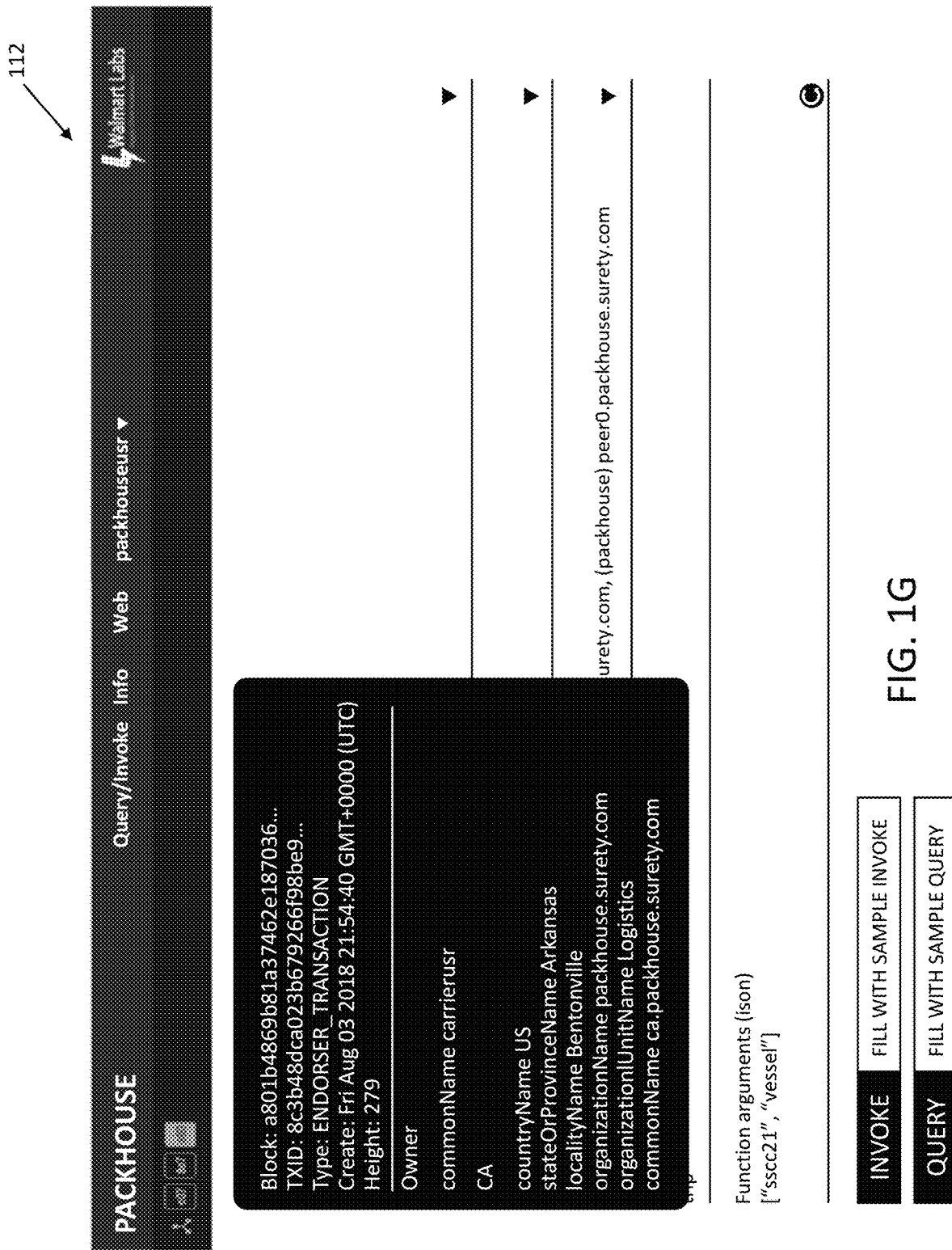

With reference to FIG. 1G, a delay shipment screen 112 can be rendered on the GUI. The one or more third party computing systems can delay the shipment of the physical objects. In response to delaying the shipment, a third block can be generated in the blockchain record detailing the delay in shipment. The delay shipment screen 212 can render the details of the third block.

Figure 1H:
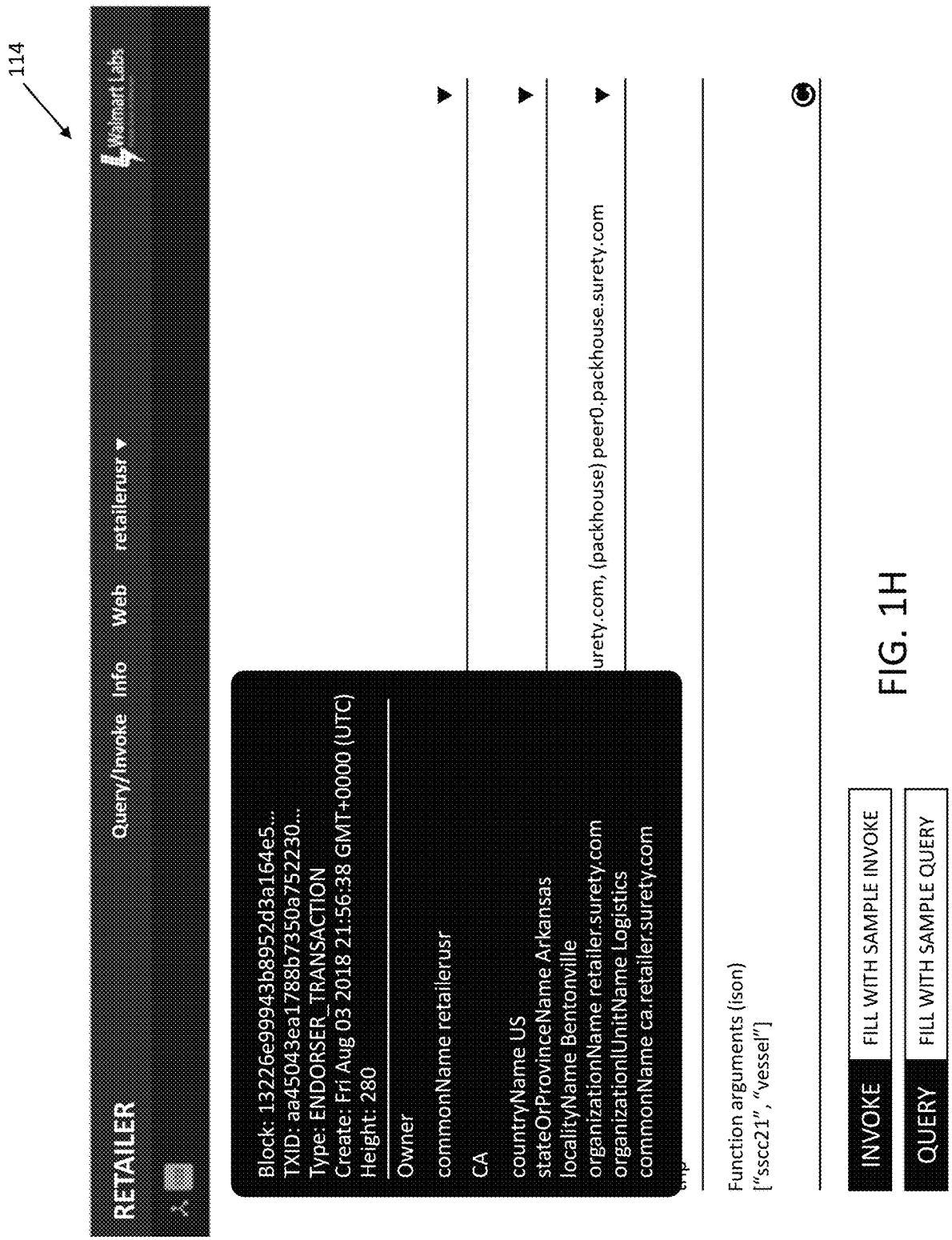

With reference to FIG. 1H, a dynamic re-route screen 114 can be rendered on the GUI. The central computing system can dynamically reroute the delivery of the physical objects to another location, based on the current status of the delivery of the physical objects (i.e., the delay) and/or a cost/benefit analysis. A fourth block can be generated in the blockchain record detailing the rerouting of the physical objects.

With reference to FIGS. 1I-1K, shipment information screens 116-120 can be rendered on the GUI. The shipment information screen 116 can include information associated with shipment of the physical objects at the time of the initiation of the smart contract. The shipment initiation screen 118 can include shipment information associated with the delay in the shipment of the physical objects. The shipment information screen 120 can include shipment information associated with the rerouting of the shipment of the physical objects.

Figure 2A:
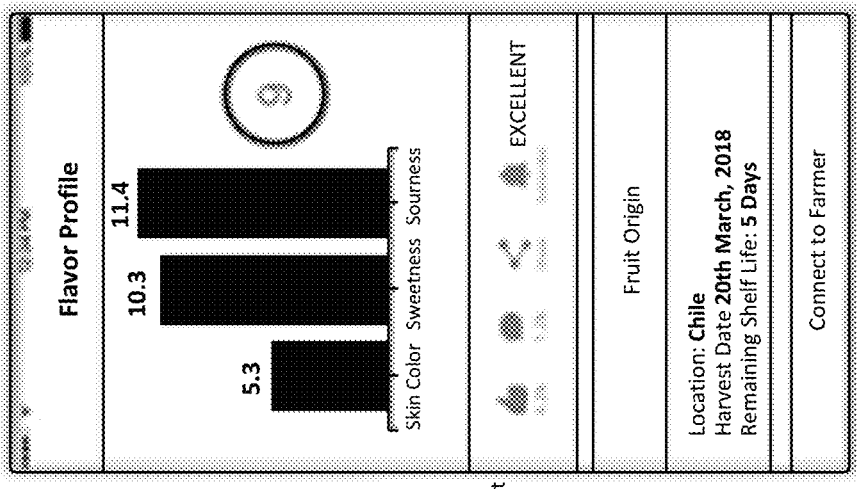
FIGS. 2A-E are exemplary screens to be rendered on a GUI of a computing device in accordance with an exemplary embodiment.
Figure 2A:
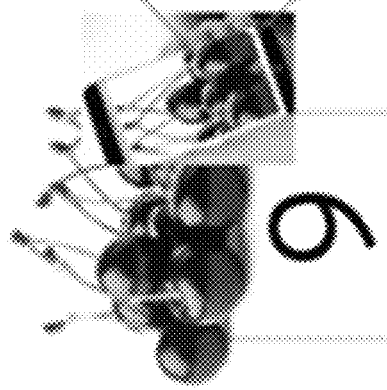
Figure 2B:
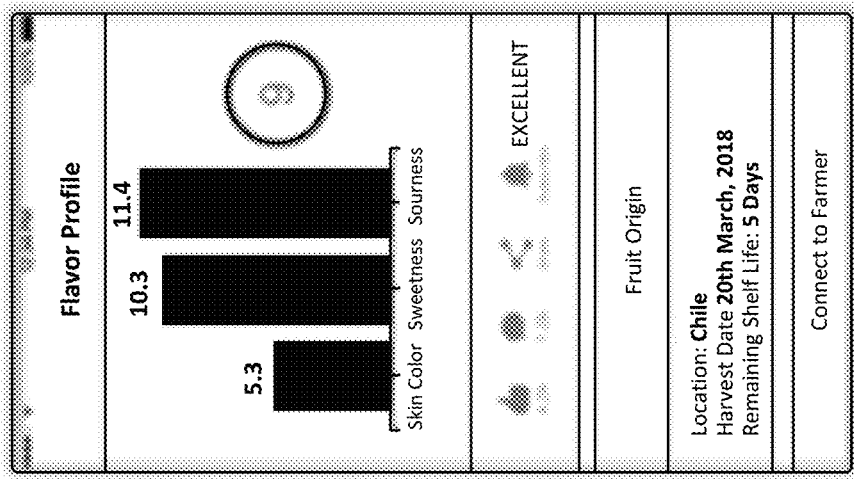
Figure 2B:
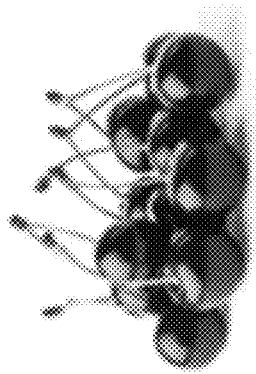
Figure 2B:

The information from the blocks may also be used to provide additional information to an end consumer after the product has arrived in a retail facility. FIGS. 2A-B are exemplary screens to be rendered on a GUI of a computing device in accordance with an exemplary embodiment. The computing device can be operated by a user or a third party computing system. The computing device can execute an object delivery application. As a non-limiting example, the object delivery application can be associated with a retail store selling products such as food or drink items. The object delivery application will be described further with respect to FIG. 3.

With reference to FIG. 2A, a first screen 200 can be rendered on a GUI of a computing device (or mobile device) executing the object delivery application. In one embodiment, a user, such as but not limited to a grocery store customer, can transmit an image of a food or drink item, via the object delivery application. In response to transmitting the image, a flavor profile value can be returned and displayed on the first screen 200. The flavor profile value can identify characteristics associated with the food or drink item, such as skin color, sweetness, sourness, and firmness using information identified by sensors earlier in the product's trip through the supply chain and recorded in blocks. The flavor profile value can further identify compounds to minimize risks of several diseases. The flavor profile value can be a numerical value. The flavor profile value can be rendered on the first screen 100. The first screen can include further information such as a graph of the flavor profile value over time and information associated with the origin of the food or drink item, harvest date, and remaining shelf life.

With reference to FIG. 2B, a second screen 210 can be rendered on the GUI. The second screen 210 can include options to share the flavour profile value on messenger/social media websites, such as Facebook®, Twitter®, Snapchat®, or WhatsApp®. The messenger/social media websites hyperlinks can be embedded in icons which are rendered on the second screen 210. In response to selecting the links the flavor profile of the food or drink item can be embedded on the messenger/social media website.

Figure 2C:
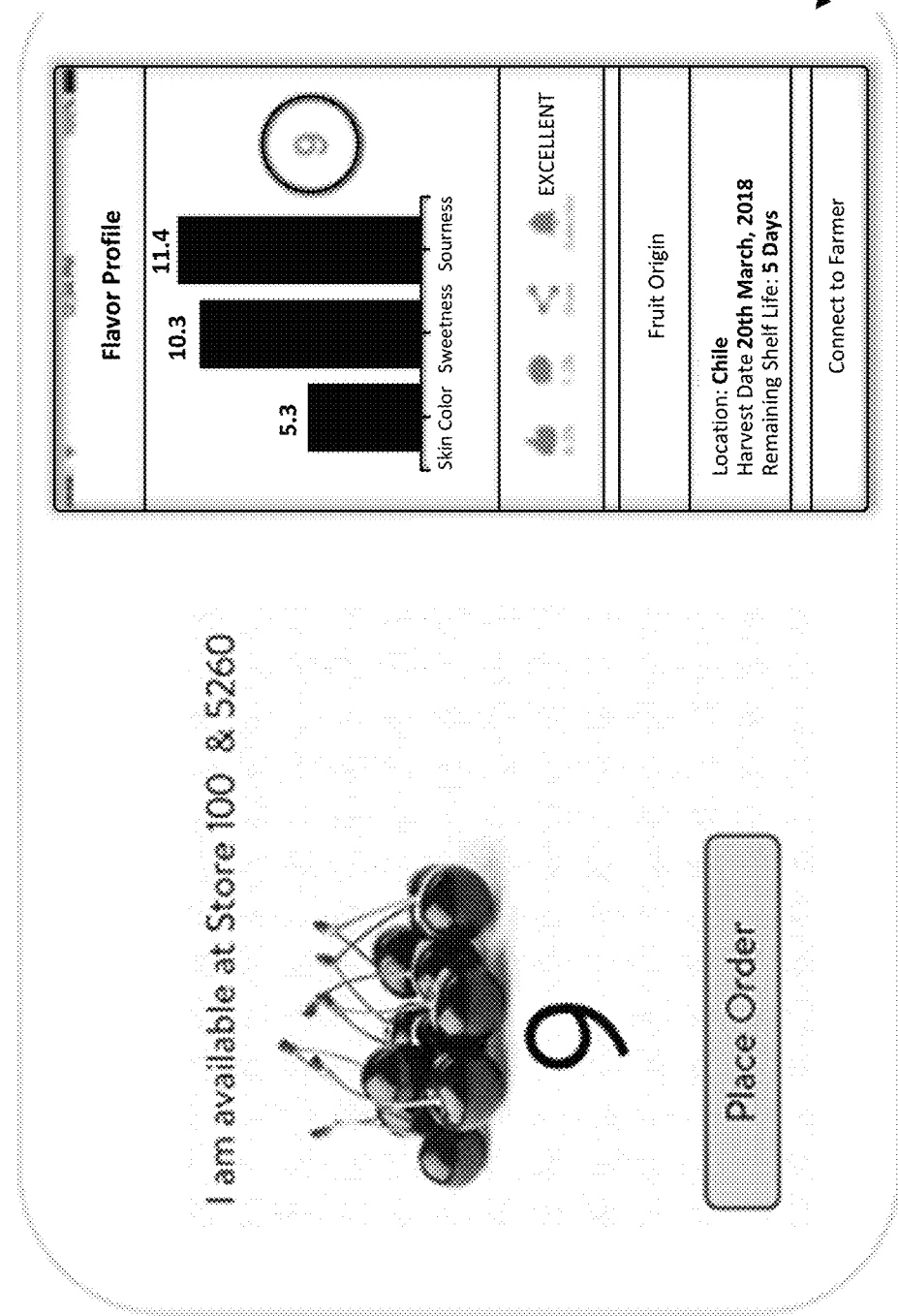

With reference FIG. 2C, a third screen 220 can be rendered on the GUI. The third screen 120 can include a button to place an order for the food or drink item. The third screen 120 can include store IDs where the food or drink item is available. In response to clicking the "place order button" the food or item can be automatically and delivered at a desired location.

Figure 2D:
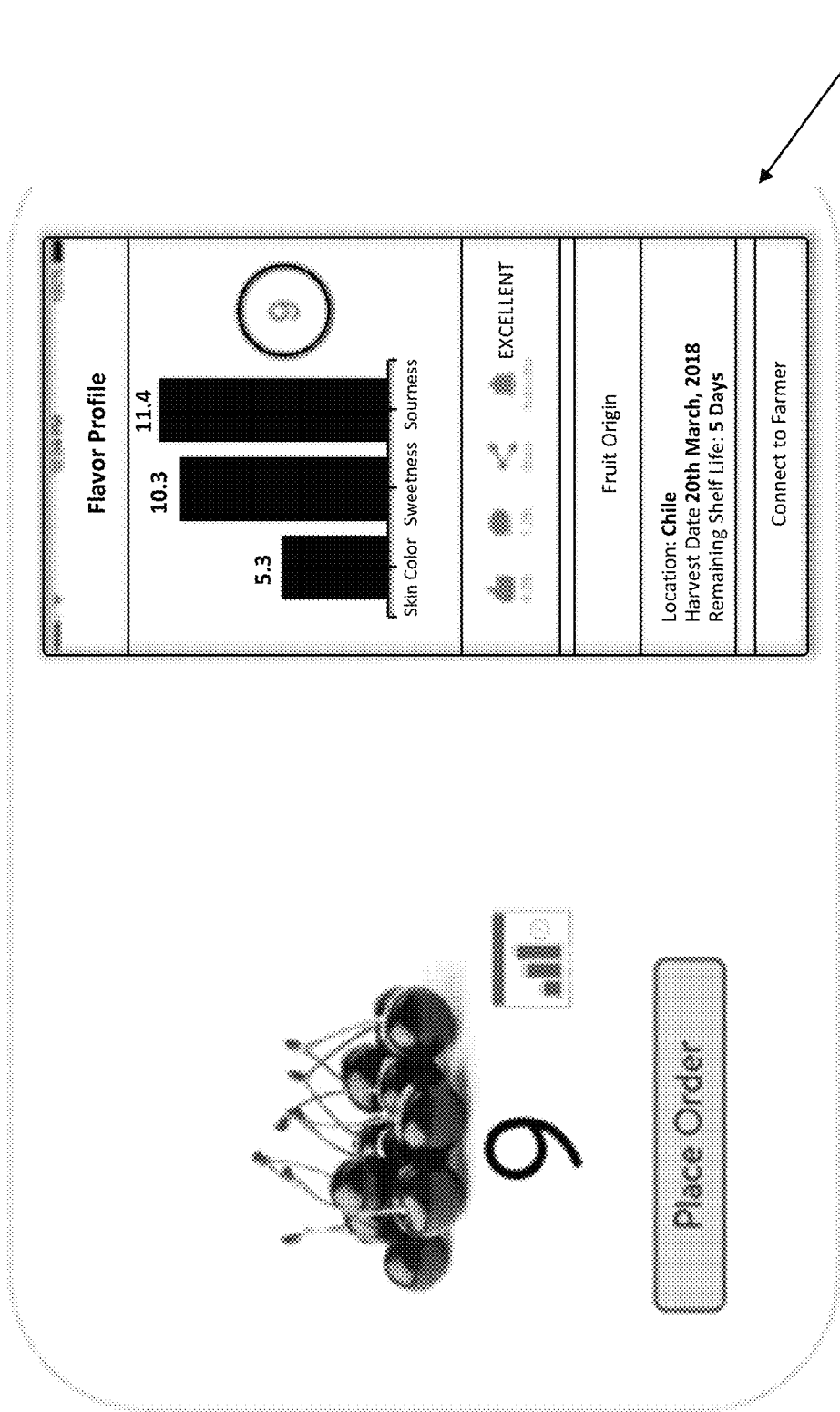

With reference to FIG. 2D, a fourth screen 230 can rendered on the GUI. The fourth screen 230 can include an option to provide comments associated with the food or drink item and the flavor profile value.

Figure 2E:
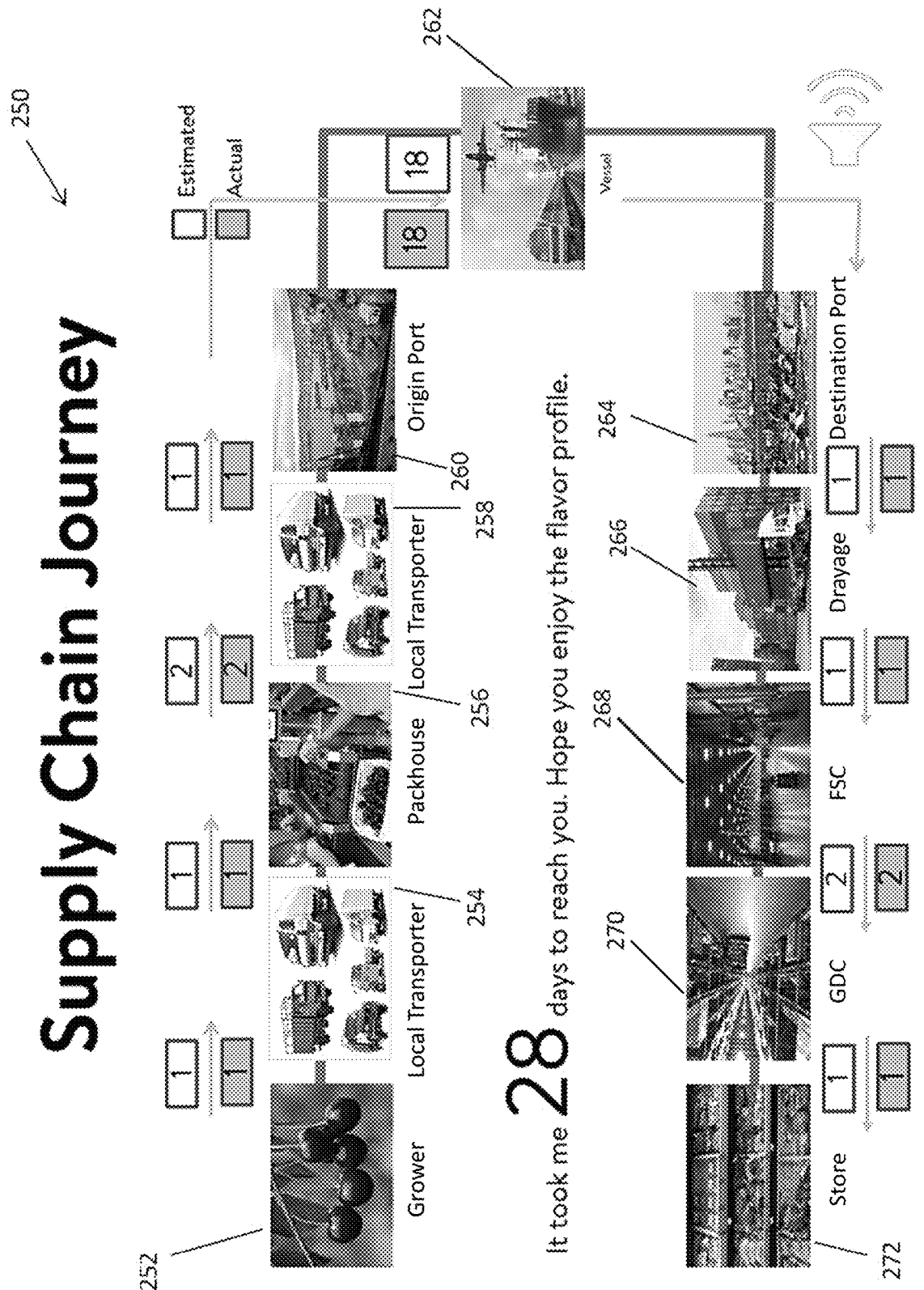

With reference to FIG. 2E, a fifth screen 250 depicting the supply chain process can be rendered on the GUI. The supply chain process can begin at the production stage. For example, in operation 252 food item such as cherries can be harvested. In operation 254, the cherries can be loaded and transported on local transportation to a packaging location. In operation 256, the cherries can be packaged. In operation 258, the cherries can be loaded and transported to an origin port. In operation 260, the cherries can arrive at the origin port.

In operation 262, the cherries can be loaded and transported on a vessel such as train, airplane, truck, or cargo ship. In operation 264, the cherries can reach a destination port. In operation 266, the cherries can be hauled by dray. In operation 268, the cherries can be stored in a warehouse. In operation 270, the cherries can be transported to a general distribution center. In operation 272, the cherries can be transported and displayed at a retail store for sale.

The supply chain process can include an expected time each operation was supposed to take and the actual time each operation took. The supply chain process can also include the amount of days it may take to reach the retail store. It can be appreciated, that while cherries was used as an example, any other type of physical object may also go through the described supply chain process.

In one embodiment, hyperspectral imaging of the physical objects may take place at one or more steps of the objects journey throughout the supply chain and the data gathered by the hyperspectral imaging may be added to associated blocks and/or used to construct a flavor profile for the physical objects. For example, hyperspectral imaging of an object may take place at a farm, at a packaging facility, at a shipping location and/or at a destination location. Additionally, environmental and other data associated with the physical objects such as humidity levels, temperature, vibration levels, light levels, etc. may be gathered by one or more IOT devices and the gathered data may be added to a block associated with the object.

Figure 3:
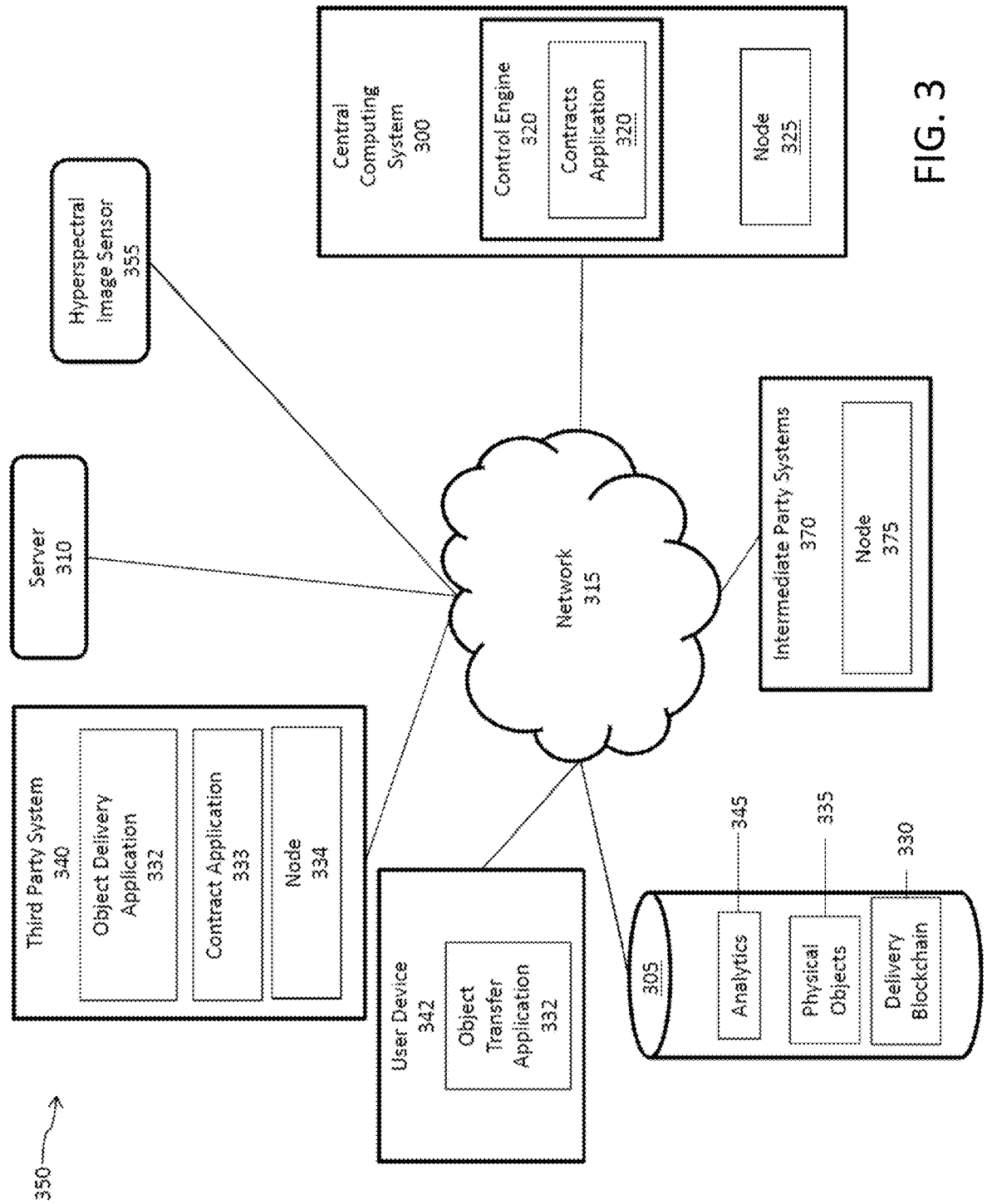
FIG. 3 illustrates an exemplary supply chain forecasting system in accordance with an exemplary embodiment.

FIG. 3 illustrates an exemplary network diagram of a supply chain forecasting system 350 in accordance with an exemplary embodiment. The supply chain forecasting system 350 can include one or more data storage devices 305, one or more central computing systems 300, one or more third party computing systems 340, one or more user devices 342, one or more hyperspectral image sensors 355, and one or more intermediate party computing system 370. The central computing system 300 can be in communication with the data storage devices 305, the third party computing systems 340, the user devices 342, the hyperspectral image sensors 355, and the intermediate party computing system 370, via a communications network 315. The user devices 342 can be associated with users. The third party computing systems 340 can be associated with third party entities delivering physical objects. The third party computing systems 340 and the user devices 342 can execute an instance of the object delivery application 332. The object delivery application 332 can be an executable application configured to provide tracking on the delivery of physical objects.

The central computing system 300 can execute at least one instance of a control engine 320. The control engine 320 can be an executable application executed on the central computing system 300. The control engine 320 can execute the process of the supply chain forecasting system 350 as described herein. The control engine 320 can include a contracts application 333, the contracts application 333 can be configured to initiate, edit and track smart contracts.

In an example embodiment, one or more portions of the communications network 315 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The central computing system 300 includes one or more computers or processors configured to communicate with the third party computing systems 340, the user devices 342, the hyperspectral sensors 355, and the intermediate party computing system 370. The data storage devices 305 can store information/data, as described herein. For example, the data storage devices 305 can include a physical objects database 335, analytics database 345, and a delivery blockchain 330. The physical objects database 335 can include information associated with physical objects and a representation of physical objects. The delivery blockchain 330 can be embodied as a blockchain storage system that is configured to store a blockchain record or a shared ledger based on a delivery of physical objects to and from a third party. A blockchain may generally refer to a distributed database that maintains a growing and ordered list or chain of records in which each block contains a hash of some or all previous records in the chain to secure the record from tampering and unauthorized revision. A hash generally refers to a derivation of original data. In some embodiments, the hash in a block of a blockchain may include a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may include one or more of a data hash of the previous block, a timestamp, a cryptographic nonce, a proof standard, and a data descriptor to support the security and/or incentive features of the system. As an example, the blockchain storage system can store digital licenses, invoices, receipts, or rights of ownership associated with physical objects and the central computing system 300 can use the blocks of the blockchain to authorize the transfer of ownership of physical objects. The analytics database 345 can store data associated with forecasting the delivery of physical objects. The data storage devices 305 and the central computing system 300 can be located at one or more geographically distributed locations from each other. Alternatively, the data storage devices 305 can be included within the central computing system 300.

The central computing system 300 can include one or more nodes 325. Each of the one or more nodes 325 can store a copy of the delivery blockchain 330 associated with the transfer of one or more physical objects. The one or more nodes 325 can be configured to update the blocks in the delivery blockchain 330 based on the operation or transfer of one or more physical objects. The third party computing system 342 can execute an instance of the contract application 333 and a node 334. The node 334 can store a partial and/or full copy of the delivery blockchain 330. The contract application 333 can be an executable application configured to search the blockchain records and accept smart contracts included in blocks of the blockchain record. The intermediate party computing system 370 can include a node 375. The node 375 can store a partial and/or full copy of the delivery blockchain 375. The nodes 325, 334, and 375 can receive an alert each time a new block is generated in the delivery blockchain 375. The nodes 325, 334, and 375 can verify the event which spawned the creation of the new block in the delivery blockchain 330.

In one embodiment, the control engine 320 can execute the contract application 333 of the central computing system 300 can generate a smart contract for delivery of a specified amount of one or more physical objects. The smart contract can also include identifiers associated with the physical objects and a destination location. The smart contract can include constraints/conditions which must occur for the smart contract to execute. The smart contract can include a consensus. The consensus can be the parties (i.e., third party computing systems 340) which need to accept the smart contract. Upon delivery of the physical objects and fulfilling the constraints/conditions the smart contract can automatically self-execute. For example, the constraints/conditions can include one or more of a type of physical object, condition of physical object, a specified amount of the physical object, delivery location, type of third party computing system delivering the object, price, a total monetary value, date and time of delivery and cost associated with delivery. In response to the generation of the smart contract, the node 325 can create a new block in the delivery blockchain 330. The new block can store a copy of the smart contract including the identifiers associated with the physical objects, destination location, and constraints/conditions associated with the smart contract.

A third party computing system 342, using the contract application 333 can query the delivery blockchain 330 and identify the new block including the smart contract. The third party computing system 342 can generate a new event by accepting the smart contract. In response to the new event being generated, the node 334 can create a new block in the delivery blockchain 330. The node 325 can receive an alert of the new block including the acceptance/acknowledgment of the smart contract by the third party computing system 342. The new block can include a hash value of the previous block.

In one embodiment, in response to the delivery blockchain creating a new block including the smart contract, the node 325 can transmit an alert to some or all third party computing systems 342 of the creation of the new block in the delivery blockchain including the smart contract. Alternatively, or in addition to, the node 334 can automatically determine a new block has been created. In one embodiment, the contract application 333 can identify the smart contract and the identifiers associated with the physical objects, destination location, and constraints/conditions associated with the smart contract. The contract application 333 of the third party computing system 340 can automatically accept the smart contract in response to being able to forecast fulfillment of the contract.

In response to the, third party computing system 340 accepting the smart contract, the control engine 320 can begin to track the delivery of the physical objects. The third party computing systems 340 can begin the delivery of the physical objects. The third party computing system 340 can interface with multiple intermediate party computing systems 370 to complete the delivery of the physical objects. The intermediate party computing system 370 can be part of the consensus. The intermediate party computing system 370 can be associated with the delivery entities, airlines, couriers, suppliers, distributors, farms, or other entities associated with delivering physical objects. In one embodiment, the intermediate party computing system 370 can be, or can include, IoT devices. Each time a third party computing system 340 interfaces with an intermediate party system 370 the node 334 or the node 375 can generate a new block indicating the new event associated with the delivery of the physical objects. For example, the new event can be packaging of the physical objects, loading the physical objects onto a transportation vehicle, or other events associated with the delivery of the physical object. Each new block can include a hash value of the previous block. In response to the delivery of the physical objects and fulfilling all of the constraints/conditions, the node 325 can generate a new block in the delivery blockchain 330 indicating the fulfilment of the smart contract. The new block can include a hash value of the previous block.

In one embodiment, the control engine 320 can query the analytics database 345 to retrieve information forecasting the delivery of the physical objects. The analytics database 345 can include information such as information associated with the third party computing system 340 such as past history of delivery of physical objects, the travel time from the third party computing system 340, and other forecasting information associated with the physical object. The control engine 320 can further retrieve information associated with the delivery of the physical object from the blocks associated with the delivery of the physical objects in the delivery blockchain 330. The information can include a location and status of the physical objects. The control engine 320 can reach a determination that one or more constraints/conditions of the smart contract may not be fulfilled and in view of this the smart contract may not be executed, based on the information associated with the delivery of the physical objects and the information retrieved from the analytics database 345. For example, the control engine 320 can determine based on the information received from the blocks in the delivery blockchain 330 that a less than a specified amount of physical objects were loaded onto a delivery vehicle associated with an intermediate party system 340. As another example, the control engine 320 can determine the delivery is going to take longer than the date and time of delivery indicated in the constraints/conditions of the smart contract due to inclement weather, heavy traffic, or other circumstances, based on information retrieved from the analytics database 330. As another example, the control engine 320 can determine the third party computing system 340 may not be able to fulfill the delivery of the physical objects based on the availability of the physical objects for the third party computing system.

In one embodiment, in response to the control engine 320 determining that the smart contract may not be executed based on a failure of meeting one of the constraints/conditions of the smart contract, the contract application 333 can instruct the node 325 to generate a new block in the delivery blockchain 330 indicating a cancelation of the smart contract. Alternatively, the contract application 333 can instruct the node 325 to generate a new block of the smart contract including an adjustment to the constraints/conditions of the smart contract. For example, the adjustments can be associated with the specified amount of physical objects, the delivery costs, monetary amount due, date and time of expected delivery, a re-routing of the delivery to a new delivery destination location, or other data associated with the delivery of the physical objects. Alternatively, or in addition to, the node 325 can generate a side chain with a new block including the new smart contract to reconcile the constraints/conditions not being met.

In one embodiment, the physical objects requested for delivery can be a perishable item such as food or drink items. A flavor profile can be associated with the food or drink item. The flavor profile can indicate characteristics of the food or drink item, such as color, taste, and physical state. As an example, the food or drink can be cherries. The flavor profile can be associated with the skin color, sweetness, sourness, and firmness of the cherries. The flavor profile can be a numerical value. As a non-limiting example, the numerical value can be from 0-10, where 10 represents a high flavor value and 0 represents a low flavor value.

The node 325 can generate new block in the delivery blockchain, including a smart contract for a food or drink item. The constraints/conditions for the smart contract can include a specified flavor profile. For example, the condition of the smart contract can be that the food or drink item cannot have a less than a specified flavor profile value at the time of delivery of the food or drink item. Additionally, a constraint/condition of the smart contract can include a hyperspectral image sensor reading of the food or drink item prior to delivery of the food or drink item. A hyperspectral image sensor 355 can capture an image of a physical object. The hyperspectral image sensor 355 can obtain the spectrum for each pixel of an image in a scene. A hyperspectral image sensor's 355 image can be used to find objects, identify materials, and detect process. For example, a hyperspectral image sensor's 355 image can be used to determine a decomposing or damaged food item. In this regard, the hyperspectral image sensor's 355 image can be used to determine color, taste, and physical state of a food or drink item. Additionally the hyperspectral image sensor 355 can be an Internet of Things (IoT) device. The hyperspectral image sensor 355 can include a transceiver and communicate over the communications network 315.

A third party computing system 340 can accept the smart contract by the node 334 generating a new block in the delivery blockchain 330, including an acceptance/acknowledgement of the smart contract and the hash value of the block including the smart contract. Prior to delivery, the third party computing system 340 can capture an image of the food or drink items using the hyperspectral image sensor 355. The node 334 can generate a new block including the image captured by the hyperspectral image sensor 355. The control engine 320 can determine a flavor profile value of the food or drink items by executing an analysis of the image captured by the hyperspectral image sensor 355. The control engine 320 can generate a new block in the delivery blockchain 330 including the flavor profile value of the food or drink item.

The control engine 320, via the contract application 333, can track the delivery of the food or drink item. The flavor profile value can decrease overtime. The control engine 320 can determine the rate at which the flavor profile value decreases over time. Each time the flavor profile value decreases more than a threshold amount, the node 325 can generate a new block in the delivery blockchain 330 including the new flavor profile value. The control engine 320 can retrieve information from the analytics database 345 and retrieve the information associated with the delivery of the food or drink item from the delivery blockchain 330. The control engine 320 can determine that the flavor profile value of the food or drink item may decrease below a specified threshold level by the time of the delivery, based on the retrieved information from the analytics database 345 and the information associated with the delivery of the food or drink item. In one embodiment, the contract application 333 can instruct the node 325 to generate a new block in the delivery blockchain 330 including information associated with voiding the smart contract, in response to the control engine 320 determining that the flavor profile value of the food or drink item may decrease below a minimum threshold amount. Alternatively, the contract application 333 can instruct the node 325 to generate a new block in the delivery blockchain 330 including an adjustment of the constraints/conditions of the smart contract. The adjustments can be a change in monetary value, an adjustment to the minimum threshold flavor profile value, or a re-routing of the delivery to a new delivery destination location.

As a non-limiting example, the supply chain forecasting system 350 can be implemented as in a retail store and/or e-commerce website. The physical objects can be products for inventory at retail stores. The third party computing systems 340 can be vendors or suppliers of the products. The central computing system 300 can be associated with the retail store. The user device 342 can be associated with a customer. The retail store can purchase inventory from the vendors of or suppliers. The delivery blockchain 330 can be used to track the delivery of the products. In one embodiment, based on the real-time tracking of the delivery of the retail store can re-route the delivery to different stores. For example, based on the real-time tracking, if it is determined a flavor profile value of a food or drink item is going to decrease below a minimum threshold amount by the time of delivery, the delivery of the food or drink item can be re-routed to another retail store that is closer to the current location of the delivery of the food or drink item. In another embodiment, if the real-time tracking indicates that fewer physical objects than agreed may arrive at a destination by a due date, additional supplies of the physical objects may be programmatically ordered from a different supplier to ensure an adequate supply.

In one embodiment, a customer can execute the object delivery application 332 on their user device 342. The object delivery application 332 can render screens (i.e., screens 100-130) providing a GUI on the user device 342 that indicate the flavor profile value of the food or drink item delivered to the retail store. A customer can track the delivery from the originating location to the delivery of the retail store using the user application 342. The customer can also track the change in the flavor profile value of the food or drink item over time. Each time a new block is generated in the delivery blockchain including a new flavor profile value of the food or drink item, the control engine 320 can interface with the object delivery application 332 to update the flavor profile value. In one embodiment, the third party computing system 340 can also track the flavor profile value by executing an instance of the object delivery application 332.

Figure 4:
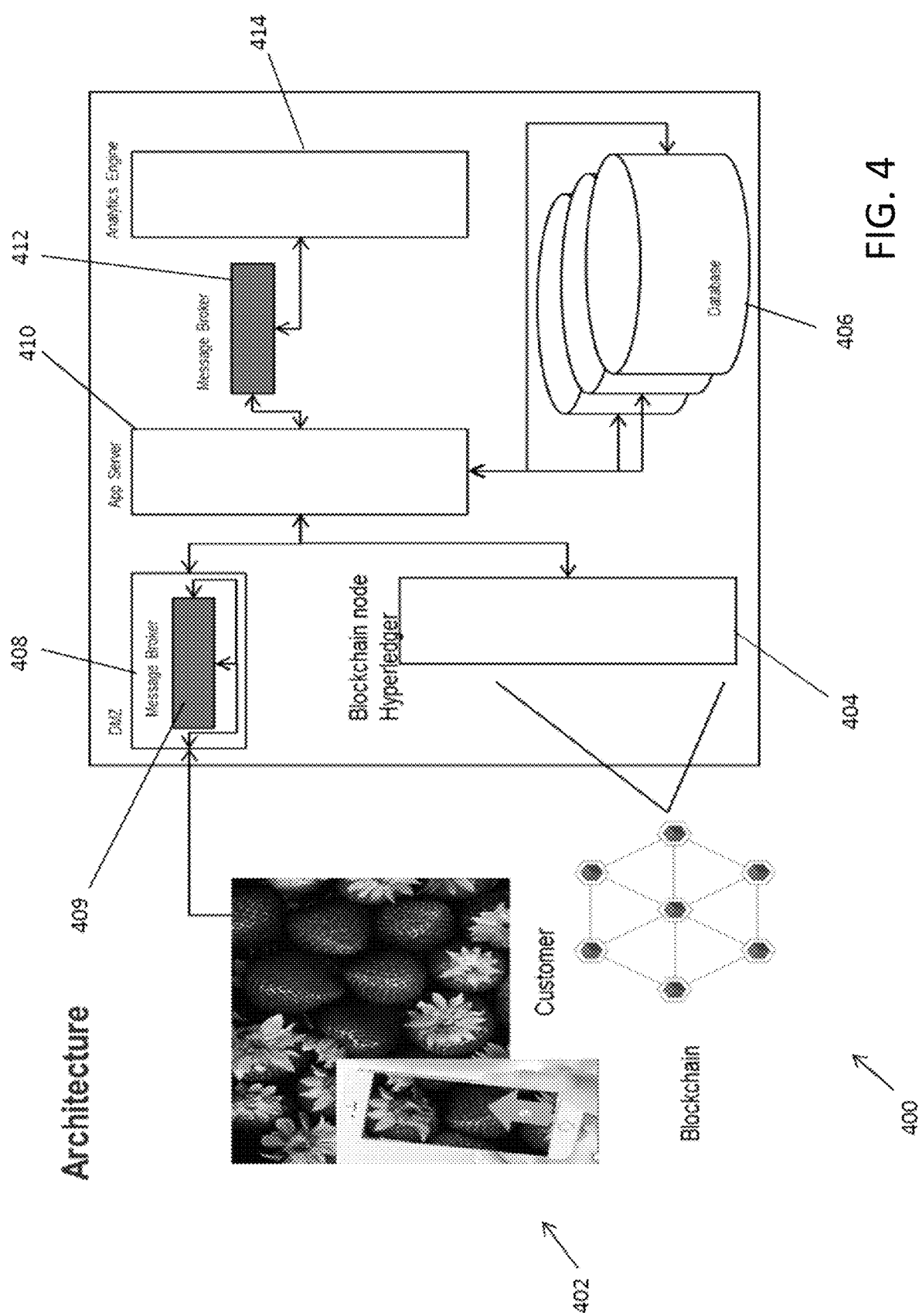
FIG. 4 illustrates an exemplary architecture in accordance with an exemplary embodiment.

FIG. 4 illustrates an exemplary architecture 400 of the supply chain forecasting system in accordance with exemplary embodiments. The architecture 400 can include a mobile device 402, a hyperledger blockchain node 404, a database 406, a DMZ 408, an app server 410, a message broker 412, an analytics engine 414. The hyperledger blockchain node 404 can store a copy of a blockchain record associated with a flavor profile value of a food or drink item. The mobile device 402 can execute an instance of an application (e.g., object delivery application 332 or contract application 333 as described in FIG. 3). The application can be hosted on the app server 410. The mobile device 402 can be a user device (e.g., user device 342 as shown in FIG. 3) or a part of a third party computing system (e.g., third party computing system 340 as shown in FIG. 3).

The DMZ 408 can be embodied as a firewall configured to interface with the user device 342 and the app server and hyper blockchain node 404. The DMZ can include a message broker 409. The message broker 409 can receive and distribute messages from the DMZ 408. The analytics engine can be separate or integrated with the control engine (e.g., control engine 320 as shown in FIG. 3). The database 406 can be separate or be integrated with the databases (e.g., databases 305 as shown in FIG. 3).

In one embodiment, a mobile device 402 can capture an image of a food or drink item and transmit the image to the app server 410. The message broker 409 of the DMZ 408 can receive the image and forward the image to the hyperledger blockchain node 404 and the app server 410. The hyperledger blockchian node 404 can create a new block in the blockchain record associated with the flavor profile values of the food or drink items. The new block can include the image of the food or drink item. The app server 410 can retrieve information associated with the food or drink item from the database 406. The app server 410 can forward the image and information associated with the food or drink item, to the analytics engine, via the message broker 412. The analytics engine 414 can execute an analysis on the image to determine the flavor profile value of the food or drink item based on the image and the information retrieved from the database 406. The analytics engine 414 can also determine a forecast of a rate at which the flavor profile value may decrease overtime. The analytics engine 414 can transmit the flavor profile value to the app server 410. The app server can transmit the flavor profile value to the hyperledger blockchain node 404. The hyperledger blockchain node 404 can create a new block in the blockchain record associated with the flavor profile values of the food or drink items. The new block can include the flavor value of the food or drink item. The app server 410 can also transmit the flavor profile value to the mobile device 402, via the message broker 409 of the DMZ 408. The flavor profile value can be rendered on the display of the mobile device 402.

Descriptions of some embodiments of blockchain technology are provided with reference to FIGS. 5-9 herein. In some embodiments, blockchain technology may be utilized to track/verify the delivery of physical objects as described herein. One or more of the central computing systems described herein may include a node in a distributed blockchain system storing a copy of the blockchain record. Updates to the blockchain may include information associated with requests for transferring one or more physical objects, and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of being kept at a trusted party. However, exemplary embodiments of the present disclosure can also utilize a private (trusted) system to maintain the blockchains.

In some embodiments, the supply chain forecasting system includes a distributed timestamp server including multiple nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, e.g., resulting from in-field authentication of autonomous electronic devices, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it.

Figure 5:
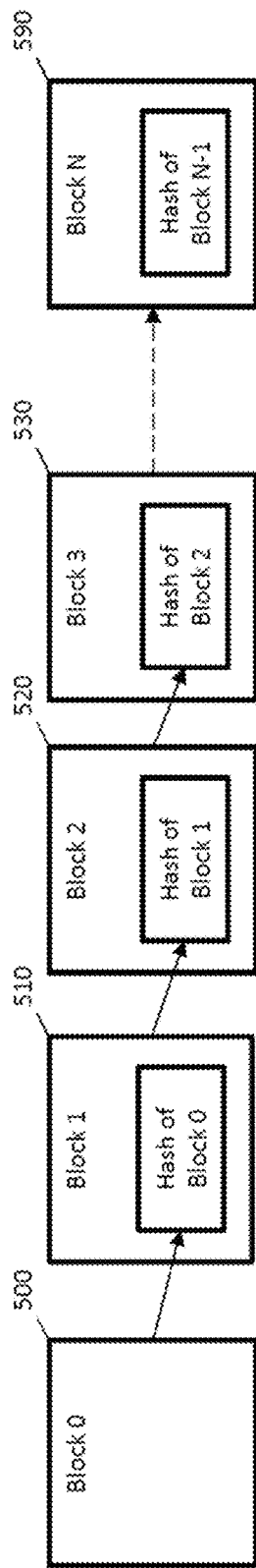
FIG. 5 depicts blocks in a blockchain as configured in accordance with an exemplary embodiment.

Now referring to FIG. 5, an illustration of a blockchain according to embodiments of the present disclosure is shown. As mentioned in above, with reference to FIG. 3, a blockchain includes a hash chain or a hash tree in which each block added in the chain contains a hash of the previous block. In FIG. 5, block 0 500 represents a genesis block of the chain and can be generated in response to initiation of a request to transfer one or more physical objects. The block 0 500 can include information associated with the delivery of the one or more physical objects and a hash key, and a timestamp. The information associated with the delivery of the one or more physical objects can include information associated with the physical objects, destination location, a smart contract, constraints/conditions of the smart contract, updates to the delivery of the physical objects, a hyperspectral image of the physical object, and information associated with the ownership of the physical objects. Block 1 510 can be generated in response to a verification of the transfer of the physical objects during the delivery process of the physical objects. The block 1 510 can contain a hash of block 0 500. If the transfer of one or more physical objects is verified the block 1 510 can include the information associated with the transfer of the physical objects and updates to the delivery of the physical objects. Otherwise, the block 1 510 can include information indicating a transfer was not verified. Additional blocks can be generated as additional requests are received and each block that is generated can include a hash of a previous block. For example, block 2 520 can be generated in response to a subsequent request and can contain a hash of block 1 510, block 3 530 can be generated in response to a yet another subsequent request and can contain a hash of block 2 520, and so forth. Continuing down the chain, block N contains a hash of block N−1. The block N can include information of the execution or failure to execute a smart contract. In some embodiments, the hash may include the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may include a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may include a plurality of transaction and/or activity records.

In some embodiments, the blocks generated by the central computing system can contain rules and data for authorizing different types of actions and/or parties who can take action as described herein. In some embodiments, transaction and block forming rules may be part of the software algorithm on each node. When a new block is being formed, any node on the system can use the prior records in the blockchain to verify whether the requested action is authorized. For example, a block may contain a public key associated with the user of a user device that purchased/acquired the design file that allows the user to show possession and/or transfer the digital license using a private key. Nodes may verify that the user is in possession of the one or more physical objects and/or is authorized to transfer the one or more physical objects based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. Nodes can compete to provide proof-of-work to form a new block, and the first successful node of a new block earns a reward.

Figure 6:
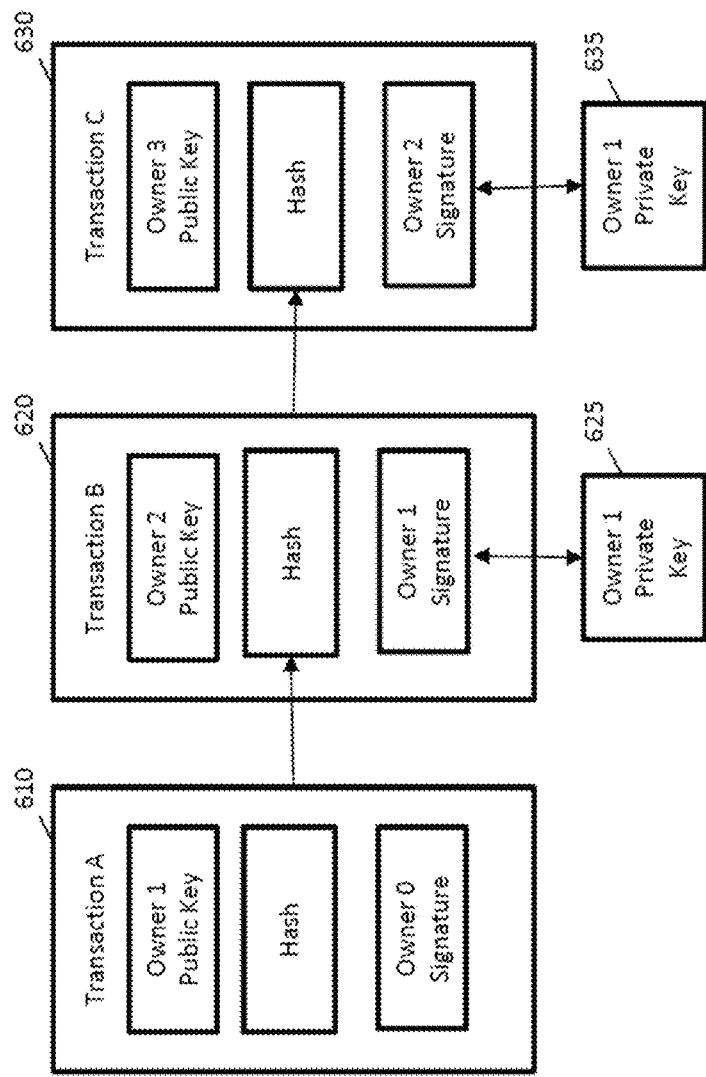
FIG. 6 depicts blockchain transactions in accordance with an exemplary embodiment.

Now referring to FIG. 6, an illustration of blockchain based transactions according to some embodiments is shown. In some embodiments, the blockchain illustrated in FIG. 6 includes a hash chain protected by private/public key encryption. Transaction A 610 represents a transaction recorded in a block of a blockchain showing that owner 1 (recipient) (e.g., a first user who acquired the physical objects from owner 0 such as a supplier). Transaction A 610 contains owner's 1 public key and owner 0's signature for the transaction and a hash of a previous block. When owner 1 (e.g., the first user) transfers the physical objects to owner 2 (e.g., a second user such as another user in the supply chain), a block containing transaction B 620 is formed. The record of transaction B 620 includes the public key of owner 2 (recipient), a hash of the previous block, and owner 1's signature for the transaction that is signed with the owner 1's private key 625 and verified using owner 1's public key in transaction A 610. If owner 2 (e.g., the second user) transfers the physical objects to owner 3 (the third user, such as another user in the supply chain), a block containing transaction C 630 is formed. The record of transaction C 630 includes the public key of owner 3 (recipient), a hash of the previous block, and owner 2's signature for the transaction that is signed by owner 2's private key 635 and verified using owner 2's public key from transaction B 620. In some embodiments, when each transaction record is created, the system may check previous transaction records and the current owner's private and public key signature to determine whether the transaction is valid. In some embodiments, transactions are be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 6 are shown as an example only. In some embodiments, a blockchain record and/or the software algorithm may include any type of rules that regulate who and how the chain may be extended. In some embodiments, the rules in a blockchain may include clauses of a smart contract that is enforced by the peer-to-peer network.

Figure 7:
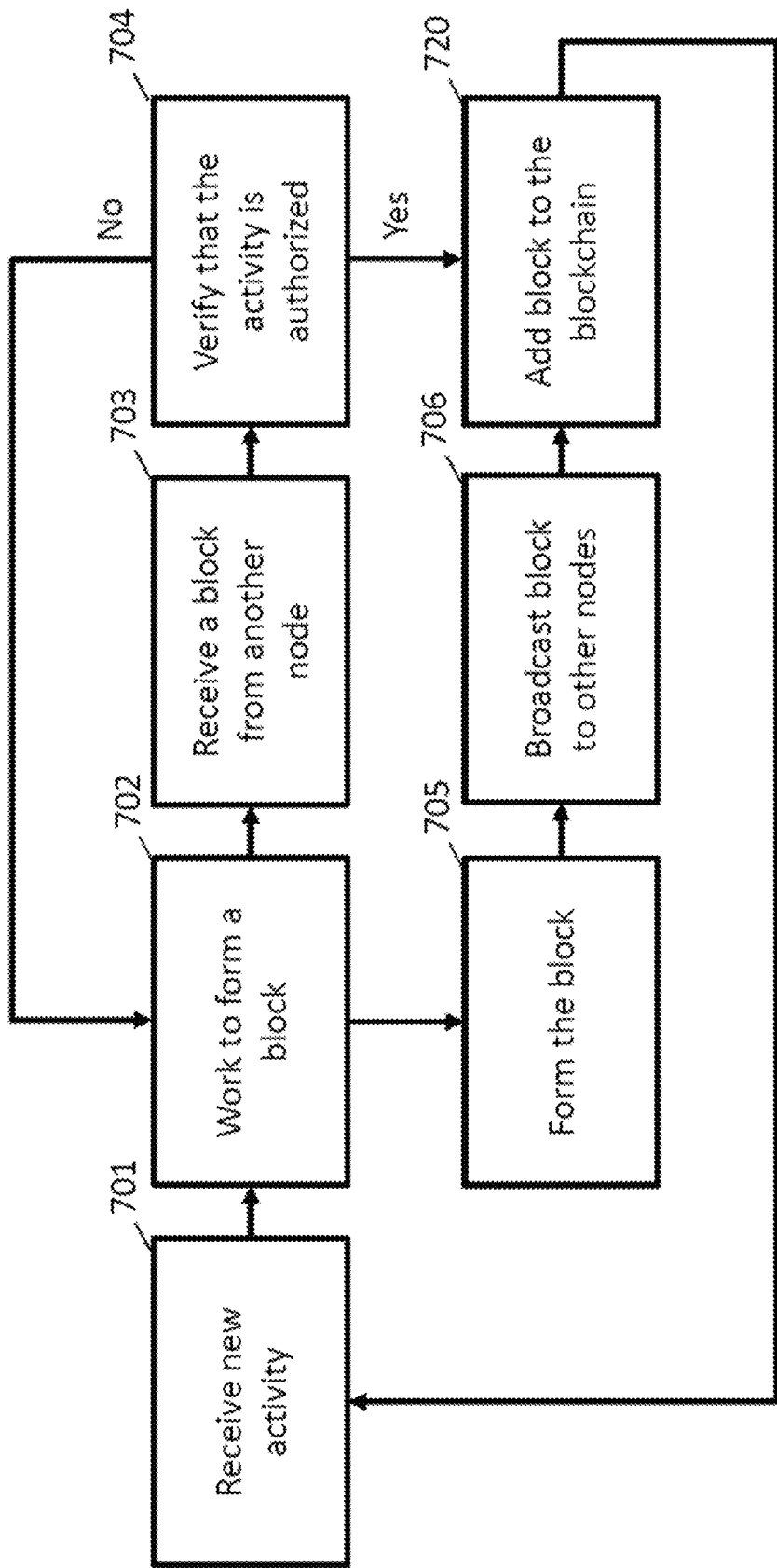
FIG. 7 is a flowchart depicting a sequence of steps performed in an exemplary embodiment.

Now referring to FIG. 7, a flow diagram according to some embodiments is shown. In some embodiments, the steps shown in FIG. 7 may be performed by a computer system as described in FIG. 3, a server, a distributed server, a timestamp server, a blockchain node, and the like. In some embodiments, the steps in FIG. 7 may be performed by one or more of the nodes in a system using blockchain for record keeping.

In step 701, a node receives a new activity in response to a request for delivery of one or more physical objects. The new activity may include an update to the record being kept in the form of a blockchain. In some embodiments, for blockchain supported digital or physical record keeping, the new activity can correspond to the ownership of the one or more physical objects and/or the transfer of the ownership of the physical objects from a first user to a second user. In some embodiments, the new activity may be broadcasted to a plurality of nodes on the network prior to step 701. In step 702, the node works to form a block to update the blockchain. In some embodiments, a block may include a plurality of activities or updates and a hash of one or more previous block in the blockchain. In some embodiments, the system may include consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 702, if the node successfully forms a block in step 705 prior to receiving a block from another node, the node broadcasts the block to other nodes over the network in step 706. In step 720, the node then adds the block to its copy of the blockchain. In the event that the node receives a block formed by another node in step 703 prior to being able to form the block, the node works to verify that the activity (e.g., authentication of transfer) recorded in the received block is authorized in step 704. In some embodiments, the node may further check the new block against system consensus rules for blocks and activities to verify whether the block is properly formed. If the new block is not authorized, the node may reject the block update and return to step 702 to continue to work to form the block. If the new block is verified by the node, the node may express its approval by adding the received block to its copy of the blockchain in step 720. After a block is added, the node then returns to step 701 to form the next block using the newly extended blockchain for the hash in the new block.

In some embodiments, in the event one or more blocks having the same block number is received after step 720, the node may verify the later arriving blocks and temporarily store these blocks if they pass verification. When a subsequent block is received from another node, the node may then use the subsequent block to determine which of the received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 701.

Figure 8:
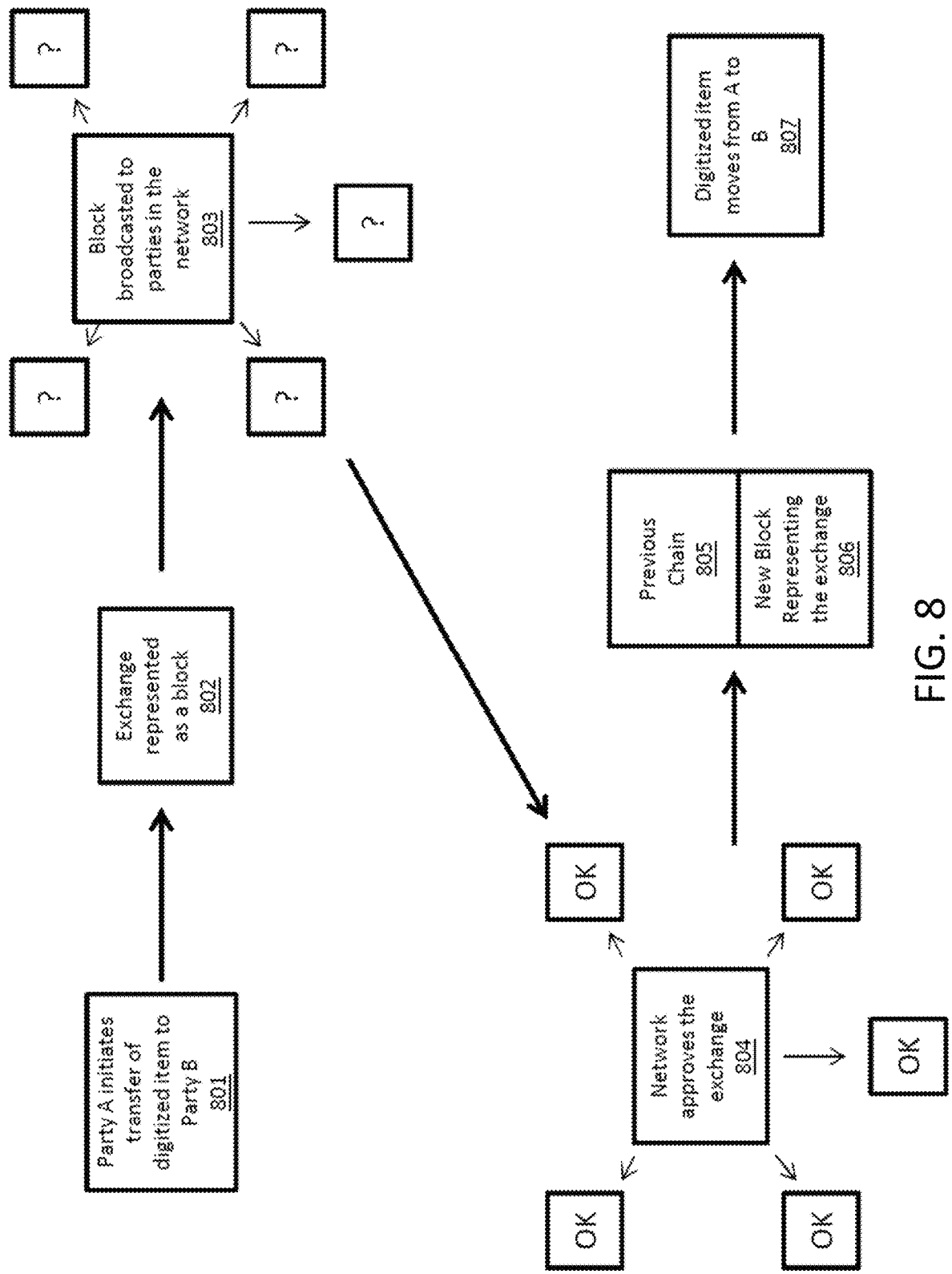
FIG. 8 is a flowchart depicting a blockchain update in accordance with an exemplary embodiment.

Now referring to FIG. 8, a process diagram for a blockchain update according to some embodiments is shown. In step 801, party A (an initial user such as a third party computing system) initiates the delivery and transfer one or more physical objects to party B (the retail store). In some embodiments, Party A may be authenticated by signing the transaction with a private key that may be verified with a public key in the previous transaction associated with the physical objects are to be transferred. In step 802, the authentication initiated in step 801 is represented as a block. In some embodiments, the transaction may be compared with transaction records in the longest chain in the distributed system to verify part A's authentication. In some embodiments, a plurality of nodes in the network may compete to form the block containing the authentication record. In some embodiments, nodes may be required to satisfy proof-of-work by solving a difficult mathematical problem to form the block. In some embodiments, other methods of proof such as proof-of-stake, proof-of-space, etc. may be used in the system. In step 803, the block is broadcasted to parties in the network. In step 804, nodes in the network authenticate party A by examining the block that contains the party A's authentication. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the object to be transferred). In some embodiments, a block may be approved with consensus of the nodes in the network. After a block is approved, the new block 806 representing the authentication is added to the existing chain 805 including blocks that chronologically precede the new block 806. The new block 806 may contain the transaction(s) and a hash of one or more blocks in the existing chain 805. In some embodiments, each node may then update their copy of the blockchain with the new block and continue to work on extending the chain with additional transactions. In step 807, when the chain is updated with the new block, the physical objects can be transferred from party A to party B.

Figure 9:
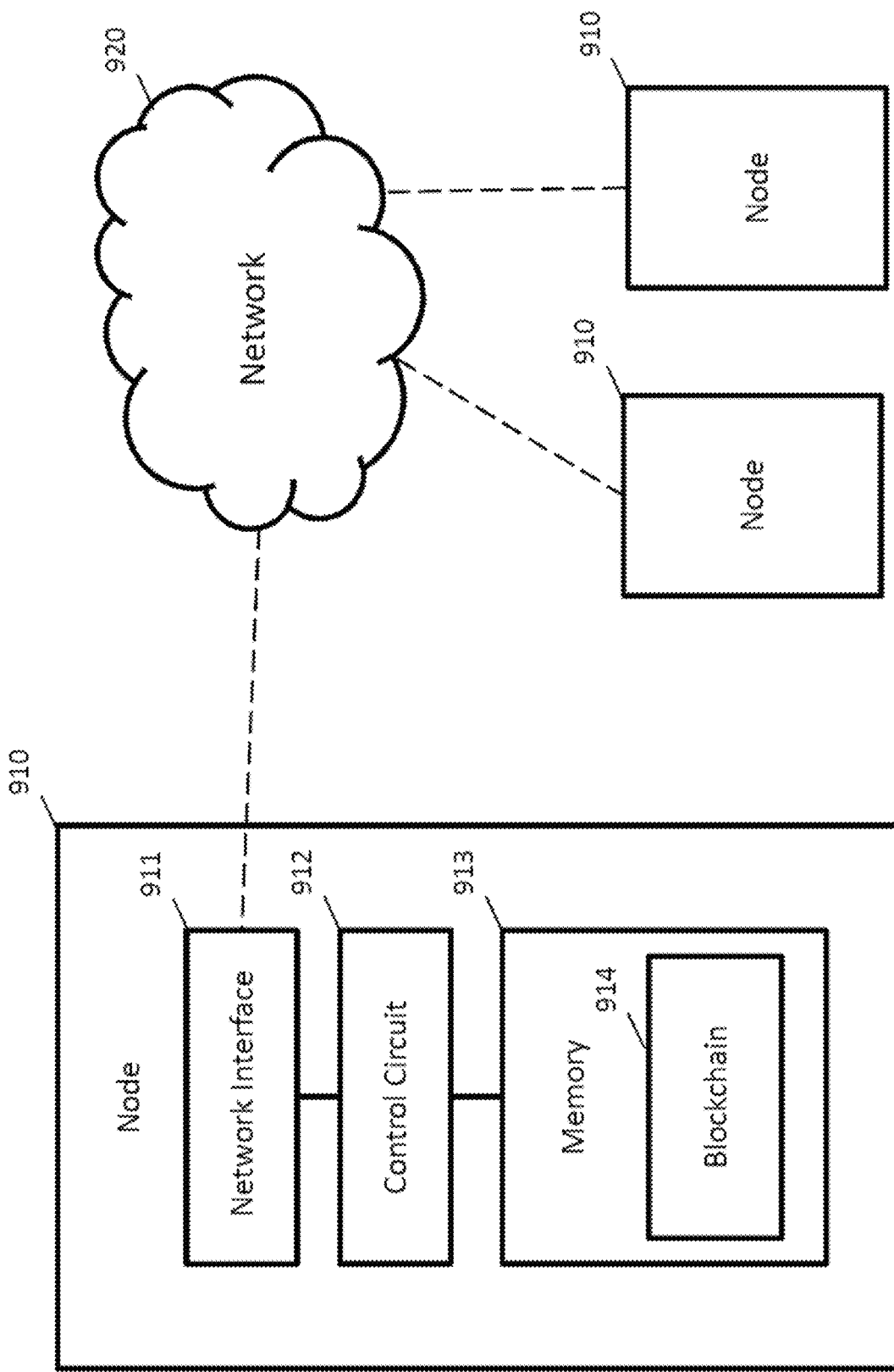
FIG. 9 depicts an exemplary system in accordance with an exemplary embodiment.

Now referring to FIG. 9, a system according to some embodiments is shown. A supply chain forecasting system includes a plurality of nodes 910 communicating over a network 920. In some embodiments, the nodes 910 may include a distributed blockchain server and/or a distributed timestamp server. Each node 910 in the system includes a network interface 911, a control circuit 912, and a memory 913.

The control circuit 912 may include a processor, a microprocessor, and the like and may be configured to execute computer readable instructions stored on a computer readable storage memory 913. The computer readable storage memory may include volatile and/or non-volatile memory and have stored upon it a set of computer readable instructions which, when executed by the control circuit 912, causes the node 910 update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 7-9 herein.

The network interface 911 may include one or more network devices configured to allow the control circuit to receive and transmit information via the network 920. In some embodiments, the network interface 911 may include one or more of a network adapter, a modem, a router, a data port, a transceiver, and the like. The network 920 may include a communication network configured to allow one or more nodes 910 to exchange data. In some embodiments, the network 920 may include one or more of the Internet, a local area network, a private network, a virtual private network, a home network, a wired network, a wireless network, and the like. In some embodiments, the system does not include a central server and/or a trusted third party computing system. Each node in the system may enter and leave the network at any time.

With the system and processes shown, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

Figure 10:
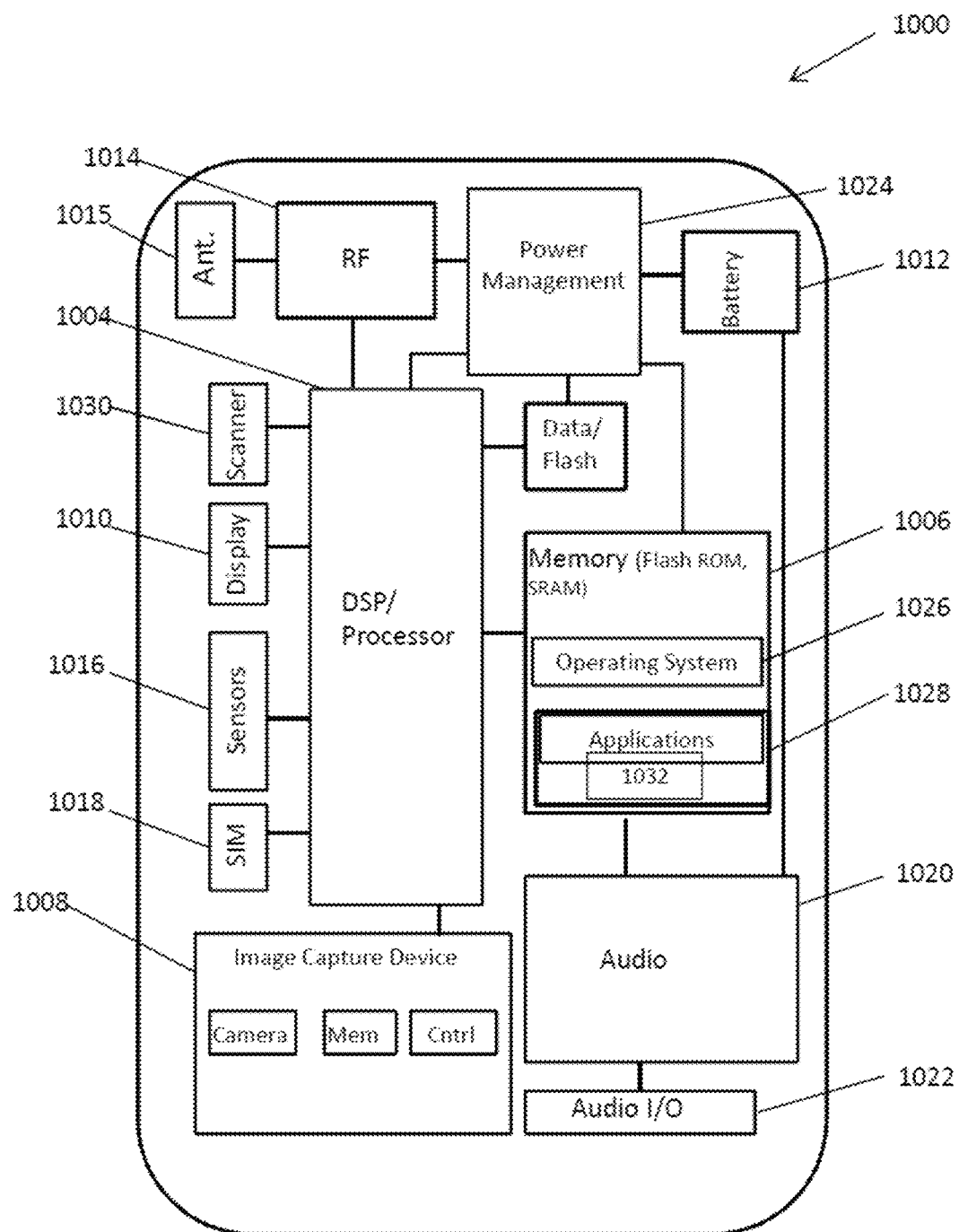
FIG. 10 is a block diagram of an exemplary mobile device in accordance with an exemplary embodiment.

FIG. 10 is a block diagram of a mobile device that can be utilized to implement and/or interact with embodiments of a location verification system in an exemplary embodiment. The mobile device 402 can be a smartphone, tablet, sub-notebook, laptop, personal digital assistant (PDA), or a handheld device, such as a Symbol® MC18 and/or any other suitable mobile device that can be programmed and/or configured to implement and/or interact with embodiments of the system via wireless communication. The mobile device 402 can be the user device (e.g., user device 342 as shown in FIG. 3), can be part of the third party computing system (e.g., third party computing system 340 as shown in FIG. 3), or party of the central computing system (e.g., central computing system 300 as shown in FIG. 3).

The mobile device 402 can include a processing device 1004, such as a digital signal processor (DSP) or microprocessor, memory/storage 1006 in the form a non-transitory computer-readable medium, an image capture device 1008, a touch-sensitive display 1010, a power source 1012, a radio frequency transceiver 1014 and a reader 1030. Some embodiments of the mobile device 402 can also include other common components commonly, such as sensors 1016, subscriber identity module (SIM) card 1018, audio input/output components 1020 and 1022 (including e.g., one or more microphones and one or more speakers), and power management circuitry 1024. The sensors 1016 can include a location-based sensor 1034, configured to determine the location of the mobile device 402.

The memory 1006 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 1026 and applications 1028 can be embodied as computer-readable/executable program code stored on the non-transitory computer-readable memory 1006 and implemented using any suitable, high or low level computing language and/or platform, such as, e.g., Java, C, C++, C #, assembly code, machine readable language, and the like. In some embodiments, the applications 1028 can include a facility application configured to interact with the microphone, a web browser application, a mobile application specifically coded to interface with one or more servers of embodiments of the system for data transfer in a distributed environment. One or more servers are described in further detail with respect to FIG. 3. While memory is depicted as a single component those skilled in the art will recognize that the memory can be formed from multiple components and that separate non-volatile and volatile memory devices can be used.

The processing device 1004 can include any suitable single- or multiple-core microprocessor of any suitable architecture that is capable of implementing and/or facilitating an operation of the mobile device 402. For example, a user can use the mobile device 402 in a facility to perform an image capture operation, capture a voice input of the user (e.g., via the microphone), transmit messages including a captured image and/or a voice input and receive messages from a central computing system, display data/information including GUIs of the user interface 1010, captured images, voice input transcribed as text, and the like. The mobile device 402 can perform the aforementioned operations using on an internet browser executing on the mobile device, or any web-based application. The processing device 1004 can be programmed and/or configured to execute the operating system 1026 and applications 1028 to implement one or more processes and/or perform one or more operations. The processing device 1004 can retrieve information/data from and store information/data to the storage device 1006.

The RF transceiver 1014 can be configured to transmit and/or receive wireless transmissions via an antenna 1015. For example, the RF transceiver 1014 can be configured to transmit data/information, such as input based on user interaction with the mobile device 402. The RF transceiver 1014 can be configured to transmit and/or receive data/information having at a specified frequency and/or according to a specified sequence and/or packet arrangement.

The touch-sensitive display 1010 can render user interfaces, such as graphical user interfaces to a user and in some embodiments can provide a mechanism that allows the user to interact with the GUIs. For example, a user may interact with the mobile device 402 through touch-sensitive display 1010, which may be implemented as a liquid crystal touchscreen (or haptic) display, a light emitting diode touchscreen display, and/or any other suitable display device, which may display one or more user interfaces (e.g., GUIs) that may be provided in accordance with exemplary embodiments.

The power source 1012 can be implemented as a battery or capacitive elements configured to store an electric charge and power the mobile device 402. In exemplary embodiments, the power source 1012 can be a rechargeable power source, such as a battery or one or more capacitive elements configured to be recharged via a connection to an external power supply. The scanner 1030 can be implemented as an optical reader configured to scan and decode machine-readable elements disposed on objects.

In one embodiment, the mobile device can execute an object delivery application (e.g., object delivery application 332 as shown in FIG. 3). The object delivery application 1032 can be an executable configured to track the location and/or supply chain process of physical objects of the mobile device 402. The object delivery application can store and access the status of a delivery of physical objects. The central computing system can interface with the object delivery application.

Figure 11:
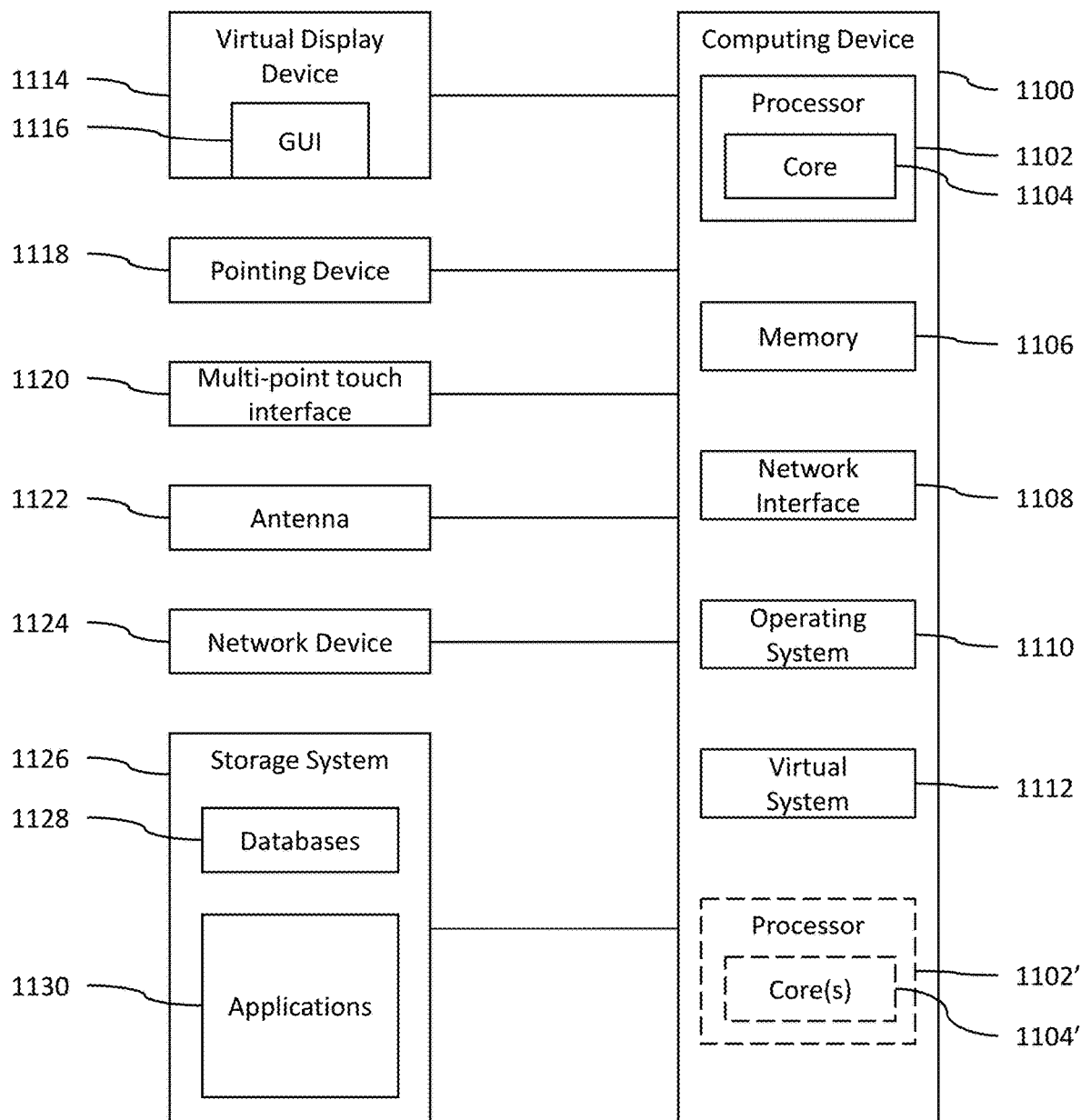
FIG. 11 illustrates a block diagram of an exemplary computing device in accordance with an exemplary embodiment.

FIG. 11 is a block diagram of an example computing device for implementing exemplary embodiments of the present disclosure. The computing device 1100 may be, but is not limited to, a smartphone, laptop, tablet, desktop computer, server or network appliance. The computing device 1100 can be embodied as part of the central computing system, third party computing system, or user device. The computing device 1100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1106 included in the computing device 1100 may store computer-readable and computer-executable instructions or software (e.g., applications 1130 such as the control engine 320, object delivery application 332, and contract application 333) for implementing exemplary operations of the computing device 1100. The computing device 1100 also includes configurable and/or programmable processor 1102 and associated core(s) 1104, and optionally, one or more additional configurable and/or programmable processor(s) 1102' and associated core(s) 1104' (for example, in the case of computer systems having multiple processors/cores), for executing computer-readable and computer-executable instructions or software stored in the memory 1106 and other programs for implementing exemplary embodiments of the present disclosure. Processor 1102 and processor(s) 1102' may each be a single core processor or multiple core (1104 and 1104') processor. Either or both of processor 1102 and processor(s) 1102' may be configured to execute one or more of the instructions described in connection with computing device 1100.

Virtualization may be employed in the computing device 1100 so that infrastructure and resources in the computing device 1100 may be shared dynamically. A virtual machine 1112 may be provided to handle a process running on multiple processors so that the process appears to be using only one computing resource rather than multiple computing resources. Multiple virtual machines may also be used with one processor.

Memory 1106 may include a computer system memory or random access memory, such as DRAM, SRAM, EDO RAM, and the like. Memory 1106 may include other types of memory as well, or combinations thereof.

A user may interact with the computing device 1100 through a visual display device 1114, such as a computer monitor, which may display one or more graphical user interfaces 1116, multi touch interface 1120, a pointing device 1118, an image capturing device 1134 and a scanner 1132.

The computing device 1100 may also include one or more computer storage devices 1126, such as a hard-drive, CD-ROM, or other computer-readable media, for storing data and computer-readable instructions and/or software that implement exemplary embodiments of the present disclosure (e.g., applications). For example, exemplary storage device 1126 can include one or more databases 1128 for storing information regarding delivery of physical objects. The databases 1128 may be updated manually or automatically at any suitable time to add, delete, and/or update one or more data items in the databases.

The computing device 1100 can include a network interface 1108 configured to interface via one or more network devices 1124 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the computing system can include one or more antennas 1122 to facilitate wireless communication (e.g., via the network interface) between the computing device 1100 and a network and/or between the computing device 1100 and other computing devices. The network interface 1108 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein.

The computing device 1100 may run any operating system 1110, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 1100 and performing the operations described herein. In exemplary embodiments, the operating system 1110 may be run in native mode or emulated mode. In an exemplary embodiment, the operating system 1110 may be run on one or more cloud machine instances.

Figure 12:
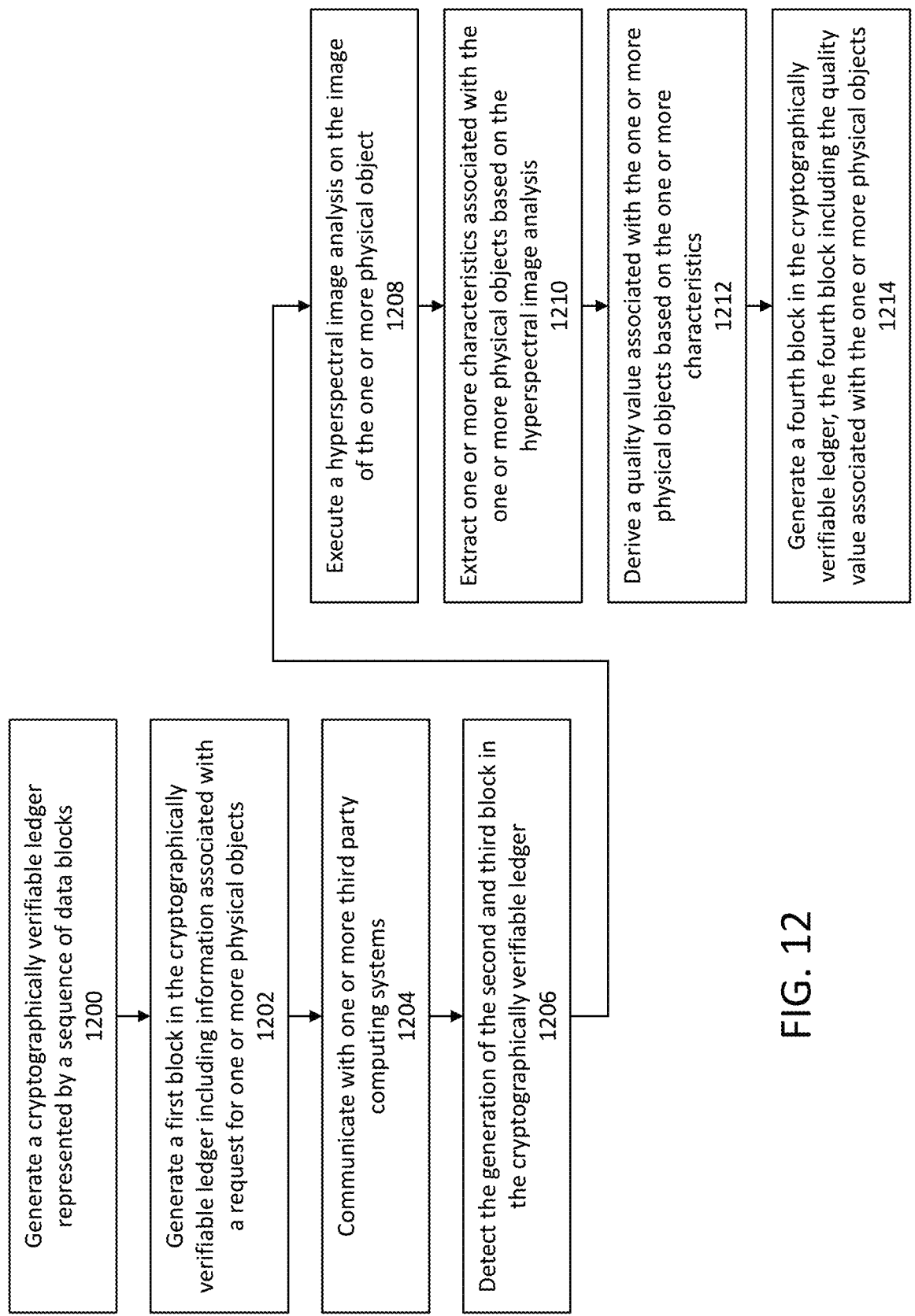
FIG. 12 depicts an exemplary sequence of steps performed by a supply chain system in an exemplary embodiment.

FIG. 12 is a flowchart illustrating the process of the supply chain forecasting system using blockchain controls. In operation 1200 a first application executed on a central computing system including a database can generate a cryptographically verifiable ledger represented by a sequence of data blocks, each data block containing one or more transaction records and each subsequent data block containing a hash value associated with a previous data block. In operation 1202, the first application can generate a first block in the cryptographically verifiable ledger including information associated with a request for one or more physical objects. The first block includes identification information associated with the physical objects, a destination location, and one or more constraints associated with the request for delivery of the one or more physical objects. In operation 1204, the central computing system communicates with one of one or more third party computing systems that execute an instance of the first application and includes a hyperspectral image sensor. At least one of the third party computing systems is configured to store a copy of a full or partial version of the cryptographically verifiable ledger and detect the generation of the first block including the request for the one or more physical objects. The third party computing system is further configured to generate a second block in the cryptographically verifiable ledger, the second block including an acceptance of the request for delivery of the physical objects. The third party computing system is also configured to instruct the hyperspectral image sensor to capture an image of the one or more physical objects prior to initiating delivery of the one or more physical objects, and generate, via the first application, a third block including the image of the one or more physical object captured by the hyperspectral image sensor.

In step 1206, the central computing system detects, via the first application, the generation of the second and third block in the cryptographically verifiable ledger. In step 1208 the first application when executed by the central computing system executes a hyperspectral image analysis on the image of the one or more physical objects and in step 1210 extracts one or more characteristics associated with the one or more physical objects based on the hyperspectral image analysis. In step 1212 the first application derives a quality value associated with the one or more physical objects based on the one or more characteristics; and in step 1214 generates a fourth block in the cryptographically verifiable ledger, the fourth block including the quality value associated with the one or more physical objects.

Figure 13:
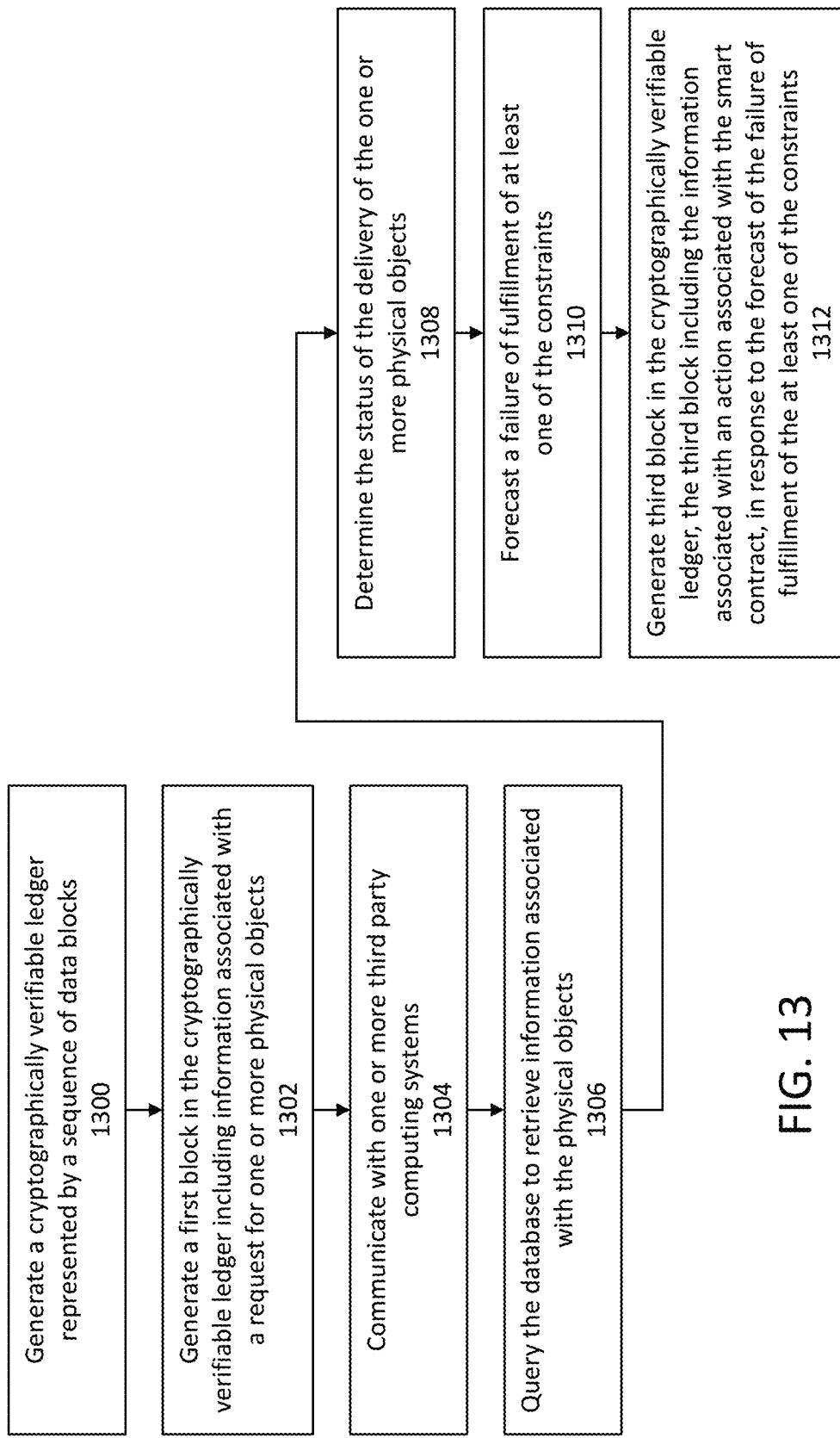
FIG. 13 depicts an exemplary sequence of steps performed by a supply chain system in an exemplary embodiment.

FIG. 13 is a flowchart illustrating the process of the supply chain forecasting system using blockchain controls. In operation 1302, the central computing system can generate a cryptographically verifiable ledger represented by a sequence of data blocks, each data block containing one or more transaction records and each subsequent data block containing a hash value associated with a previous data block. In operation 1304, the first application of the central computing system can generate a first block in the cryptographically verifiable ledger including information associated with a request for one or more physical objects. The first block includes identification information associated with the physical objects, a destination location, and one or more constraints associated with the request for delivery of the one or more physical objects. In operation 1306, the central computing system communicates with one or more third party computing systems that execute an instance of the first application. At least one third party system can store a copy of a full or partial version of the cryptographically verifiable ledger, detect the generation of the first block including the request for the one or more physical objects, and generate a second block in the cryptographically verifiable ledger. The second block includes an acceptance of the request for delivery of the physical objects.

In operation 1306, the central computing system can query the database to retrieve information associated with the delivery of the physical objects. In operation 1308, the central computing system can determine the status of the delivery of the one or more physical objects. In operation 1310, the central computing system can forecast a failure of fulfillment of at least one of the constraints. In operation 1312, the central computing system can generate a third block in the cryptographically verifiable ledger, the third block including the information associated with an action associated with the smart contract, in response to the forecast of the failure of fulfillment of the at least one of the constraints.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

One or more of the exemplary embodiments, include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI is a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A forecasting system, the system comprising:
   a central computing system configured to execute a first application that when executed:
   generates a cryptographically verifiable ledger represented by a sequence of data blocks, each data block containing one or more transaction records and each subsequent data block containing a hash value associated with a previous data block;
   generates a first block in the cryptographically verifiable ledger including information associated with a request for one or more physical objects, wherein the first block includes identification information associated with the one or more physical objects, a destination location, and one or more constraints associated with a request for delivery of the one or more physical objects;
   communicates with one or more third party computing systems executing an instance of the first application;
   detects, via the first application, the generation of a second block and a third block in the cryptographically verifiable ledger by a third party computing system, the second block including an acceptance of the request for delivery of the one or more physical objects by the third party computing system and the third block including data captured by a sensor of the third party computing system from the one or more physical objects prior to initiating delivery of the one or more physical object;
   derives a quality value associated with the one or more physical objects based on the data captured by the sensor and
   generates, via the first application, a fourth block in the cryptographically verifiable ledger, the fourth block including the quality value associated with the one or more physical objects.

2. The system of claim 1, wherein the central computing system is further configured to:
   derive a rate of deterioration of the one or more physical objects over time, based on the quality value of the one or more physical objects;
   iteratively calculate an updated quality value based on the rate of deterioration of the one or more physical objects over time, after a specified time interval; and
   generate, via the first application, subsequent blocks in the cryptographically verifiable ledger, each subsequent block including the updated quality value, each time the quality value changes more than a threshold level.

3. The system of claim 2, wherein at least one of the one or more constraints is a minimum quality value of the one or more physical objects at a time of delivery to the destination location.

4. The system of claim 3, wherein the central computing system is further configured to:
   determine that the quality value of the one or more physical objects will be lower than the minimum quality value at the time of delivery to the destination location; and
   in response to determining that the quality value of the one or more physical objects will be lower than the minimum quality value, generate, via the first application, a fifth block in the cryptographically verifiable ledger, the fifth block including information associated with voiding the delivery of the one or more physical objects.

5. The system of claim 4, wherein the information associated with voiding the delivery of the one or more physical objects is a reconciliation of an account based on the voiding.

6. The system of claim 4, wherein the central computing system is further configured to:
   determine that the quality value of the one or more physical objects will be lower than the minimum quality value at the time of delivery to the destination location; and
   in response to determining that the quality value of the one or more physical objects will be lower than the minimum quality value, generate, via the first application, a sixth block in the cryptographically verifiable ledger, the sixth block including information associated with re-routing the delivery of the one or more physical objects to a different destination location.

7. The system of claim 1, further comprising:
   one or more intermediate party computing systems configured to:
   communicate with the central computer system;
   store a copy of a full or partial version of the cryptographically verifiable ledger; and
   generate subsequent blocks in the cryptographically verifiable ledger in response to initiating or completing a process associated with the delivery of the one or more physical objects, each subsequent block including information associated with each process being initiated or completed.

8. The system of claim 1, further comprising:
   one or more user devices executing a second application including a graphical user interface (GUI), each of the one or more user devices configured to:
   track, via the second application, the delivery of the one or more physical objects; and
   render, via the second application, the quality value and changes to the quality value of the one or more physical objects on the GUI.

9. The system of claim 1, wherein the one or more physical objects are perishable items.

10. A forecasting method, the method comprising:
    generating, with a central computing system, a cryptographically verifiable ledger represented by a sequence of data blocks, each data block containing one or more transaction records and each subsequent data block containing a hash value associated with a previous data block;

generating a first block in the cryptographically verifiable ledger including information associated with a request for one or more physical objects, wherein the first block includes identification information associated with the one or more physical objects, a destination location, and one or more constraints associated with a request for delivery of the one or more physical objects;

communicating with one or more third party computing systems executing an instance of a first application;

detecting, via the first application, the generation of a second block and a third block in the cryptographically verifiable ledger by a third party computing system, the second block including an acceptance of the request for delivery of the one or more physical objects by the third party computing system and the third block including data captured by a sensor of the third party computing system from the one or more physical objects prior to initiating delivery of the one or more physical object;

deriving a quality value associated with the one or more physical objects based the data captured by the sensor; and generating, via the first application, a fourth block in the cryptographically verifiable ledger, the fourth block including the quality value associated with the one or more physical objects.

11. The method of claim 10, further comprising:
deriving a rate of deterioration of the one or more physical objects over time, based on the quality value of the one or more physical objects;

iteratively calculating an updated quality value based on the rate of deterioration of the one or more physical objects over time, after a specified time interval; and generating, via the first application, subsequent blocks in the cryptographically verifiable ledger, each subsequent block including the updated quality value, each time the quality value changes more than a threshold level.

12. The method of claim 11, wherein at least one of the one or more constraints is a minimum quality value of the one or more physical objects at a time of delivery to the destination location.

13. The method of claim 12, further comprising:
determining that the quality value of the one or more physical objects will be lower than the minimum quality value at the time of delivery to the destination location; and in response to determining that the quality value of the one or more physical objects will be lower than the minimum quality value, generating, via the first application, a fifth block in the cryptographically verifiable ledger, the fifth block including information associated with voiding the delivery of the one or more physical objects.

14. The method of claim 13, wherein the information associated with voiding the delivery of the one or more physical objects is a reconciliation of an account based on the voiding.

15. The method of claim 13, further comprising:
determining that the quality value of the one or more physical objects will be lower than the minimum quality value at the time of delivery to the destination location; and in response to determining that the quality value of the one or more physical objects will be lower than the minimum quality value, generate, via the first application, a sixth block in the cryptographically verifiable ledger, the sixth block including information associated with re-routing the delivery of the one or more physical objects to a different destination location.

16. The method of claim 10, further comprising:
receive subsequent blocks in the cryptographically verifiable ledger generated by an intermediate party computing system in response to initiating or completing a process associated with the delivery of the one or more physical objects, each subsequent block including information associated with each process being initiated or completed.

17. The method of claim 10, further comprising:
track, via a second application executed on a user device, the delivery of the one or more physical objects; and
render, via the second application, the quality value and changes to the quality value of the one or more physical objects on a graphical user interface (GUI).

18. The method of claim 10, wherein the one or more physical objects are perishable items.

* * * * *